(12) United States Patent
King et al.

(10) Patent No.: US 8,533,861 B2
(45) Date of Patent: Sep. 10, 2013

(54) MAGNETIC ACTUATION AND THERMAL CANTILEVERS FOR TEMPERATURE AND FREQUENCY DEPENDENT ATOMIC FORCE MICROSCOPY

(75) Inventors: William P. King, Champaign, IL (US); Craig Prater, Santa Barbara, CA (US); Byeonghee Lee, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/304,306

(22) Filed: Nov. 23, 2011

(65) Prior Publication Data

US 2013/0047303 A1 Feb. 21, 2013

Related U.S. Application Data

(60) Provisional application No. 61/523,572, filed on Aug. 15, 2011.

(51) Int. Cl.
*G01N 13/16* (2006.01)
*G01B 5/28* (2006.01)
*G01Q 60/00* (2010.01)

(52) U.S. Cl.
USPC .......... 850/50; 850/1; 850/9; 850/25; 850/63; 73/105

(58) Field of Classification Search
USPC ........................ 850/1, 9, 25, 50, 63; 73/105
See application file for complete search history.

(56) References Cited

U.S. PATENT DOCUMENTS

| | | |
|---|---|---|
| 4,166,269 A | 8/1979 | Stephens et al. |
| 5,345,815 A | 9/1994 | Albrecht et al. |
| 5,386,720 A | 2/1995 | Toda et al. |
| 5,441,343 A | 8/1995 | Pylkki et al. |
| 5,444,244 A | 8/1995 | Kirk et al. |
| 5,451,371 A | 9/1995 | Zanni-Fisher et al. |
| 5,464,966 A | 11/1995 | Gaitan et al. |
| 5,468,959 A | 11/1995 | Tahda et al. |
| 5,583,286 A | 12/1996 | Matsuyama |
| 5,801,070 A | 9/1998 | Zanini-Fisher et al. |
| 5,929,438 A | 7/1999 | Suzuki et al. |
| 5,936,237 A | 8/1999 | van der Weide |
| 5,969,238 A | 10/1999 | Fischer |
| RE36,488 E | 1/2000 | Elings et al. |
| 6,050,722 A | 4/2000 | Thundat et al. |

(Continued)

FOREIGN PATENT DOCUMENTS

| | | |
|---|---|---|
| WO | WO94/10822 | 5/1994 |
| WO | WO 01/20283 | 3/2001 |

(Continued)

OTHER PUBLICATIONS

Abedinov et al. (Nov./Dec. 2001) "Micromachined Piezoresistive Cantilever Array With Integrated Resistive Microheater for Calorimetry and Mass Detection," *J. Vac. Sci. Technol. A* 19(6):2884-2888.

(Continued)

*Primary Examiner* — Nikita Wells
(74) *Attorney, Agent, or Firm* — Lathrop & Gage LLP

(57) ABSTRACT

Described are methods for magnetically actuating microcantilevers and magnetically actuated and self-heated microcantilevers. Also described are methods for determining viscoelastic properties and thermal transition temperatures of materials.

50 Claims, 24 Drawing Sheets

(56) References Cited

U.S. PATENT DOCUMENTS

| | | | |
|---|---|---|---|
| 6,073,485 A | 6/2000 | Kitamura | |
| 6,079,255 A | 6/2000 | Binnig et al. | |
| 6,094,971 A | 8/2000 | Edwards et al. | |
| 6,096,559 A | 8/2000 | Thundat et al. | |
| 6,097,197 A | 8/2000 | Matsuyama et al. | |
| 6,233,206 B1 | 5/2001 | Hamann et al. | |
| 6,383,823 B1 | 5/2002 | Takahashi et al. | |
| 6,436,346 B1 | 8/2002 | Doktycz et al. | |
| 6,452,170 B1 | 9/2002 | Zypman et al. | |
| 6,467,951 B1 | 10/2002 | Ghoshal | |
| 6,487,515 B1 | 11/2002 | Ghoshal | |
| 6,535,824 B1 | 3/2003 | Mansky et al. | |
| 6,583,412 B2 | 6/2003 | Williams | |
| 6,667,467 B2 | 12/2003 | Shimizu et al. | |
| 6,668,627 B2 | 12/2003 | Lanage et al. | |
| 6,762,402 B2 | 7/2004 | Choi et al. | |
| 6,763,705 B1 | 7/2004 | Thundat et al. | |
| 6,785,041 B1 | 8/2004 | Vodopyanov | |
| 6,862,923 B2 | 3/2005 | Buguin et al. | |
| 6,865,044 B1 | 3/2005 | Albrecht et al. | |
| 6,880,386 B1 | 4/2005 | Krotil et al. | |
| 6,893,884 B2 | 5/2005 | Shi et al. | |
| 6,894,272 B2 | 5/2005 | Kranz et al. | |
| 6,930,502 B2 | 8/2005 | Lee et al. | |
| 6,932,504 B2 | 8/2005 | Takahashi et al. | |
| 6,935,167 B1 | 8/2005 | Sahin et al. | |
| 6,983,644 B2 | 1/2006 | Yamanaka et al. | |
| 7,033,840 B1 | 4/2006 | Tagge et al. | |
| 7,038,996 B2 | 5/2006 | Binnig et al. | |
| 7,045,780 B2* | 5/2006 | Kley | 250/306 |
| 7,074,340 B2 | 7/2006 | Lugstein et al. | |
| 7,129,486 B2 | 10/2006 | Spizig et al. | |
| 7,155,964 B2 | 1/2007 | Huang et al. | |
| 7,168,298 B1 | 1/2007 | Manginell et al. | |
| 7,208,730 B2 | 4/2007 | Berstis | |
| 7,211,789 B2 | 5/2007 | Berstis | |
| 7,260,980 B2 | 8/2007 | Adams et al. | |
| 7,261,461 B2 | 8/2007 | Grudin et al. | |
| 7,268,348 B2 | 9/2007 | Binning et al. | |
| 7,281,419 B2 | 10/2007 | Wang et al. | |
| 7,291,466 B2 | 11/2007 | Su et al. | |
| 7,404,314 B2 | 7/2008 | Sahin et al. | |
| 7,451,638 B1 | 11/2008 | Sahin et al. | |
| 7,497,613 B2* | 3/2009 | King et al. | 374/141 |
| 7,521,257 B2 | 4/2009 | Adams et al. | |
| 7,596,989 B2* | 10/2009 | Humphris et al. | 73/105 |
| 7,677,088 B2 | 3/2010 | King | |
| 7,741,615 B2 | 6/2010 | Putterman et al. | |
| 7,928,343 B2 | 4/2011 | King et al. | |
| 8,001,830 B2 | 8/2011 | Dazzi et al. | |
| 8,136,385 B2* | 3/2012 | Adams et al. | 73/31.05 |
| 2003/0101006 A1 | 5/2003 | Mansky et al. | |
| 2004/0020279 A1 | 2/2004 | Degertekin et al. | |
| 2004/0195096 A1 | 10/2004 | Tsamis et al. | |
| 2004/0223884 A1 | 11/2004 | Chen et al. | |
| 2004/0228258 A1 | 11/2004 | Binnig et al. | |
| 2005/0109081 A1 | 5/2005 | Zribi et al. | |
| 2005/0127926 A1 | 6/2005 | Lee et al. | |
| 2005/0164299 A1 | 7/2005 | Stewart | |
| 2006/0032289 A1 | 2/2006 | Pinnaduwage et al. | |
| 2006/0040057 A1 | 2/2006 | Sheehan et al. | |
| 2006/0150720 A1 | 7/2006 | Nakayama et al. | |
| 2006/0207317 A1 | 9/2006 | Watanabe | |
| 2006/0222047 A1 | 10/2006 | Reading | |
| 2006/0238206 A1 | 10/2006 | Eng et al. | |
| 2006/0254345 A1 | 11/2006 | King et al. | |
| 2006/0289510 A1 | 12/2006 | Atkins et al. | |
| 2007/0063141 A1 | 3/2007 | Duerig et al. | |
| 2007/0109091 A1 | 5/2007 | Landsberger et al. | |
| 2007/0114401 A1 | 5/2007 | King et al. | |
| 2007/0125753 A1 | 6/2007 | Fink et al. | |
| 2007/0189920 A1 | 8/2007 | Gimzewski | |
| 2007/0190562 A1 | 8/2007 | Berstis | |
| 2007/0286254 A1 | 12/2007 | Fon et al. | |
| 2008/0093226 A1 | 4/2008 | Briman et al. | |
| 2008/0283755 A1 | 11/2008 | Dazzi et al. | |
| 2008/0295583 A1 | 12/2008 | Giessibl | |
| 2009/0013770 A1 | 1/2009 | Proksche et al. | |
| 2009/0056428 A1 | 3/2009 | King et al. | |
| 2009/0139340 A1 | 6/2009 | King et al. | |
| 2009/0249521 A1 | 10/2009 | Dazzi et al. | |
| 2011/0030109 A1 | 2/2011 | Saito | |
| 2011/0061452 A1* | 3/2011 | King et al. | 73/105 |
| 2011/0078834 A1* | 3/2011 | King | 850/9 |
| 2011/0126329 A1 | 5/2011 | Despont et al. | |
| 2011/0154546 A1 | 6/2011 | Proksch et al. | |
| 2011/0167524 A1 | 7/2011 | Hu et al. | |
| 2011/0268148 A1 | 11/2011 | King et al. | |

FOREIGN PATENT DOCUMENTS

| | | |
|---|---|---|
| WO | WO 03/011747 | 2/2003 |
| WO | WO 2006/046924 | 5/2006 |
| WO | WO 2006/073426 | 7/2006 |
| WO | WO 2006/107991 | 11/2006 |
| WO | WO 2007/011364 | 1/2007 |
| WO | WO 2007/026177 | 3/2007 |
| WO | WO 2008/143817 | 11/2008 |
| WO | WO 2009/097487 | 8/2009 |
| WO | WO 2010/022285 | 2/2010 |

OTHER PUBLICATIONS

Abel et al. (Jun. 2007) "Thermal Metrology of Silicon Microstructures Using Raman Spectroscopy," IEEE Trans. Comp. Pack. Tech. 30(2):200-208.

Akiyama et al. (Nov./Dec. 2000) "Integrated Atomic Force Microscopy Array Probe with Metal-Oxide-Semiconductor Field Effect Transistor Stress Sensor, Thermal Bimorph Actuator, and On-Chip Complementary Metal-Oxide-Semiconductor Electronics," J. Vac. Sci. Technol. B 18(6):2669-2675.

Albright et al. (Apr. 1999)"'True' Temperature Measurements on Microscope Semiconductor Targets," In: SPIE Conference on Thermosense XXI, Orlando, Florida, SPIE 3700:245-250.

Allen et al. (1998) "MEMS-Based Scanning Calorimeter for Thermodynamic Properties of Nanostructures," Microscale Thermophys. Eng. 2:11-19.

Asano et al. (Sep. 1992) "Field-Excited Electron Emission from Ferroelectric Ceramic in Vacuum," Jpn. J. Appl. Phys. 31(9B):3098-3101.

Auciello et al. (1995) "Low Voltage Electron Emission from $Pb(Zr_xTi_{1-x})O_3$-Based Thin Film Cathodes," Appl. Phys. Lett. 66:2183-2185.

Beckel et al. (Mar. 30, 2007) "Micro-Hotplates—A Platform for Micro-Solid Oxide Fuel Cells," J. Power Sources 166:143-148.

Belmonte et al. (Apr. 26, 2006) "High-Temperature Low-Power Performing Micromachined Suspended Micro-Hotplate for Gas sensing Applications," Sens. Actuators B. Chem. 114:826-835.

Berger et al. (1998) "Micromechanical Thermogravimetry," Chem. Phys. Lett. 294:363-369.

Berger et al. (Jul. 1, 1996) "Thermal Analysis Using a Micromechanical Calorimeter," Appl. Phys. Lett. 69(1):40-42.

Beyder et al. (2006) "Reducing Probe Dependent Drift in Atomic Force Microscope with Symmetrically Supported Torsion Levers," Rev. Sci. Instrum. 77:056105.

Bhatia et al. (2011) "High-Temperature Piezoresponse Force Microscopy," Appl. Phys. Lett. 99:173103.

Bian et al. (2007) "Electron Emission from $SrTiO_3$-Coated Silicon-Tip Arrays," J. Vac. Sci. Technol. B 21:817-821.

Bian et al. (2009) "Field Emission Properties of Si Tip Arrays Coated with N-Doped $SrTiO_3$ Thin Films at Different Substrate Temperature," J. Appl. Phys. 105:013312.

Binnig et al. (Mar. 3, 1986) "Atomic Force Microscope," Phys. Rev. Lett. 56(9):930-933.

Binnig et al. (Mar. 1, 1999) "Ultrahigh-Density Atomic Force Microscopy Data Storage with Erase Capability," Appl. Phys. Lett. 74(9):1329-1331.

Biswal et al. (2006) "Nanomechanical Detection of DNA Melting on Microcantilever Surfaces," Anal. Chem. 78:7104-7109.

Biswal et al. (2007) "Using a Microcantilever Array for Detecting Phase Transitions and Stability of DNA," *Clin. Lab. Med.* 27:163-171.

Biswal et al. (Aug. 2006) "Using a Microcantilever Array for Detecting Phase Transitions and Stability of DNA," *J. Assoc. Lab. Auto.* 11:222-226.

Boisen et al. (2000) "Environmental Sensors Based on Micromachined Cantilevers with Integrated Read-Out," *Ultramicroscopy* 82:11-16.

Brown et al. (May 1999) "Cantilever-in-Cantilever Micromachined Pressure Sensors Fabricated in CMOS Technology," *Proc. 1999 IEEE Can. Conf. on Elec. and Comp. Eng.* :1686-1691.

Buguin et al. (May 7, 2001) "Active Atomic Force Microscopy Cantilevers for Imaging in Liquids," *Appl. Phys. Lett.* 78(19):2982-2984.

Butt et al. (1995) "Calculation of Thermal Noise in Atomic Force Microscopy," *Nanotechnology* 6(1):1-7.

Byer et al. (1972) "Pyroelectric Coefficient Direct Measurement Technique and Application to a nsec Response Time Detector," *Ferroelectrics* 3:333-338.

Cahill, D.G. (1990) "Thermal Conductivity Measurement from 30 to 750K: The $3\omega$ Method," *Rev. Sci. Instrum.* 61(2):802-808.

Cavicchi et all. (Jan. 1, 2004) "Micro-Differential Scanning Calorimeter for Combustible Gas Sensing," *Sens. Actuators B. Chem.* 97:22-30.

Chandra et al. (2007) "A Landau Primer for Ferroelectrics," In; *Physics of Ferroelectrics, Spring Topics in Applied Physics* 105:69-116.

Chen et al. (Aug. 1994) "Resonance Response of Scanning Force Microscopy Cantilevers," *Rev. Sci. Instrum.* 65(8):2532-2537.

Chen et al. (May 2008) "Si Field Emitter Arrays Coated with Thin Ferroelectric Films," *Ceram. Int.* 34:971-977.

Choi et al. (2004) "Enhancement of Ferroelectricity in Strained $BaTiO_3$ Thin Films," *Science* 306:1005-1009.

Chu et al. (2006) "Nanoscale Domain Control in Multiferroic $BiFeO_3$ Thin Films," *Adv. Mater.* 18:2307-2311.

Chu et al. (2007) "Domain Control in Multiferroic $BiFeO_3$ Through Substrate Vicinality," *Adv. Mater.* 19:2662-2666.

Chu et al. (2008) "Electric-Field Control of Local Ferromagnetism Using a Magnetoelectric Multiferroic," *Nature Mater.* 7:478.

Chu et al. (2009) "Nanoscale Control of Domain Architectures in $BiFeO_3$ Thin Films," *Nano Lett.* 9:1726-1730.

Chui et al. (Oct. 28, 1996) "Low-Stiffness Silicon Cantilevers for Thermal Writing and Peizoresistive Readback with Atomic Force Microscope," *Appl. Phys. Lett.* 69(18):2767-2769.

Chui et al. (1999) "Intrinsic-Carrier Thermal Runaway in Silicon Microcantilevers," *Microscale Thermophys. Eng.* 3:217-228.

Chui et al. (2007) "Advanced Temperature Compensation for Piezoresistive Sensors Based on Crystallographic Orientation," *Rev. Sci. Instrum.* 78:043706.

Chui et al. (Mar. 1998) "Low-Stiffness Silicon Cantilevers with Integrated Heaters and Piezoresistive Sensors for High-Density AFM Thermomechanical Data Storage," *J. Microelectromech. Syst.* 7(1):69-78.

Dames et al. (2005) "$1\omega$, $2\omega$, and $3\omega$ Methods for Measurements of Thermal Properties," *Rev. Sci. Instrum.* 76(12):124902.

Damodaran et al. (2011) "Nanoscale Structure and Mechanism for Enhanced Electromechanical Response of Highly-Strained $BiFeO_3$ Thin Films," *Adv. Mater.* 23:3170-3175.

Datskos (1996) "Remote Infrared Radiation Detection Using Piezoresistive Microcantilevers," *Appl. Phys. Lett.* 69: 2986-2988.

Dazzi (2008) "Sub-100nm Infrared Spectroscopy and Imaging based on a near-field photo-thermal technique ("PTIR")," in Biomedical vibrational spectroscopy, J. Wiley ed., 291.

Dazzi et al. (2004) "Theoretical Study of an Absorbing Sample in Infrared Near-Field Spectromicroscopy," *Optics Comm.* 235:351-360.

Dazzi et al. (Sep. 5, 2005) "Local Infrared Microspectroscopy with Subwavelength Spatial Resolution with an Atomic Force Microscope Tip used as a Photothermal Sensor," *Optics Lett.* 30(18):2388-2390.

Dazzi et al. (2006) "Subwavelength Infrared Spectromicroscopy using an AFM as a Local Absorption Sensor," *Infrared Phys. Technol.* 49:113-121.

Dazzi et al. (2007) "Analysis of Nano-Chemical Mapping Performed by an AFM-Based ("AFMIR") Acousto-Optic Technique," *Ultramicroscopy* 107(12):1194-1200.

Degamber et al. (Sep. 2004) "Simultaneous DSC/FTIRS/TMA," *Meas. Sci. Technol.* 15:L5-L10.

Denlinger et al. (Apr. 1994) "Thin-Film Microcalorimeter for Heat-Capacity Measurements from 1.5K to 800K," *Rev. Sci. Instrum.* 65:946-958.

Despont et al. (2000) "VLSI-NEMS Chip for Parallel AFM Data Storage," *Sens. Actuators A* 80:100-107.

Dreschler et al. (2003) "Cantilevers with Nano-Heaters for Thermomechanical Storage Application," *Microelectr. Eng.* 67/68:397-404.

Dücsö et al. (May 1997) "Porous Silicon Bulk Micromachining for Thermally Isolated Membrane Formation," *Sens. Actuators A Phys.* 60:235-239.

Dunaevsky et al. (Jun. 15, 1999) "Electron/Ion Emission from the Plasma Formed on the Surface of Ferroelectrics. I. Studies of Plasma Parameters without Applying and Extracting Voltage," *J. Appl. Phys.* 85(12):8464-8473.

Efremov et al. (Jan. 2004) "Ultrasensitive, Fast, Thin-Film Differential Scanning Calorimeter," *Rev. Sci. Instrum.* 75(1):179-191.

Efremov et al. (Aug. 22, 2003) "Glass Transition in Ultrathin Polymer Films: Calorimetric Study," *Phys. Rev. Lett.* 91(8):085703.

Efremov et al. (Feb. 26, 2002) "Thin-Film Differential Scanning Calorimetry: A New Probe for Assignment of the Glass Transition of Ultrathin Polymer Films," *Macromolecules* 35(5):1481-1483.

Efremov et al. (Jun. 26, 2003) "Glass Transition of Thin Films of Poly(2-Vinyl Pyridine) and Poly(Methyls Methacrylate): Nanocalorimetry Measurements," *Thermochim Acta* 403:37-41.

Efrimov et al. (Jun. 15, 2004) "Probing Glass Transition of Ultrathin Polymer Films at a Time Scale of Seconds Using Fast Differential Scanning Calorimetry," *Macromolecules* 37:4607-4616.

Enders et al. (2004) "Lorentz-Force-Induced Excitation of Cantilevers for Oscillation-Mode Scanning Probe Microscopy," *Surf. Interface Anal.* 36(2):119-123.

Felts et al. (2009) "Mechanical Design for Tailoring Resonance Harmonics of an Atomic Force Microscope Cantilever During Tip-Surface Contact," *J. Micromech. Microeng.* 19: 115008.

Fernando et al. (2007) "Improved Cantilever Profiles for Sensor Elements," *J. Phys. D-Appl. Phys.* 40(24):7652-7655.

French, P.J. (2002) "Polysilicon: A Versatile Material for Microsystems," *Sens. Actuators A* 99:3-12.

Frisbie et al. (Sep. 30, 1994) "Functional Group Imaging by Chemical Force Microscopy," *Science* 265:2071-2074.

Fritz et al. (Apr. 14, 2000) "Translating Biomolecular Recognition into Nanomechanics," *Science* 288:316-318.

Fung et al. (Jun. 1996) "Thermal Analysis and Design of a Micro-Hotplate for Integrated Gas-Sensor Applications," *Sens. Actuators A Phys.* 54:482-487.

Fürjes et al. (2004) "Thermal Characterization of Micro-Hotplates Used in Sensor Structures," *Superlattices Microstruct.* 35:455-464.

Fürjes et al. (Apr. 30, 2002) "Thermal Investigation of Micro-Filament Heaters," *Sens. Actuators A. Phys.* 99:98-103.

Füries et al. (Jul. 2002) "Materials and Processing for Realization of Micro-Hotplates Operated at Elevated Temperature," *J. Micromech. Microeng.* 12:425-429.

Gimzewski et al. (Jan. 28, 1994) "Observation of a Chemical Reaction Using a Micromechanical Sensor," *Chem. Phys. Lett.* 217(5-6):589-594.

Goericke et al. (2007) "Microcantilever Hotplates with Temperature-Compensated Peizoresistive Strain Sensors," *Sens. Actuators A* 143(2):181-190.

Gotsmann et al. (Web Release Jan. 17, 2004) "Thermally Activated Nanowear Models of a Polymer Surface Induced by a Heated Tip," *Langmuir* 20:1495-1500.

Gotsmann et al. (2005) "Experimental Observation of Attractive and Repulsive Thermal Forces on Microcantilevers," *Appl. Phys. Lett.* 87:194102.

Graf et al. (Jan. 2005) "3D Nonlinear Modeling of Microhotplates in CMOS Technology for Use as Metal-Oxide-Based Gas Sensors," *J. Micromech. Microeng.* 15:190-200.

Gruverman (1996) "Scanning Force Microscopy for the Study of Domain Structure in Ferroelectric Thin Films," *J Vac. Sci. Technol. B: Microelectron. Nanometer Struct.* 14(2):602-605.
Gundel et al. (1989) "Copious Electron Emission from PLZT Ceramics with High Zirconium Concentration," *Ferroelectrics* 100:1-16.
Gundel et al. (1990) "Electric Field-Excited Electron Emission from PLZT-X/65/35 Ceramics," *Ferroelectrics* 110:183-192.
Gundel et al. (Jan. 1991) "Time-Dependent Electron Emission frrom Ferroelectrics by External Pulsed Electric Fields," *J. Appl. Phys.* 69(2):975-982.
Guo et al. (Jan. 2007) "A Monolithic Integrated 4x4 Tin Oxide Gas Sensor Array with On-Chip Multiplexing and Differential Readout Circuits," *Solid-State Electron.* 51:69-76.
Hagleitner et al. (Nov. 15, 2001) "Smart Single-Chip Gas Sensor Microsystem," *Nature* 414:293-296.
Hammiche et al. (Feb. 2004) "Progress in Near-Field Photothermal Infra-Red Microscopy," *J. Microscopy* 213(2):129-134.
Han et al. (2005) "A Novel Temperature-Compensating Structure for Micromechanical Bridge Resonator," *J. Micromech. Microeng.* 15: 702-705.
Han et al. (May 17, 2005) "Size Effect on Heat Transfer in Micro Gas Sensors," *Sens. Actuators A Phys.* 120:397-402.
Hey et al. (1997) "A Combined Differential Scanning Calorimeter Optical Video Microscope for Crystallization Studies," *J. Therm. Anal.* 49:991-998.
Higa et al. (1998) "Gated Si Field Emitter Array Prepared by Using Anodization," *J. Wac. Sci. Technol. B* 16(2):651-653.
Hii et al. (2006) "Characterizing Field Emission from Individual Carbon Nanotubes at Small Distances," *J. Vac. Sci. Technol. B* 24(3):1081-1087.
Hodges (Oct. 2001) "Improved Atomic Force Microscope Cantilever Performance by Ion Beam Modification," *Rev. Sci. Instrum.* 72(10):3880-3883.
Holbery et al. (Oct. 2000) "Experimental Determination of Scanning Probe Microscope Cantilever Spring Constants Utilizing a Nanoindentation Apparatus," *Rev. Sci. Instrum.* 71(10):3769-3776.
Hotovy et al. (Apr. 2008) "Gallium Arsenide Suspended Microheater for MEMS Sensor Arrays," *Microsyst. Tech.* 14:629-635.
Hsu et al. (Feb. 6, 2004) "Cubic AgPbmSbTe2+m: Bulk Thermoelectric Materials with High Figure of Merit," *Science* 303:818-821.
Hu et al. (2008) "Investigation of the Natural Convection Boundary Condition in Microfabricated Structures," *Int. J. Therm. Sci.* 47:820-824.
Huijben et al. (2008) "Critical Thickness and Orbital Ordering in Ultrathin $La_{0.7}Sr_{0.3}MnO_3$ Films," *Phys. Rev. B* 78:094413.
Huiling (2008) "Concentrated-Mass Cantilever Enhances Multiple Harmonics in Tapping Mode Atomic Force Microscopy," *Appl. Phys. Lett.* 92(15):151903.
Hull (1999) "Electrical Properties," and "Implantation/ Irradiation of Silicon," In; *Properties of Crystalline Silicon*, Ch. 8 and 14, INSPEC, London pp. 411-475 and 731-773.
Hutter et al. (Jul. 1993) "Calibration of Atomic-Force Microscope Tips," *Rev. Sci. Instrum.* 64(7):1869-1873.
International Search Report and Written Opinion, Corresponding to International Application No. PCT/US09/32545, Mailed Apr. 9, 2009.
International Search Report and Written Opinion, Corresponding to International Application No. PCT/US09/54539, Mailed Dec. 23, 2009.
Ivers et al. (1993) "Electron-Beam Diodes Using Ferroelectric Cathodes," *J. Appl. Phys.* 73(6):2667-2671.
Jensen et al. (2010) "Emittance of a Field Emission Electron Source," *J. Appl. Phys.* 107:014903.
Jensenius et al. (May 1, 2000) "A Microcantilever-Based Alcohol Vapor Sensor-Application and Response Model," *Appl. Phys. Lett.* 76(18):2615-2617.
Johnson et al. (Jan. 17, 1992) "Applications of Simultaneous DSC/FTIR Analysis," *Thermochim. Acta* 195:5-20.
Kang et al. (2003) "Effect of Annealing Temperature on the Electron Emission Characteristics of Silicon Tips Coated with $Ba_{0.67}Sr_{0.33}TiO_3$ Thin Film," *J. Vac. Sci. Technol. B* 21(1):453-457.

Kang et al. (May/Jun. 2001) "Electron Emission from Silicon Tips Coated with Sol-Gel $(Ba_{0.67}Sr_{0.33})TiO_3$ Ferroelelctric Thin Film," *J. Vac. Sci. Technol. B* 19(3):1073-1076.
Kim et al. (2007) "Nanotopographical Imaging Using a Heated Atomic Force Microscope Cantilever Probe," *Sens. Actuators A* 136:95-103.
Kim et al. (Jun. 2009) "Thermal Conduction Between a Heated Microcantilever and a Surrounding Air Environment," *Appl. Therm. Eng.* 29(8-9):1631-1641.
King et al. (2006) "Nanoscale Thermal Analysis of an Energetic Material," *Nano Lett.* 6(9):2145-2149.
King et al. (Dec. 2002) "Design of Atomic Force Microscope Cantilevers for Combined Thermomechanical Writing and Thermal Reading in Array Operation," *J. Microelectromech. Syst.* 11(6):765-774.
King et al. (Feb. 26, 2001) "Atomic Force Microscope Cantilevers for Combined Thermomechanical Data Writing and Reading," *Appl. Phys. Lett.* 78(9):1300-1302.
Krasik et al. (Feb. 2003) "Ferroelectric Plasma Sources and Their Applications," *IEEE Trans. Plasma Sci.* 31(1):49-59.
Krebs et al. (1993) "A Low-Power Integrated Catalytic Gas Sensor," *Sens. Actuators B* 13/14:1155-1158.
Laconte et al. (Oct. 2004) "SOI CMOS Compatible Low-Power Microheater Optimization for the Fabrication of Smart Gas Sensors," *IEEE Sens. J.* 4(5):670-680.
Lai et al. (Aug. 28, 1995) "High-Speed ($10^{4°}$ C./s) Scanning Microcalorimetry with Monolayer Sensitivity (J/m2)," *Appl. Phys. Lett.* 67(9):1229-1231.
Lai et al. (Jul. 1, 1996) "Size-Dependent Melting Properties of Small Tin Particles: Nanocalorimetric Measurements," *Phys. Rev. Lett.* 77(1):99-102.
Lai et al. (Mar. 2, 1998) "Melting Point Depression of Al Clusters Generated During the Early Stages of Film Growth: Nanocalorimetry Measurements," *Appl. Phys. Lett.* 72(9):1098-1100.
Lang et al. (Aug. 2005) "Pyroelectricity: From Ancient Curiosity to Modern Imaging Tool," *Phys. Today*:31-36.
Lee et al. (1998) "Fabrication and Characterization of Silicon Field Emitter Arrays by Spin-On-Glass Etch Back," *J. Vac. Sci. Technol. B* 16(1):238-241.
Lee et al. (2003) "Classifying Combustible Gases Using Microgas Sensor Array," *Sens. Actuators B* 93:1-6.
Lee et al. (2007) "Characterization of Liquid and Gaseous Micro- and Nanojets using Microcantilever Sensors," *Sens. Actuators A* 134:128-139.
Lee et al. (2007) "Microcantilever Hotplates: Design, Fabrication, and Characterization," *Sens. Actuators A* 136:291-298.
Lee et al. (2007) "Thermal Conduction from Microcantilever Heaters in Partial Vacuum," *J. Appl. Phys.* 101:14906.
Lee et al. (2007) "Microcantilever Actuation via Periodic Internal Heating," *Rev. Sci. Instrum.* 78(12):126102.
Lee et al. (Nov. 2008) "Liquid Operation of Silicon Microcantilever Heaters," *IEEE Sens. J.* 8(11):1805-1806.
Lee et al. (2008) "Microthermogravimetry Using a Microcantilever Hot Plate with Integrated Temperature-Compensated Piezoresistive Strain Sensors," *Rev. Sci. Instrum.* 79:054901.
Lee et al. (2008) "Phase Change and Cooling Characteristics of Microjets Measured using Microcantilever Heaters," *Sens. Actuators A* 147:64-69.
Lee et al. (Dec. 2006) "Electrical, Thermal, and Mechanical Characterization of Silicon Microcantilever Heaters," *J. Microelectromech. Syst.* 15(6):1644-1655.
Lee et al. (Dec. 2008) "Differential Scanning Calorimeter Based on Suspended Membrane Single Crystal Silicon Microhotplate," *J. Microelectromechanical Syst.* 17(6):1513-1525.
Lee et al. (Mar. 15, 2002) "A Microsensor Array with Porous Tin Oxide Thin Films and Microhotplate Dangled by Wires in Air," *Sens. Actuators B Chem.* 83:250-255.
Lee et al. (May 2007) "Fabrication, Characterization and Application of Multifunctional Microcantilever Heaters," Ph.D. Dissertation, Georgia Institute of Technology.
Li et al. (2008) "Concentrated-Mass Cantilever Enhances Multiple Harmonics in Tapping-Mode Atomic Force Microscopy," *Appl. Phys. Lett.* 92(15):151903.

Lu et al. (2007) "Field Emission of Silicon Emitter Arrays Coated with Sol-Gel $(Ba_{0.65}Sr_{0.35})_{1-x}La_xTiO_3$ Thin Films," *J. Appl. Phys.* 102:014113.

Lutwyche et al. (1999) "5 x 5 2D AFM Cantilever Arrays a First Step Towards a Terabit Storage Device," *Sens. Actuators A* 73:89-94.

Lyeo et al. (Feb. 6, 2004) "Profiling the Thermoelectric Power of Semiconductor Junctions with Nanometer Resolution," *Science*, 303:816-818.

Maali et al. (2006) "Reduction of the Cantilever Hydrodynamic Damping Near a Surface by Ion-Beam Milling," *J. Appl. Phys.* 99(2):024908.

Madou (1997) "Wet Bulk Micromachining," and "Microfabrication Applications," In *Fundamentals of Microfabrication*, Ch. 4 and 10, CRC Press, Boca Raton, Florida, pp. 145-215 and 449-514.

Mamin, H.J. (1996) "Thermal Writing Using a Heated Atomic Force Microscope Tip," *Appl. Phys. Lett.* 69:433-435.

Mandelshtam et al. (1997) "Harmonic Inversion of Time Signals," *J. Chem. Phys.* 107(17):6756-6769.

Mandelshtam et al. (Sep. 8, 1998) Erratum "Harmonic Inversion of Time Signals and Its Applications," [*J. Chem. Phys.* 107:6756(1997)] *J. Chem. Phys* 109(10):4128.

Marie et al. (2002) "Adsorption Kinetics and Mechanical Properties of Thiol-Modified DNA-oligos on Gold Investigated by Microcantilever Sensors," *Ultramicroscopy* 91:29-36.

Martin et al. (2008) "Nanoscale Control of Exchange Bias with $BiFeO_3$ Thin Films," *Nano Lett.* 8(7):2050-2055.

Meier et al. (Aug. 2005) "Chemical Warfare Agent Detection Using MEMS-Compatible Microsensor Arrays," *IEEE Sens. J.* 5(4):712-725.

Melamud (2007) "Temperature-Compensated High-Stability Silicon Resonators," *Appl. Phys. Lett.* 90: 244107.

Najafi et al. (Oct. 1994) "A Micromachined Ultra-Thin-Film Gas Detector," *IEEE Trans. Electron. Dev.* 41(10):1770-1777.

Nelson et al. (2006) "Direct Deposition of Continuous Metal Nanostructures by Thermal Dip-Pen Nanolithography," *Appl. Phys. Lett.* 88(3):033104.

Nelson et al. (2007) "Measuring Material Softening with Nanoscale Spatial Resolution Using Heated Silicon Probes," *Rev. Sci. Instrum.* 78:023702.

Nelson et al. (2007) "Temperature Calibration of Heated Silicon Atomic Force Microscope Cantilevers," *Sens. Actuators A* 140:51-59.

Nelson, B.A. (May 2007) "Nanoscale Thermal Processing Using a Heated Atomic Force Microscope Tip," Ph.D. Dissertation, Georgia Institute of Technology.

Oden (1996) "Uncooled Thermal Imaging Using a Piezoresistive Microcantilever," Appl. Phys. Lett. 69(21): 3277-3279.

Olson et al. (Jun. 2003) "The Design and Operation of a MEMS Differential Scanning Nanocalorimeter for High-Speed Heat Capacity Measurements of Ultrathin Films," *J. Microelectromech. Syst.* 12(3):355-364.

Olson et al. (Feb. 1, 2005) "Size-Dependent Melting of Bi Nanoparticles," *J. Appl. Phys.* 97:034304.

Pabst et al. (2007) "Leakage Mechanisms in $BiFeO_3$ Thin Films," *Appl. Phys. Lett.* 90:072902.

Pagonis et al. (2004) "Fabrication and Testing of an Integrated Thermal Flow Sensor Employing Thermal Isolation by a Porous Silicon Membrane Over an Air Cavity," *J. Micromech. Microeng.* 14:793-797.

Pantel et al. (2010) "Switching Kinetics in Epitaxial $BiFeO_3$ Thin Films," *Appl. Phys. Lett.* 107:084111.

Park et al. (2007) "Low Temperature Characterization of Heated Microcantilevers," *J. Appl. Phys.* 101:094504.

Park et al. (2007) "Topography Imaging with a Heated Atomic Force Microscope Cantilever in Tapping Mode," *Rev. Sci. Instrum.* 78(4):043709.

Park et al. (2008) "Routine Femtogram-Level Chemical Analyses Using Vibrational Spectroscopy and Self-Cleaning Scanning Probe Microscopy Tips," *Anal. Chem.* 80:3221-3228.

Park et al. (Apr. 2007) "Frequency-Dependent Electrical and Thermal Response of Heated Atomic Force Microscope Cantilevers," *J. Microelectromech. Syst.* 16(2):213-222.

Pedrak et al. (2003) "Micromachined Atomic Force Microscopy Sensor with Integrated Piezoresistive Sensor and Thermal Bimorph Actuator for High-Speed Tapping-Mode Atomic Force Microscopy Phase-Imaging in Higher Eigenmodes," *J. Vac. Sci. Technol. B* 21(6):3102-3107.

Pinnaduwage et al. (Nov. 2004) "A Sensitive, Handheld Vapor Sensor Based on Microcantilevers," *Rev. Sci. Instrum.* 75(11):4554-4557.

Pinnaduwage et al. (Oct. 2, 2003) "A Microsensor for Trinitoluene Vapour," *Nature* 425:474.

Pintilie et al. (2009) "Orientation-Dependent Potential Barriers in Case of Epitaxial $Pt$-$BiFeO_3$-$SrRuO_3$ Capacitors," *Appl. Phys. Lett.* 94:232902.

Pogorelov et al. (2010) "Corrected Field Enhancement Factor for the Floating Sphere Model of Carbon Nanotube Emitter," *J. Appl. Phys.* 108:044502.

Privorotskaya et al. (Web Release Apr. 8, 2009) "Silicon Microcantilever Hotplates with High Temperature Uniformity," *Sens. Act. A* 152:160-167.

Rabe et al. (1996) "Vibrations of Free and Surface-Coupled Atomic Force Microscope Cantilevers: Theory and Experiment," *Rev. Sci. Instrum.* 67(9):3281-3293.

Rabe et al. (2000) "Quantitative Determination of Contact Stiffness Using Atomic Force Acoustic Microscopy," *Ultrasonics* 38(1-8):430-437.

Rasmussen et al. (2003) "Optimized Cantilever Biosensor with Piezoresistive Read-Out," *Ultramicroscopy* 97:371-376.

Ravi et al. (Nov. Dec. 1991) "Oxidation Sharpening of Silicon Tips," *J. Vac. Sci. Technol. B.* 9:2733-2737.

Reggiani et al. (2002) "Electron and Hole Mobility in Silicon at Large Operating Temperatures—Part I: Bulk Mobility," *IEEE Trans Electron Dev.* 49(3):490-499.

Remmert et al. (Oct. 2007) "Contact Potential Measurement Using a Heated Atomic Force Microscope Tip," *Appl. Phys. Lett.* 91(14):143111.

Remmert. (May 2007) "Nano Thermal and Contact Potential Analysis with Heated Probe Tips," M.S. Dissertation, Georgia Institute of Technology.

Riege (1994) "Electron Emission from Ferroelectrics—A Review," *Nuc. Instr. Meth. Phys. Res. A* 340:80-89.

Rinaldi et al. (2007) "Tuning the Dynamic Behavior of Cantilever MEMS Based Sensors and Actuators," *Sens. Rev.* 27(2):142-150.

Rinaldi et al. (2008) "Frequency Tuning AFM Optical Levers Using a Slot," *Microsyst. Technol.* 14(3):361-369.

Rosenblum et al. (1974) "Thermally Stimulated Field Emission from Pyroelectric $LiNbO_3$," *App. Phys. Lett.* 25:17-19.

Rosenman et al. (1984) "Electron Emission During the Switching of Ferroelectric Lead Germanate," *J. Exp. Theor. Phys. Lett.* 39:477-480.

Rosenmann et al. (Dec. 2000) "Electron Emission from Ferroelectrics," *J. Appl. Phys.* 88(11):6109-6161.

Roylance et al. (Dec. 1979) "A Batch-Fabricated Silicon Accelerometer," *IEEE Trans. Elec. Dev.* 26(12):1911-1917.

Rozenman et al. (Dec. 1980) "Exoelectron Emission Accompanying the Transverse Piezoelectric Effect in Lithium Niobate," *Sov. Tech. Phys. Lett.* 6(12):661-662; English translation of; *Pis'ma Zh. Tekh. Fiz.* 6, 1531 (1980).

Sadewasser (2006) "Special Cantilever Geometry for the Access of Higher Oscillation Modes in Atomic Force Microscopy," *Appl. Phys. Lett.* 89(3):3.

Sadewasser et al. (2006) "Modified Atomic Force Microscopy Cantilever Design to Facilitate Access of Higher Modes of Oscilllation," *Rev. Sci. Instrum.* 77:073703.

Sahin et al. (2004) "High-Resolution Imaging of Elastic Properties Using Harmonic Cantilevers," *Sens. Actuators A: Physical* 114(2-3):183-190.

Salmain et al. (1991) "Fourier Transform Infrared Spectroscopic Method for the Quantitative Trace Analysis of Transition-Metal Carbonyl-Labeled Bioligands," *Anal. Chem.* 63:2323-2329.

Sberveglieri et al. (Aug. 1997) "Silicon Hotplates for Metal Oxide Gas Sensor Elements," *Microsyst. Tech.* 3:183-190.

Seidel et al. (2009) "Conduction at Domain Walls in Oxide Multiferroics," *Nature Mat.* 8:229-234.

Semancik et al. (1998) "Kinetically Controlled Chemical Sensing Using Micromachined Structures," *Acc. Chem. Res.* 31:279-287.

Shannon et al. (1997) "Dual Mode Electron Emission from Ferroelectric Ceramics," *Appl. Phys. Lett.* 70:1625-1627.

Sharp et al. (1982) "Use of Low-Frequency Sinusoidal Temperature Waves to Separate Pyroelectric Currents from Nonpyroelectric Currents. Part II: Experiment," *J. Appl. Phys.* 53:8980-8987.

Sheehan et al. (Aug. 30, 2004) "Nanoscale Deposition of Solid Inks via Thermal Dip Pen Nanolithography," *Appl. Phys. Lett.* 85(9):1589-1591.

Sheng et al. (Jun. 25, 1998) "A Low-Power CMOS Compatible Integrated Gas Sensor Using Maskless Tin Oxide Sputtering," *Sens. Actuators B. Chem.* 49:81-87.

Shirke et al. (May-Jun. 2007) "Femtomolar Isothermal Desorption Using Microhotplate Sensors," *J. Vac. Sci. Technol. A* 25:514-526.

Shur et al. (1996) "Plasma-Assisted Electron Emission from (Pb,La)(Zr,Ti)$O_3$ Ceramic Cathodes," *J. Appl. Phys.* 79:3669-3674.

Shur et al. (1996) "Surface Discharge Plasma Induced by Spontaneous Polarization Switching," *Appl. Phys. Lett.* 70:574-576.

Shur et al. (1998) "A High-Perveance Ferroelectric Cathode with a Narrowed Electron Energy Spread," *J. Phys. D: Appl. Phys.* 31:1375-1382.

Shur et al. (1999) "Two Modes of Plasma-Assisted Electron Emission from Ferroelectric Ceramics," *J. Phys. D: Appl. Phys.* 32:L29-L33.

Solzbacher et al. (2003) "A Comprehensive Analytical and Numerical Analysis of Transient and Static Micro Hotplate Characteristics," In; *Transducers '03*, The 12$^{th}$ international Conference on Solid State Sensors, Actuators and Microsystems, Boston, : 1856-1859.

Solzbacher et al. (Jun. 10, 2000) "A Modular System of SiC-Based Microhotplates for the Application in Metal Oxide Gas Sensors," *Sens. Actuators B Chem.* 64:95-101.

Spannhake et al. (2007) "$SnO_2$: Sb—A New Material for High-Temperature MEMS Heater Applications: Performance and Limitations," *Sens Actuators B Chem.* 124:421-428.

Sprunt et al. (Sep. 1997) "Simultaneous FT-Raman Differential Scanning Calorimetry Measurements Using a Low-Cost Fiber-Optic Probe," *Appl. Spectrosc.* 51:1410-1414.

Stark (Nov. 2004) "Optical Lever Detection in Higher Eigenmode Dynamic Atomic Force Microscopy," *Rev. Sci. Instrum.* 75(11):5053-5055.

Stark et al. (May 31, 1999) "Tapping-Mode Atomic Force Microscopy and Phase-Imaging in Higher Eigenmodes," *Appl. Phys. Lett.* 74(22):3296-3298.

Su et al. (2002) "Characterization of a Highly Sensitive Ultra-Thin Piezoresistive Silicon Cantilever Probe and Its Application in Gas Flow Velocity Sensing," *J. Micromech. Microeng.* 12:780-785.

Suehle et al. (Mar. 1993) "Tin Oxide Gas Sensor Fabricated Using CMOS Micro-Hotplates and In situ Processing," *IEEE Electron Dev. Lett.* 14(3):118-120.

Sulchek et al. (May 2000) "High-Speed Atomic Force Microscopy in Liquid," *Rev. Sci. Instrum.* 71(5):2097-2099.

Sunden et al. (2006) "Room-Temperature Chemical Vapor Deposition and Mass Detection on a Heated Atomic Force Microscope Cantilever," *Appl. Phys. Lett.* 88:033107.

Szoszkiewicz et al. (2007) "High-Speed, Sub-15 nm Feature Size Thermochemical Nanolithography," *Nano Lett.* 7(4):1064-1069.

Thundat et al. (Feb. 1, 1995) "Vapor Detection Using Resonating Microcantilevers," *Anal. Chem.* 67(3): 519-521.

Thundat et al. (Mar. 27, 1995) "Detection of Mercury Vapor Using Resonating Microcantilevers," *Appl. Phys. Lett.* 66(13):1695-1697.

Thundat et al. (May 23, 1994) "Thermal and Ambient-Induced Deflections of Scanning Force Microscope Cantilevers," *Appl. Phys. Lett.* 64(21):2894-2896.

Tortonese et al. (Feb. 22, 1993) "Atomic Resolution with an Atomic Force Microscope Using Piezoresistive Detection," *Appl. Phys. Lett.* 62(8):834-836.

Triantafyllopoulou et al. (2006) "Alternative Micro-Hotplate Design for Low Power Sensor Arrays," *Microelectron. Eng.* 83:1189-1191.

Tsamis et al. (Oct. 15, 2003) "Thermal Properties of Suspended Porous Silicon Micro-Hotplates for Sensor Applications," *Sens. Actuators B Chem.* 95:78-82.

Udrea et al. (Aug. 30, 2001) "Design and Simulations of SOICMOS Micro-Hotplate Gas Sensor," *Sens. Actuators B Chem.* 78:180-190.

Unal et al. (2006) "Ultrafast Molecule Sorting and Delivery by Atomic Force Microscopy," *Appl. Phys. Lett.* 88: 183105.

Unal et al. (2007) "Nanoscale Quantitative Stress Mapping with Atomic Force Microscopy," *Appl. Phys. Lett.* 90: 113111.

Varesi et al. (1998) "Scanning Joule Expansion Microscopy at Nanometer Scales," *Appl. Phys. Lett.* 72(1):37-39.

Vettiger et al. (Mar. 2002) "The 'Millipede'—Nanotechnology Entering Data Storage," *IEEE Trans. Nanotechnol.* 1(1):39-55.

Vodopyanov et al. (2003) "Pulsed Mid-IR Optical Parametric Oscillators," In *Solid-State Mid-Infrared Laser Sources*; Sorokina et al. Eds. *Topics Appl. Phys.* 89:141-178.

Washburn et al. (2005) "Micro-Flame Ionization Detection Using a Catalytic Micro-Combustor," *2005 IEEE Sensors* :322-325.

Wiche et al. (Sep. 23, 2005) "Thermal Analysis of Silicon Carbide Based Micro Hotplates for Metal Oxide Gas Sensors," *Sens. Actuators A. Phys.* 123-124:12-17.

Williams et al (1986) "Scanning Thermal Profiler," *Appl. Phys. Lett.* 49(23):1587-1589.

Wu et al. (Sep. 2001) "Bioassay of Prostate-Specific Antigen (PSA) using Microcantilevers," *Nat. Biotechnol.*19:856-860.

Xiao et al. (2008) "Large Pyroelectric Effect in Undoped Epitaxial Pb(Zr, Ti)$O_3$ Thin Films on $SrTiO_3$ Substrates," *Appl. Phys. Lett.* 93:052913.

Yang et al. (2006) "Nano-Mechanical Electro-Thermal Probe Array Used for High-Density Storage Based on NEMS Technology," *Microelec. Reliability* 46:805-810.

Yang et al. (2010) Above-Bandgap Voltages from Ferroelectric Photovoltaic Devices, *Nature Nanotechnol.* 5:143-147.

Yu et al. (Jul. 19, 2010) "Interface Ferromagnetism and Orbital Reconstruction in $BiFeO_3$-$La_{0.7}Sr_{0.3}MnO_3$ Heterostructures," *Phys. Rev. Lett.* 105:027201.

Zeches et al. (Nov. 13, 2009) "A Straindriven Morphotropic Phase Boundary in $BiFeO_3$," *Science* 326(5955):977-980.

Zeyen et al. (2007) "Design and test of a novel higher harmonic imaging AFM probe with a dedicated second cantilever for harmonic amplification," Transducers and Eurosensors '07—14th International Conference on Solid-State Sensors, Actuators and Microsystems :1545-1548.

Zeyen et al. (2008) "Preamplifying cantilevers for contact resonance mode imaging," Solid-State Sensors, Actuators, and Microsystems Workshop, Hilton Head Island, South Carolina, Jun. 1-5, 44-47.

Zeyen et al. (2009) "Preamplifying Cantilevers for Dynamic Atomic Force Microscopy," *Appl. Phys. Lett.*, 94:103507.

Zhang et al. (Feb. 2011) "Large Field-Induced Strains in a Lead-Free Piezoelectric Material," *Nature Nanotechnol.* 6:98-102.

Zhang et al. (Aug. 2007) "Nanoscale Calorimetry Using a Suspended Bridge Configuration," *J. Microelectromech Syst.* 16(4):861-871.

Zhang et al. (Feb. 14, 2006) "A Micro-Pirani Vacuum Gauge Based on Micro-Hotplate Technology," *Sens. Actuators A Phys.* 126:300-305.

Zhang et al. (Jan. 17, 2005) "Thermal Characterization of Liquids and Polymer Thin Films Using a Microcalorimeter," *Appl. Phys. Lett.* 86(3):034101.

Zhang et al. (Oct. 15, 2000) "Size-Dependent Melting Point Depression of Nanostructures: Nanocalorimetric Measurements," *Phys. Rev. B. Condens Matter* 62(15):10548-10557.

Zhao et al, (2006) "Thermal Contributions to the Bending of Bimaterial Cantilever Sensors," *Appl. Phys. Lett.* 89:033110.

Zhong et al. (1993) "Fractured Polymer Silica Fiber Surface Studied by Tapping Mode Atomic-Force Microscopy," *Surf. Sci.* 290(1-2):L688-L692.

U.S. Appl. No. 12/865,490, filed Dec. 7, 2010, Publication No. 2011/0078834, dated Mar. 31, 2011.

U.S. Appl. No. 12/558,150, filed Sep. 11, 2009, Publication No. 2011/0061452, dated Mar. 17, 2011.

U.S. Appl. No. 13/059,812, filed Apr. 15, 2011, Publication No. 2011/0268148, dated Nov. 3, 2011.

\* cited by examiner

MAGNETIC ACTUATION AND THERMAL CANTILEVERS FOR TEMPERATURE AND FREQUENCY DEPENDENT ATOMIC FORCE MICROSCOPY

CROSS REFERENCE TO RELATED APPLICATION

This application claims the benefit of and priority to U.S. Provisional Application 61/523,572, filed on Aug. 15, 2011, which is hereby incorporated by reference in its entirety.

STATEMENT REGARDING FEDERALLY SPONSORED RESEARCH OR DEVELOPMENT

This invention was made with governmental support under NSF-IIP-1047437 awarded by the National Science Foundation and FA9550-08-1-0407 awarded by the Air Force Office of Scientific Research. The government has certain rights in the invention.

BACKGROUND

The atomic force microscope (AFM) enables nanomechanical measurements with high spatial resolution. Some AFM imaging modes require the cantilever tip to oscillate in contact with or near the surface. The cantilever oscillation can be actuated with piezoelectric, electrostatic, photothermal, thermomechanical or magnetic schemes.

The first papers reporting magnetic actuation of a microcantilever used a magnetic coating or particle on cantilever and an external AC field. The presence of the magnetic material on the cantilever comes with challenges in fabrication and implementation. Buguin and co-workers proposed an improved Lorentz force actuation scheme, where the magnet was external to the cantilever as described in and U.S. Pat. No. 6,862,923. In this scheme, the actuation was driven by an AC current flowing through a cantilever current loop in the presence of an external magnetic field. Buguin taught the use of a uniform magnetic field oriented substantially perpendicular to the current loop. A related approach by Enders and co-workers analyzed cantilever excitation spectra induced by Lorentz force and studied thermomechanical spectrum at high power. A Lorentz force actuation scheme is market commercially by Asylum Instruments for actuation of soft cantilevers in fluid, called the "iDrive™ Fluid Imaging Option."

Similarly, U.S. Patent Application Publication US 2011/0126329 discloses a magnetically actuated cantilever chip including a centrally supported cantilever having a magnetic element positioned on the cantilever body at an end opposite to the probe tip. Actuation of the cantilever is accomplished by flowing a current through a loop on the cantilever chip positioned nearby to the magnetic element to induce a local oscillation at the magnetic element. Here both the magnetic elements and current loops are constructed to generate extremely localized interactions to permit independent operation of arrays of cantilevers.

U.S. Pat. No. 6,668,627 discloses a magnetically excited cantilever. Here, the cantilever is placed in a magnetic field and a current is passed through a loop in/on the cantilever to induce vibrations. The cantilever devices include chemically sensitive films for use as highly sensitive chemical sensors. The cantilever devices are non-heating and are designed to limit heat generation in the devices to minimize the impact of heat on and achieve non-interference with the chemically sensitive films.

Within the field of AFM, self-heating AFM cantilever probes have been developed. An example is shown in FIG. 1. These probes are described for example in U.S. Pat. No. 7,497,613, which is incorporated by reference. These cantilever probes 101 have conductive arms 103 and include a resistive heater 107 in the vicinity of the tip of the end 106 of the cantilever structure. When current is directed through the resistive heater, the dissipated power heats the cantilever and tip such that a microscopic region of a sample can be locally heated. The probe tips are very sharp, <20 nm end radius and thus can be used to measure thermomechanical properties of materials on the sub-micron and sub-100 nm length scales. With these probes it has been possible to investigate the nanometer-scale thermal properties of materials and perform nanometer-scale lithography.

Contact Resonance AFM

One measurement mode of AFM is called contact-resonance AFM (CR-AFM). This technique is described in various publications by Yamanaka, Rabe and Arnold, Yuya, Turner and Hurley, Stan and Cook for example, and patents including U.S. Pat. No. 6,983,644. In this mode a cantilever is oscillated with its probe tip in contact with a sample surface. With this arrangement, the cantilever will resonate at frequencies that are dependent on the mechanical properties of both the cantilever and the sample. By measuring shifts in these frequencies, the mechanical properties of a sample can be inferred. A major challenge with CR-AFM has been the method of actuating the cantilever. Most researchers use piezoelectric actuators or ultrasound transducers to excite cantilever resonances. While these can work, they suffer from bandwidth and power limitations, and parasitic resonances. The current inventors found that these parasitic resonances can be particularly problematic while performing measurements of sample mechanical properties as a function of temperature. The reason is that the mechanical properties of a polymeric material can change dramatically as a function of temperature. As such, during variable temperature measurements, it is increasingly likely that a contact resonance frequency of the cantilever can sweep through a parasitic resonance, thus compromising the quality of the measurement.

Dynamic Mechanical Analysis

A very commonly used instrument for characterizing the bulk properties of a material is dynamic mechanical analysis (DMA). DMA works by applying an oscillating stress to a sample and measuring the time-dependent strain, or the strain rate. Analysis of DMA data gives information about material stiffness, viscosity, thermal transitions and activation energies, for example. DMA is a critical and widely used tool to measure the viscoelastic properties of bulk materials, but suffers from extremely slow measurement speed and complete lack of spatially resolved information. Large and growing material classes employ nanoscale composite structures to achieve desired material properties. Conventional DMA cannot measure the local behavior within these heterogeneous materials, producing only information about the aggregate bulk behavior. There is a growing need for instrumentation that can characterize micro and nano-structured materials on the length scales they are engineered.

Some attempts have been made to address this issue, including phase imaging, pulsed force microscopy, nanothermal analysis, and nanoDMA. Phase imaging (U.S. Pat. RE36,488) involves measuring changes in the cantilever oscillation phase while in tapping mode. These variations can illuminate variations in damping, friction, adhesion and elasticity, but cannot easily distinguish or quantify between these effects. Nanothermal analysis (nanoTA) has been commercialized by Anasys Instruments. NanoTA records the cantilever deflection while ramping the tip temperature with self-heated cantilevers. NanoTA can identify glass transitions on some materials by observing changes in slope of the deflection versus temperature curve. It has been successful on many materials, but can fail on some samples, especially those that are highly crosslinked, highly crystalline, and/or very thin, e.g. <100 nm.

A commercial instrument called nanoDMA has been developed by the Hysitron company. It applies an oscillating force to a sample surface using a sharp tip. The maximum oscillation frequency reported by the manufacturer is 300 Hz, roughly similar to conventional dynamic mechanical analyzers (DMA). It also suffers from slow measurement speeds similar to conventional DMA, as discussed below.

The slow measurement speed of DMA and similar bulk measurements results in large part from the macroscopic scale of the heated region of the sample and attendant instrumentation. The sample and often a significant portion of the DMA apparatus is typically enclosed in a large temperature controlled enclosure. Because of the large volume that must be heated and cooled, it is not uncommon to employ heating/cooling rates in the range of 1-10° C. per minute. It is also not uncommon to wait for 30 minutes or more for the system to stabilize at each temperature. Thus to characterize the viscoelastic properties of a sample at a significant plurality of frequencies and temperatures can take hours to days.

Modern materials are also subject to stresses and strains over an extremely wide range of frequencies from static loads up to high vibrations encountered in automotive and aerospace applications, to extreme shocks encountered in impact and ballistic applications. No current tool can rapidly examine the temperature dependent viscoelastic response of these materials on the length scales they are being engineered. Further, no current tool can examine material properties on this length scale and over the wide range of strain rates encountered by modern materials.

SUMMARY

Embodiments of the invention involves the direct force actuation of the tip of self-heatable cantilever for the characterization and manipulation of material at the sub-micron and nanometer scale over a wide range of time scales, frequencies, and temperatures. Using a self-heating cantilever in combination with Lorentz force actuation, embodiments have achieved material characterization with a frequency range, temperature range, and measurement speed previously unavailable in the prior art. Specifically, the inventors have achieved a strain frequency ~1000× higher than conventional DMA and a measurement throughput around ~1000× higher than conventional DMA or conventional variable temperature AFM. These improvements are achieved, for example, due to the high force bandwidth and large available force of the Lorentz force actuation, the high heating rates of the self-heatable cantilevers, and the microscopic regions of the sample that are heated.

Referring to FIG. 1, a self-heating cantilever embodiment comprising two conducting cantilever arms and an end region with a heater and a tip is interacted with a magnetic field from a magnetic field source. In embodiments, the magnetic source is a permanent magnet and/or an electromagnet. When current flows through the arms and heater region of the cantilever, a Lorentz force can act on the cantilever. Selection of an appropriate direction for the magnetic field can result in a large force on the cantilever, on the scale of many nanonewtons (nN) up to several micronewtons (μN). This force is sufficient for many purposes and embodiments including direct force actuation of the probe tip into the sample, force modulation, intermittent contact, active force control, and forced-based lithography, for example. In an embodiment where the two arms of the cantilever are parallel, the magnetic interactions can be arranged such that the net force on the parallel cantilever arms is zero or nearly zero, resulting in a magnetic force primarily at the tip end of the cantilever. This can provide substantial benefit, for example, for application of force to the sample, since the force is applied very close to the tip, with minimal intervening mechanical structure that can attenuate the force. This is in contrast to many techniques for oscillating AFM cantilevers where the force is applied at the base of the cantilever (most piezoelectric actuation schemes). It is also in contrast to other capacitive and magnetic techniques that apply a force over an extended area of the cantilever. In embodiments when the force is applied close to the tip, rather than along some portion of the cantilever body, more direct control of the tip-sample interaction can be maintained. The prior art arrangement that applies force at the base or along the body or some portion of the body can limit both the magnitude and frequency of forces that can be applied to the tip. For example, forces applied at the base or body of the cantilever at frequencies above the first resonant frequency of the cantilever are dramatically attenuated by the transfer function of the cantilever. Applying the force near the free end, for example, can also allow the cantilever to operate more efficiently compared to force application at some other location, due to the torque or moment on the cantilever that is maximized when a force is applied at the free end rather than at some position farther from the free end.

Another benefit of embodiments of the current invention is the ability to rapidly measure a material response as a function of both temperature and frequency. Embodiments of the current invention have dramatic benefits over the prior art as they can explore the frequency and temperature dependence of a material response from room temperature or below to 500° C. and up to 3 MHz in a less than 1 minute and as short as a few seconds. In conventional DMA, measurements at such frequencies are impossible for measurements over this broad a temperature range. Embodiments of the current invention can achieve this performance, for example, because the self-heatable AFM probes only heat a microscopically small region of the sample, compared to the entire sample and significant part of the apparatus for variable temperature AFM and DMA. Because of the microscopic heating area, the sample temperature can stabilize in milliseconds or less, thus supporting extremely fast temperature ramp rates. The inventors have demonstrated temperature ramp rates as high as 600,000° C. per minute, compared to 1-10° C./minute commonly used in variable temperature DMA and AFM. Even much more modest heating rates of 600° C./minute achieve dramatic benefits over the prior art.

Embodiments of the current invention also benefit from a very high strain frequency range. The Lorentz mechanism can optionally apply forces at arbitrarily high frequencies. The practical limit for certain embodiments is set by the maximum frequency that the AC current can be driven through the cantilever, as limited by the resistance, inductance, and capacitance of the self-heatable probe and associated wiring. Without special preparation, in embodiments the inventors have delivered current to the probe and hence Lorentz forces to the tip up to 3 MHz. Higher bandwidths can be achieved using shielding techniques used, for example, in scanning microwave microscopy or scanning impedance microscopy. These can include planar or coaxial waveguide integrated into the cantilever probe and/or specialized shielding techniques used to minimize stray capacitance and optimize the impedance matching between the source and load. Higher bandwidths could also be achieved by using a microcantilever that has been engineered with different electronic properties, for example resistance, inductance, or capacitance. These electronic properties could be modified without modifying the thermal or mechanical properties of such heated cantilever probes. Such techniques are known to those skilled in the art.

In a specific aspect, provided are methods of operating a probe microscope. Methods provided herein are useful, for example, for characterizing a region of a sample with submicron spatial resolution. A specific method of this aspect comprises the steps of: interacting a probe tip of a self-heating cantilever probe with a surface of the sample; providing a magnetic source that generates a magnetic field in proximity to the cantilever probe; and passing a current through the self-heating cantilever probe so as to generate a force on the cantilever probe due to an interaction between the current and the magnetic field. Optionally, the method further comprises a step of measuring a signal indicative of the motion of the cantilever probe. In a specific embodiment, the magnetic field is substantially aligned along the length of the cantilever probe. In a specific embodiment, the cantilever probe comprises two substantially parallel arms such that a Lorentz force on each of the two arms substantially cancels and a primary net force is generated at a tip end of the cantilever probe.

Optionally, for methods of this aspect, the current is an alternating current, for example comprising an alternating current at one or more frequencies. In such embodiments, an oscillatory force is optionally generated on the cantilever. Optionally, the current passing step is repeated at a plurality of frequencies and the method further comprises a step of measuring a frequency dependent response of the cantilever probe interacting with the sample surface. In one embodiment, a frequency of the oscillatory force is greater than 10 kHz. In one embodiment, a frequency of the oscillatory force is greater than 100 kHz. Optionally, methods of this aspect further comprise a step of determining a contact resonant frequency of the cantilever probe. Optionally, methods of this aspect further comprise a step of measuring a viscoelastic response of the sample.

In embodiments, a number of techniques are useful for measuring the temperature of a cantilever and/or the cantilever probe tip. In one embodiment, the cantilever resistance and/or I-V characteristics are used to measure the cantilever temperature, as described, for example, in the following references, hereby incorporated by reference to the extent not inconsistent herewith: Lee, J., T. L. Wright, T. Beecham, B. A. Nelson, S. Graham, W. P. King, "Electrical, Thermal, and Mechanical Characterization of Silicon Microcantilever Heaters," Journal of Microelectromechanical Systems, 15, 1644-1655, 2006. Nelson, B. A., and W. P. King, "Temperature Calibration of Heated Silicon Atomic Force Microscope Cantilevers," Sensors and Actuators A, 140, 51-59, 2007. In embodiments, cantilever frequency characteristics are used for measuring the cantilever temperature, as described, for example, in the following reference, hereby incorporated by reference to the extent not inconsistent herewith: Lee, J., T. L. Wright, T. Beecham, B. A. Nelson, S. Graham, W. P. King, "Electrical, Thermal, and Mechanical Characterization of Silicon Microcantilever Heaters," Journal of Microelectromechanical Systems, 15, 1644-1655, 2006. In embodiments, the cantilever bending or mechanical strain is used to measure the cantilever temperature, as described, for example, in the following reference, hereby incorporated by reference to the extent not inconsistent herewith: J. Zhao, R. Berger, and J. S. Gutmann, "Thermal contributions to the bending of bimaterial cantilever sensors," Applied Physics Letters 89, 033110, 2006. The temperature of the cantilever probe tip can also be separately calibrated, for example, by interacting the probe tip with a material of known melting temperature. The cantilever can be heated until the melting is detected by the cantilever probe. Calibration curves can be created that correlate the inferred tip temperature at melt versus the applied heater voltage, current, power and/or other similar control parameters. The probe tip temperature can then be estimated on an unknown sample by applying the calibration curve for the voltage, current, or power etc. used for a given measurement. For example, one of the assignees, Anasys Instruments, employs calibration samples of polyethylene terepthalate (PET), polycaprolactone (PCL), and high density polyethylene (HDPE) as melt calibration standards.

In certain embodiments, the cantilever probe comprises a heater region, for example having an electrical resistivity selected over the range of $1 \times 10^{-5}$ $\Omega$-cm to 15 $\Omega$-cm. In one embodiment, a heater region comprises a thermistor. Thermistors are useful for simultaneously or alternately heating and measuring a temperature, for example by measuring a resistance of the thermistor. U.S. Pat. No. 7,928,343 and U.S. Patent Application Publication US 2011/0078834, hereby incorporated by reference, describes cantilevers and methods of making cantilevers including cantilevers comprising heater-thermometers as well as details regarding calibration of temperature versus measured heater-thermometer resistance.

Optionally, methods of this aspect further comprise a step of using the cantilever probe to change a temperature of a region of a sample and repeating the current passing step at a plurality of temperatures. Optionally, methods of this aspect further comprise a step of controlling a temperature of the cantilever probe. In specific embodiments, the temperature of the cantilever probe is ramped at a rate of more than 100° C./minute. In a specific embodiment, the step of controlling a temperature of the cantilever probe comprises heated the cantilever probe to a temperature selected over the range of 25° C. to 1000° C., for example when in an air environment at room temperature. Higher or lower selected temperatures are also possible when the cantilever is in an environment other than air, such as gaseous environments, vacuum or reduced pressure environments, or liquid environments, such as water or buffer solution environments. Higher or lower selected temperatures are also possible when the cantilever is in an environment that is at a temperature other than room temperature.

In one embodiment, the step of controlling a temperature of the cantilever probe comprises heating the cantilever probe by a temperature of more than 1° C., by a temperature of more than 3° C., by a temperature of more than 5° C., by a temperature of more than 10° C., by a temperature of more than 25° C., by a temperature of more than 50° C., by a temperature of more than 75° C. or by a temperature of more than 100° C. In another embodiment, the step of controlling a temperature of the cantilever probe comprises maintaining the temperature of the cantilever probe at a constant or a substantially constant value. In certain contexts, maintaining the temperature of the cantilever probe at a substantially constant value comprises maintaining the temperature of the cantilever probe within 1° C. of a selected temperature over a period of 1 μs or more, over a period of 10 μs or more, over a period of 100 μs or more, over a period of 1 ms or more, over a period of 10 ms or more, over a period of 100 ms or more or over a period of 1 s or more. For example, in one embodiment, the step of maintaining a temperature of a cantilever probe at a substantially constant value comprises providing a voltage or current to a self-heating cantilever probe to heat the cantilever probe to the constant temperature value and controlling the magnitude of the voltage or current to a level sufficient to maintain the temperature of the cantilever probe at the constant temperature value. Optionally, the temperature of the cantilever probe can be monitored, for example continuously or periodically, to provide an indication that an increased or reduced current or voltage is necessary for maintaining the temperature of the cantilever probe at the constant temperature value. In one embodiment, the temperature of the cantilever probe is monitored by measuring a resistance across a heating element of the cantilever probe. Optionally, a cantilever probe is provided in electrical communication with a temperature measurement system, for example a system that produces a signal indicative of a tip-sample temperature. Useful signals for measuring a cantilever temperature in this manner include, but are not limited to, cantilever resistance, cantilever I-V characteristics, cantilever frequency, cantilever frequency characteristics, cantilever bending characteristics and cantilever mechanical strain.

In an embodiment, a method of this aspect further comprises the step of determining a thermal transition temperature of the region of the sample by detecting a change in oscillatory motion of the cantilever probe as a function of temperature in response to an AC current passed through the cantilever probe. In a specific embodiment, the thermal transition is a glass transition.

Useful samples include those comprising a thin film having a thickness of less than 100 nm. Useful samples include those comprising a filled polymer having a fill percentage of greater than 10% by volume. Useful samples include those comprising a polymer having a crystallinity percentage greater than 10% by volume. Useful samples include those comprising a polymer having a crosslink percentage greater than 10% by volume.

In certain embodiments, the step of determining a contact resonant frequency is repeated at a plurality of cantilever probe temperatures. Useful embodiments include those further comprising the step of determining a thermal transition temperature of a region of the sample surface by detecting a change in the contact resonance frequency of the cantilever probe as a function of temperature.

One method embodiment of this aspect further comprises the step of calculating a signal indicative of a viscoelastic property of a region of the sample at a plurality of temperatures. Useful viscoelastic properties include those comprising a property selected from the group consisting of: E', E", tan(delta) and any combination of these. Optionally, a method of this aspect further comprises the step of applying time temperature superposition to generate a master curve of the viscoelastic property of the region of the sample. Optionally, a method of this aspect further comprises a step of using time-temperature superposition factors to calculate an activation energy of the region of the sample.

Optionally, certain methods of this aspect further comprise the step of repeating the passing step at a plurality of regions of the sample to create a spatially resolved map of a property of the sample. Optionally, the property of the sample is selected from the group consisting of: topography, elasticity, damping, storage modulus, loss modulus, tan(delta), glass transition temperature, melting temperature and any combination of these.

Optionally, certain methods of this aspect further comprise the step of adjusting a frequency of AC current passed through the cantilever probe such that the frequency substantially corresponds to a resonance frequency of the cantilever probe. For example, in one embodiment, the resonance frequency corresponds to a contact resonant frequency of the cantilever probe in contact with the sample.

Optionally, certain methods of this aspect further comprise the step of controlling the force on the cantilever probe. In one embodiment, the step of controlling the force on the cantilever probe comprises providing a change in frequency, a change in magnitude or both changes in frequency and magnitude of the current passing through the self-heating cantilever probe.

In another aspect, provided are other methods of operating a probe microscope, for example to characterize a region of a sample with sub-micron spatial resolution. A specific method of this aspect comprises the steps of: interacting a probe tip of a cantilever probe with a surface of the sample; providing a magnetic source that creates a magnetic field in proximity to the cantilever probe; passing a current through the cantilever probe so as to generate a force on the cantilever probe due to an interaction between the current and the magnetic field, wherein the cantilever probe comprises two substantially parallel conductive arms and a conductive end region; and measuring a signal indicative of the motion of the cantilever. Optionally, the current comprises an alternating current at one or more frequencies, thereby generating an oscillatory force on the cantilever probe.

In one embodiment, a method of this aspect further comprises the step of repeating the passing and measuring steps at a plurality of frequencies and measuring a frequency dependent response of the cantilever probe interacting with the sample surface. Another method of this aspect further comprises the step of determining a contact resonant frequency of the cantilever probe in contact with the sample.

In another embodiment, provided is an apparatus for characterizing a region of a sample with sub-micron spatial resolution. Apparatuses of this aspect are useful, for example, in the foregoing methods. An embodiment of this aspect comprises: a cantilever probe comprising an integrated heater and a probe tip; a magnetic source positioned proximate to the cantilever probe; an AC current source positioned in electrical communication with the cantilever probe, the AC current source for driving a current through the integrated heater of the cantilever probe to generate a Lorentz force on the cantilever probe; and a deflection measurement system positioned to measure a signal indicative of an oscillatory motion of the cantilever probe. Optionally, the cantilever probe comprises two substantially parallel arms.

Optionally, embodiments of this aspect further comprise additional components. For example, an embodiment further comprises a DC current source positioned in electrical communication with the cantilever probe, the DC current source for driving, current through the integrated heater of the cantilever probe to adjust the static temperature of the cantilever probe. Optionally, an embodiment further comprises a demodulator positioned in electrical communication with the deflection measurement system, the demodulator for determining a property of the oscillatory motion of the cantilever probe, wherein the property is selected from the group consisting of: amplitude, phase, frequency and any combination of these.

Optionally, an embodiment further comprises a self-resonance tracker positioned in electrical communication with the deflection measurement system and the AC current source, the self-resonance tracker for adjusting a frequency of AC current through the integrated heater of the cantilever probe to maintain the oscillatory motion substantially at a resonant frequency of the cantilever probe. In one embodiment, the self-resonance tracker adjusts a frequency of AC current to a contact resonant frequency of the cantilever.

In one embodiment, the cantilever probe further comprises two substantially parallel arms. Optionally, the magnetic source is arranged substantially parallel to the length of the two substantially parallel arms. In a specific embodiment, Lorentz forces in the two substantially parallel arms substantially cancel such that that a primary net force on the cantilever probe occurs at a tip end of the cantilever probe.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Figure 1:
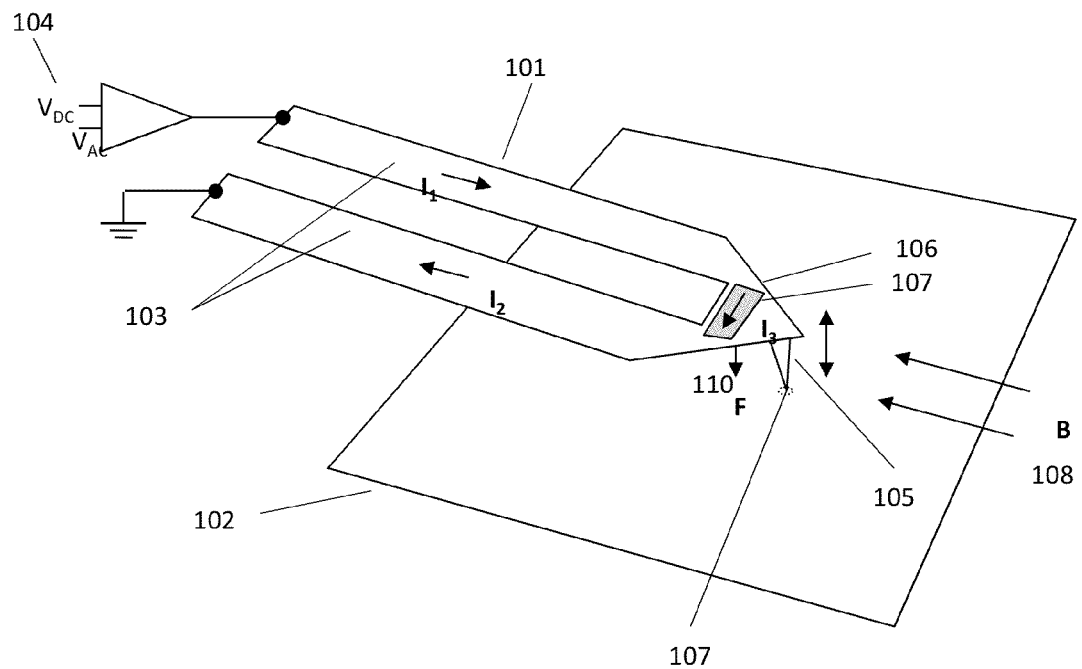
FIG. 1 is a simplified schematic diagram of Lorentz actuation of a self-heated cantilever.

In general the terms and phrases used herein have their art-recognized meaning, which can be found by reference to standard texts, journal references and contexts known to those skilled in the art. The following definitions are provided to clarify their specific use in the context of the invention.

"Thermal contact" and "thermal communication" are used synonymously and refer to an orientation or position of elements or materials, such as a heater-thermometer and a conductive tip, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 μm or less. In some embodiments, elements in thermal communication with one another are also provided in physical contact.

"Electrical contact" and "electrical communication" refers to the arrangement of one or more objects such that an electric current efficiently flows from one object to another. For example, in some embodiments, two objects having an electrical resistance between them less than 100Ω are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. "Electrical communication" also refers to a configuration of two or more components such that an electronic signal or charge carrier can be directly or indirectly transferred from one component to another. In some embodiments, two components in electrical communication are in data communication, such that a signal value or digital data can be exchanged between the two components. As used herein, electrical communication includes one way and two way electrical communications. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

"Cantilever" refers to a structure having at least one fixed, or attached end, such as a microcantilever of an atomic force microscope or nano-materials sensor. Cantilevers include microcantilevers and nanocantilevers having a free ended cantilever configuration or having a clamped-clamped cantilever configuration. A cantilever generally comprises a tip, for example useful for probing properties of a surface, such as contours, morphology, composition, etc. In some embodiments, microcantilevers have dimensions on the order of 1 to 1000 µm. Useful cantilevers comprise those having any useful shape, including platform or rectangular shaped cantilevers, circular shaped cantilevers, ladder shaped cantilevers, U-shaped cantilevers, triangular shaped cantilevers, and cantilevers having cutout portions. "Rectangular cantilever" specifically refers to a cantilever having a platform type shape, with a length, a width and a height. Rectangular cantilevers also include embodiments where there are one or more cutout portions. For some embodiments, a "cutout portion" refers to a region of a cantilever where material is removed from a cantilever that would be an otherwise monolithic body. For specific embodiments, a cutout portion refers to regions within a cantilever that comprise air or other material which do not allow efficient coupling and/or substantial coupling of mechanical or thermal energy from one portion of a cantilever to another portion of a cantilever.

"Fixed end" or "fixed base" refers to an end of a cantilever which is attached to the cantilever base. A fixed end of a cantilever is unable to move independently of the cantilever base.

"Free end" or "non-fixed end" refers to an end of a cantilever which is not attached to the cantilever base. The free end of a cantilever is able to move independently of the cantilever base, for example when the cantilever bends or vibrates. For some embodiments, when a cantilever is operating in contact mode, the free end of the cantilever or the tip of the cantilever is in contact with an object, such as a surface; in these embodiments the free end is coupled to the sample. For embodiments, when a cantilever is operating in tapping mode, the free end of the cantilever is permitted to vibrate.

"Tip end" refers to an end of a cantilever at which a probe tip of the cantilever is located. In embodiments, a tip end of a cantilever is a free end of a cantilever.

"Heater-thermometer" refers to a combination of a device for determining temperature and a device for actuating the temperature. In an embodiment, a thermistor is useful as a heater-thermometer. A thermistor refers to a resistive material which has a resistance which is temperature dependent. Providing a current or voltage to a thermistor can result in an increase in the temperature of the thermistor through resistive heating. Since the resistance of a thermistor is temperature dependent, it can be used as means for measuring the temperature; i.e., by measuring the resistance of the thermistor, the temperature of the thermistor can be determined. A thermistor useful with some embodiments of the present invention comprises doped silicon, for example silicon doped with a phosphorus concentration of about $1 \times 10^{15}$ cm$^{-3}$ to $1 \times 10^{18}$ cm$^{-3}$. A heater-thermometer can refer to a single or separate distinct elements for measuring and actuating the temperature, for example a thermistor or a thermocouple and a resistive heater.

"Self-heating" refers to the ability of a device to generate heat within the device itself. In an embodiment, a device is self-heating if a heating element is integrated as a component of or within the device. In a specific embodiment, self-heating refers to the ability of a device to control its own temperature by generation of heat within the device. For example, in an embodiment, a self-heating device can maintain a temperature of the device within a specified temperature window over a specified period of time. In another embodiment, self-heating refers to the ability of a device to generate an amount of heat in the device sufficient for heating the device to a specified temperature within a specified period of time. In embodiments, a self-heating device can change the temperature of the device by a specified amount within a specified period of time. For example, in an embodiment, a self-heating device ramps the temperature of the device at a rate of more than 100° C./minute. In one embodiment, the term self-heating refers to a device especially configured for generation of heat within the device and is intended to distinguish with devices in which heat generation is minimal or to or is ancillary to or adverse to the primary function of a device.

"Piezoelectric" refers to a material exhibiting a piezoelectric property. Piezoelectric properties include, but are not limited to, the ability to generate a voltage and/or a current upon the application of a mechanical stress and/or change of an applied mechanical stress. Piezoelectric properties include, but are not limited to, the ability to change physical dimensions and/or the state of strain upon the application of a voltage and/or a current.

"Positioned proximate to" refers to the position of a device component relative to another device component or feature. In an embodiment, proximate to refers to the arrangement of one device component such that it is within 100 µm of another device component or feature, optionally for some applications within 10 µm of another device component or device feature, and optionally for some applications within 1 µm of another device component or device feature. In some devices of the invention, the heater-thermometer is positioned proximate to the free end of the cantilever. In some embodiments, the phrase "magnetic field in proximity to a cantilever probe" refers to the relative position of a cantilever and a magnetic field such that the cantilever is present within the magnetic field. For example, in one embodiment, a magnetic field in proximity to a cantilever probe refers to the position of a cantilever probe within a magnetic field or the position of a cantilever probe such that a current passing through a cantilever probe exhibits a force on the cantilever probe due to the interaction between a current flowing through the cantilever probe and the magnetic field. In embodiments, a cantilever probe is positioned at a distance less than 5 mm, less than 2 mm or selected in the range of 1-2 mm from the surface of a magnetic source producing a magnetic field.

"Magnetic source" refers to a device, material or element that produces, is capable of producing or configured for producing a magnetic field. In one embodiment, a magnetic source refers to a permanent magnetic material. In one embodiment, a magnetic source refers to an electromagnet. Useful magnetic sources include those having any shape, for example a cube shape, a disc shape, a cylindrical shape, a bar shape, a horseshoe shape. In embodiments, a magnetic source is comprised of multiple magnetic sources. In embodiments, useful magnetic sources include those having a dimension, for example a lateral dimension, a thickness dimension or a diameter, of 1 mm, of 2 mm, of less than 12 mm, selected over the range of 1-12 mm, selected over the range of 2-12 mm or selected over the range of 6-12 mm.

"Piezoresistive sensor" refers to a resistive material having resistance which changes when a strain is induced in the material, for example when the material is stretched or compressed. A piezoresistive sensor useful with some embodiments of the present invention comprises doped silicon, for example silicon doped with phosphorus or boron. In some embodiments of the present invention, piezoresistive sensors are integrated into a cantilever near the fixed end, and are useful for sensing surface stresses induced in the cantilever. According to this aspect, when a surface stress is induced in a cantilever which has an integrated piezoresistive sensor, the resistance of the piezoresistive sensor will change and can be sensed by a resistance sensing circuit thereby sensing the surface stress of the cantilever.

"Sense" and "sensing" refer to determination and/or observation of a signal indicative of a value, variable and/or property. In some embodiments, sensing refers to direct measurement of a value, variable and/or property; in other embodiments, sensing requires transformation (e.g., a mathematical transformation) to convert one value, variable and/or property into a measured and/or detected value.

"Measure" and "measuring" refer to determination of an absolute or relative value of a variable and/or property.

"Detect" and "determine" refer to observation and/or measurement of a property, object or value and/or a change in a property, object or value.

"Deflection" refers to motion of one object, such as a bending or elastic deformation. Deflection may comprise static motion, transient motion and/or vibrational motion, for example due to a force and/or the presence of another object.

"Aligned" refers to the relative orientation between two or more objects, fields, or axes. In an embodiment, two or more objects, fields or axes are aligned if the objects, fields or axes are parallel. The term "substantially aligned" refers to the condition where two or more objects, fields or axes have alignment sufficiently close to absolutely aligned so as not to negatively impact operation of a device requiring alignment. In an embodiment, two or more objects, fields or axes are substantially aligned if their alignment is less than 15° from absolutely aligned, less than 10° from absolutely aligned or less than 5° from absolutely aligned.

"Submicron region" refers to a portion of an object that has at least one characteristic dimension less than 1 micrometer. For example, a 900 nm spherical domain in a composite sample comprises a submicron region. Submicron regions may also be as small as a few nanometers or less. In some embodiments, a submicron region refers to the portion of an object or surface in contact with the tip of a microcantilever and that portion of the object or surface immediately surrounding the portion in contact with the tip. In some embodiments, upon exposure to infrared electromagnetic radiation a submicron region expands in size and causes a deflection of the microcantilever.

"Contact mode" refers to a mode of operation of an atomic force microscope or microcantilever where the microcantilever tip is generally maintained in contact with a surface.

"Flexural mode" refers to a characteristic vibrational bending mode of a microcantilever which oscillates at a characteristic frequency. A flexural mode can refer to the first order or a higher vibrational mode of a microcantilever. "Contact mode flexural mode" refers to a characteristic vibrational mode of a microcantilever having a tip which is maintained in contact with a surface. The contact mode flexural modes and the free flexural modes (non-contact flexural modes) of a microcantilever are generally different and oscillate with different characteristic frequencies. In some embodiments, a contact flexural mode depends on the mechanical properties of the sample that is in contact with the tip of a microcantilever.

"Quality factor" or "Q" refers to a measure of the sharpness of an oscillatory resonance, for example a flexural oscillation of a cantilever. The Quality factor is generally defined to be the resonant frequency divided by the width of the resonance at half the maximum energy, i.e. $Q=f_0/\Delta f$.

"Substantially independent" refers to the ability of one object to behave, move, or otherwise perform a function without being affected by or with reduced effects from another object.

"Substantially within" refers to containment of one object within the bounds of another object.

"Spatially resolved map" refers to a spatial plot showing position dependent variations, for example position dependent variations in a property.

"Viscoelastic response" refers to a measure of a frequency dependent strain or deformation induced in a material in response to a stress applied to the material.

"Thermal transition temperature" refers to a temperature at which a material undergoes a significant change in material properties, for example, a change in elasticity, damping, thermal expansion and other properties. Thermal transitions include softening, melting, solidifying and glass transitions.

"Interacting a probe tip . . . with a sample" refers to positioning the probe tip of a cantilever probe in sufficient proximity with a surface such that it can sense and/or induce a force between the probe tip and the a sample. Such interaction can be attractive, repulsive, or a combination of both. The interaction forces can include but are not limited to coulomb repulsion, Van der Waals, electrostatic, meniscus, hydrophobic, and others. The probe-tip interaction can be continuous contact, intermittent contact, tapping, non-contact, modulated force, and/or pulsed force, for example.

FIG. 1 shows a simplified schematic diagram of one embodiment of the invention. A self-heatable cantilever probe 101 with a tip 105 is interacted with a sample 102. An excitation source 104 provides any desired combination of DC excitation ($V_{DC}$) and AC excitation ($V_{AC}$) to cause current to flow through the cantilever. The excitation source may be a voltage source and/or a current source. The DC and AC components may by synthesized separately and summed using any suitable analog circuitry (e.g. op-amps, transistor circuits and/or AC coupling nodes) or may be added digitally and generated together in the same digital-to-analog converter. The system can also be operated with only AC or only DC excitation.

The resulting sum of any AC and DC excitation is applied across the cantilever to create currents $I_1$ and $I_2$ through the cantilever arms 103 and current $I_3$ through an end region 106 near the tip end of cantilever 101. (The magnitudes of these currents are substantially the same, but the directions are different, as indicated by the arrows.) A magnetic field B (108) is applied to interact with the current flowing through the cantilever to induce a Lorentz (electromagnetic) force on the cantilever. The magnetic source for the B field may be a permanent magnet or an electromagnet. In a preferred embodiment, the magnetic source can be a permanent magnet of rare earth materials, for example NeFeB or SmCo magnets. For variable temperature measurements, a resistive heater region 107 can be included in the end region 106 of the cantilever to form a self-heatable cantilever. Alternately, the probes can be formed without a resistive heater to allow high currents with minimal change in the cantilever probe temperature. In this case, the end region is selected to be conductive instead of resistive.

The Lorentz force vector $F_n$ for a given current segment is given by $F_n = L_n (I_n \times B)$, (where $L_n$ is the length of the current segment, $I_n$ is the current vector and "x" in this case indicates the cross product.) Thus the magnitude of the force is $F = I_n L_n B \sin \theta$, where $\theta$ is the angle between the current segment and the magnetic field. For the strongest Lorentz force applied to the cantilever the magnetic field B is substantially perpendicular with the current path $I_3$ as shown in FIG. 1. That said, the magnetic field can be oriented somewhat off axis for convenience of the design with a proportional loss in the generated force. It is worth noting that in the design shown in FIG. 1, the force is primarily generated at the end of the cantilever near the tip, as indicated by force arrow 110. In the case that the magnetic field is oriented perpendicular to the current segment $I_3$, the force on the cantilever legs 103 is zero due to the fact that the sin $\theta$ term is zero in both cases ($\theta=180°$ and $\theta=0°$). Even in the case that the magnetic field has components in other directions, the forces interacting with $I_1$ and $I_2$ are equal but opposite in direction. Thus in this embodiment the force contributions of $I_1$ and $I_2$ in the direction of cantilever flexion cancels each other. The resulting force is substantially from the current segment $I_3$ from near the tip end of the cantilever. This is in contrast to V-shaped cantilevers where the current vectors are not in opposite direction. In this case the force is applied over the entire length of the cantilever. The implications of this are discussed below.

Detection of Cantilever Motion

A signal indicative of the cantilever motion is generally recorded to measure a property of the sample. There are many techniques used for measuring motion of the cantilever. The most common method involves the use of the optical lever technique, where a light beam is reflected off a portion of the cantilever and the position of the reflected light beam is recorded using a position sensitive detector or a multiple segment photodiode. Other techniques include interferometric, capacitive, inductive, piezoelectric, and piezoresistic readout schemes. One scheme that is particularly appealing with self-heated probes is to measure the heat flow from the heater region by measuring the heater resistance. The heat transfer changes as a function of cantilever/sample separation and this feature has been used to measure the motion of the cantilever and variations in sample topography. In any case, any of the methods above can be used to generate a signal indicative of the motion of the cantilever. This signal can indicate the deflection, position, velocity, oscillation amplitude, phase, frequency and/or other properties of the motion of the cantilever.

Deflection Spectra Versus Power and Frequency

Figure 2:
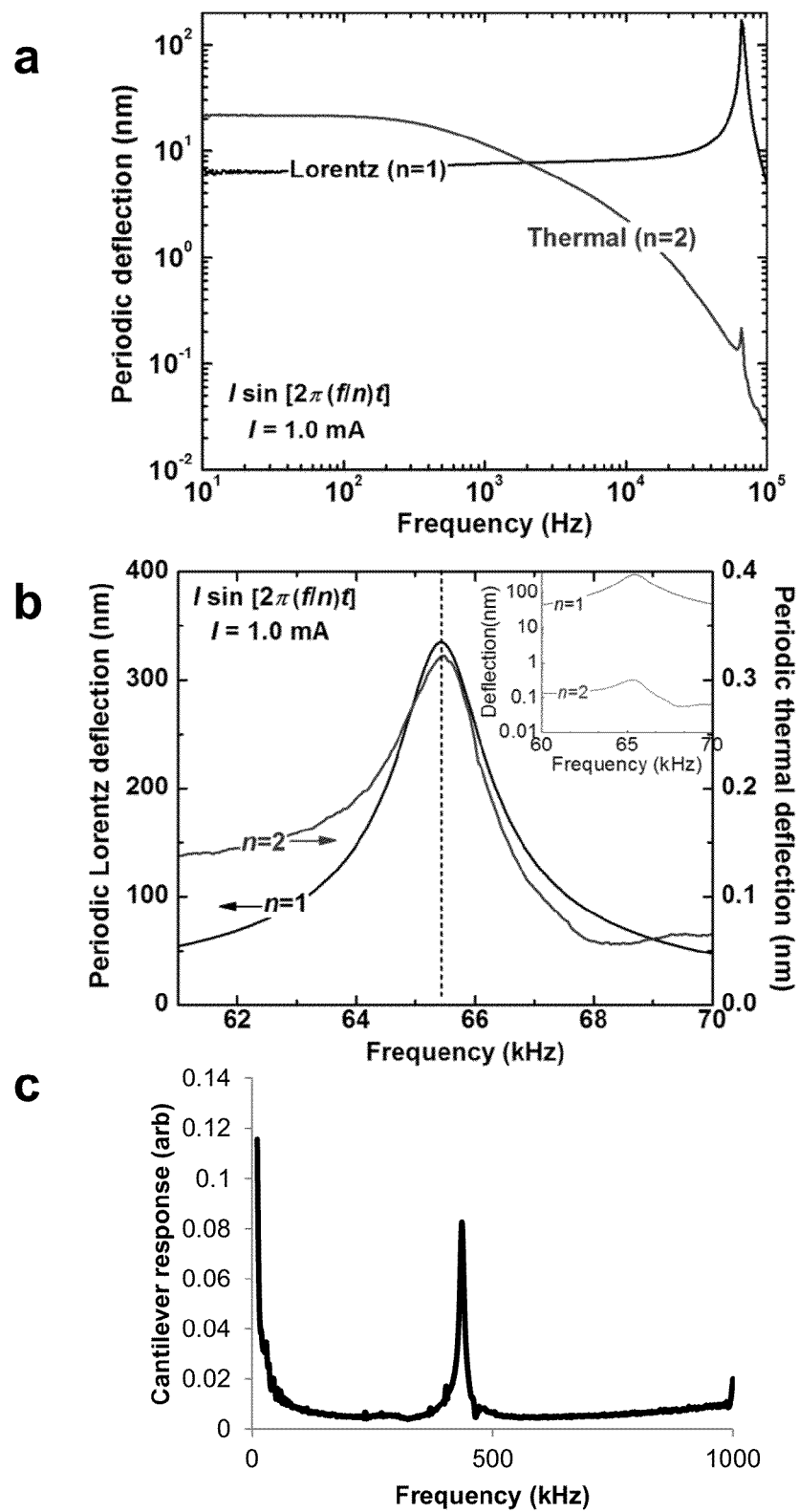
FIG. 2 shows periodic deflection of a cantilever in response to Lorentz force and thermomechanical actuation.

FIG. 2 shows examples of using the Lorentz force to excite self-heatable cantilevers for both free excitation (FIGS. 2a-b) and a contact resonance (FIG. 2c). FIGS. 2a-b also shows the thermomechanical excitation that appears at 2× the drive frequency. FIG. 2 shows the cantilever deflection amplitude with 1 mA sinusoidal current/sin $[2\pi(f/n)t]$, where $f=\omega/2\pi$ is the frequency of the periodic current. The Lorentz data is for n=1, because the Lorentz actuation has the same frequency as the current oscillation. The thermomechanical actuation is for n=2, since the thermomechanical response is at twice the current frequency. All of the periodic values reported are amplitude, which is the half of the peak-to-peak value.

In these experiments, the cantilever thermal time constant is the time for heat to diffuse from the cantilever heater through the length of the legs, which is about 100 μsec for the present cantilevers. FIG. 2(a) shows that below the cantilever thermal time constant, both periodic thermomechanical and Lorentz deflections are nearly constant, and are close to static deflection. The static thermomechanical deflection is two times larger than the periodic deflection amplitude, since the thermomechanical deflection always occurs in one direction regardless of the current direction, making the deflection amplitude half of the maximum deflection. As the actuation frequency increases, the cantilever deflection by Lorentz force does not show a distinct frequency dependence. However, the thermomechanical deflection decreases significantly when the actuation frequency exceeds the cantilever thermal time constant. The Q factor of the silicon cantilever was 66, and so the relatively low dissipation in the cantilever allows for the Lorentz actuation to increase significantly near the resonance frequency. At mechanical resonance, the periodic Lorentz deflection is 1000× higher than the periodic thermomechanical deflection. The thermomechanical deflection is relatively small because the cantilever is made of single crystal silicon that induces little bimaterial deflection. Also, since the heater is located at the cantilever free end, the cantilever is not uniformly heated. Hence, the cantilever actuation at the resonance is primarily induced by Lorentz force.

As the Lorentz and thermomechanical deflections are governed by current and temperature, the two deflection mechanisms are compared to examine the crosstalk between them. The temperatures reported here are the heater temperatures at the cantilever end, which is larger than the temperature in the cantilever legs or the cantilever base. The tip-sample temperature is also lower than the cantilever heater temperature.

Figure 3:
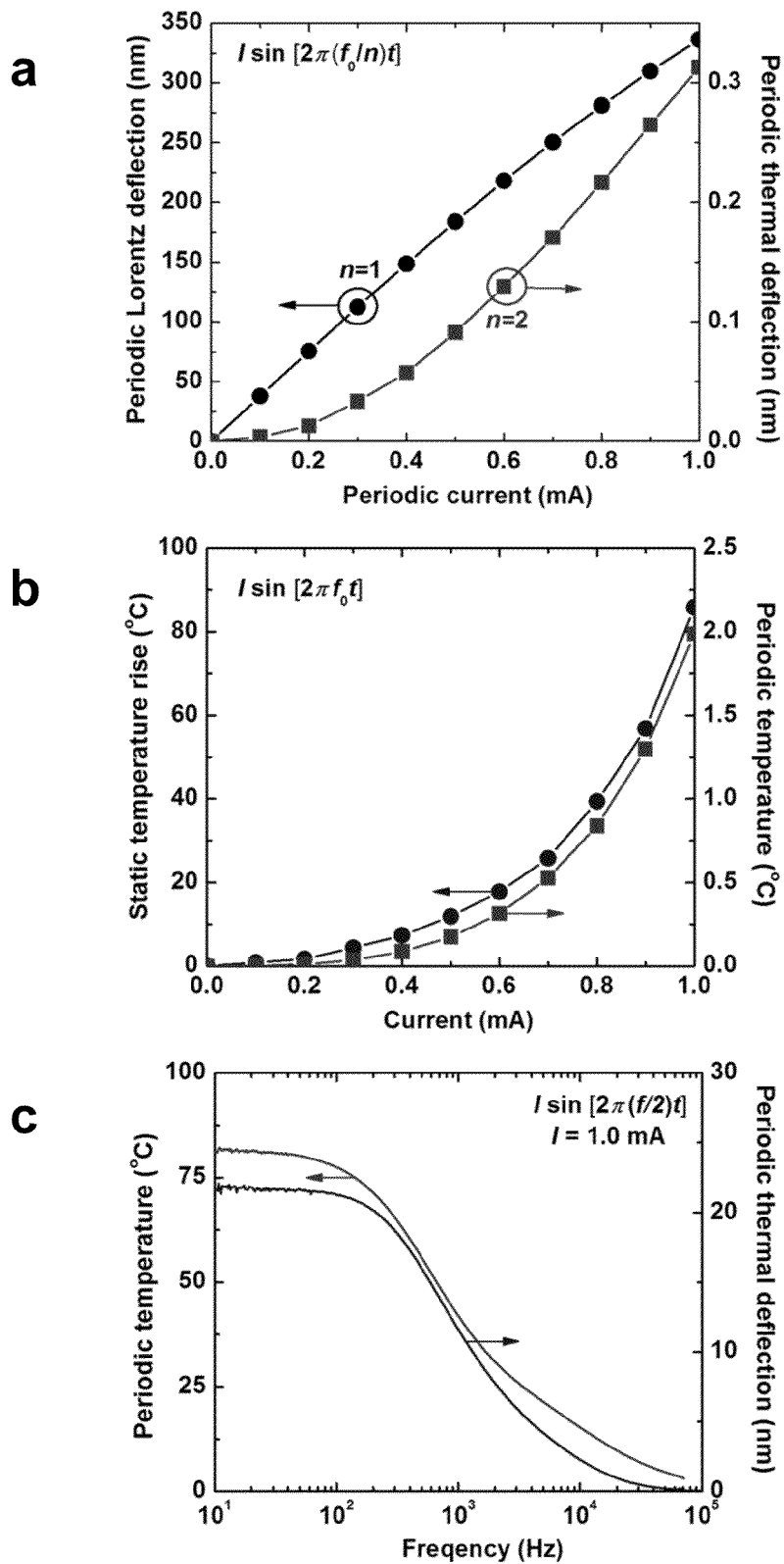
FIG. 3a shows periodic Lorentz and thermomechanical deflections of a cantilever versus AC current applied to it.
FIG. 3b shows static temperature rise and periodic temperature of a cantilever with an AC current at resonance.
FIG. 3c shows periodic temperature and thermomechanical deflection of a cantilever versus the heating frequency.

FIG. 3(a) shows the periodic Lorentz and thermomechanical deflection as a function of the periodic current. FIG. 3(b) shows the static temperature rise above room temperature and the periodic temperature oscillation at mechanical resonance. With AC current of 0.2 mA, the periodic Lorentz deflection is 75 nm at resonance, sufficiently high for imaging, and with minimal DC temperature rise. It is possible to achieve larger amplitudes as well, which have higher DC temperature. Since the dissipated power is $I^2R$ (where 1 is the current and R is the probe resistance), operating at twice the current and twice the Lorentz deflection leads to 4× the power dissipation and roughly 4× higher static temperature increase. For example, at current of 1 mA, it is possible to achieve 336 nm of Lorentz deflection, but with a temperature rise of 86° C.

The static and periodic temperatures are quadratic with the current and linear with cantilever power. The cantilever thermal conductance is estimated as $1.6 \times 10^{-5}$ W/K. A 1 mA DC current causes a static temperature rise of 172° C. and static thermomechanical deflection of 38 nm. When 1 mA AC current is applied at mechanical resonance for Lorentz actuation, it generates a periodic temperature of 2° C. and negligible thermomechanical deflection. This small periodic response is because the mechanical resonance frequency is larger than the cantilever thermal time constant.

FIG. 3(c) shows the periodic temperature and corresponding periodic thermomechanical deflection of cantilever as a function of the heating frequency, which is twice the current frequency. At thermomechanical resonance, the periodic temperature variation is only 3.5° C. and the periodic thermomechanical deflection is 0.32 nm, whereas the periodic Lorentz deflection is 10.5 nm at the same frequency. Note that the periodic thermomechanical deflection follows the periodic temperature quite well, and is still quadratic for current rather than linear as seen in FIG. 3(a). Both of them imply negligibly small harmonic artifacts of the Lorentz actuation. That is, the Lorentz deflection is quite close to pure harmonic oscillation.

Figure 4:
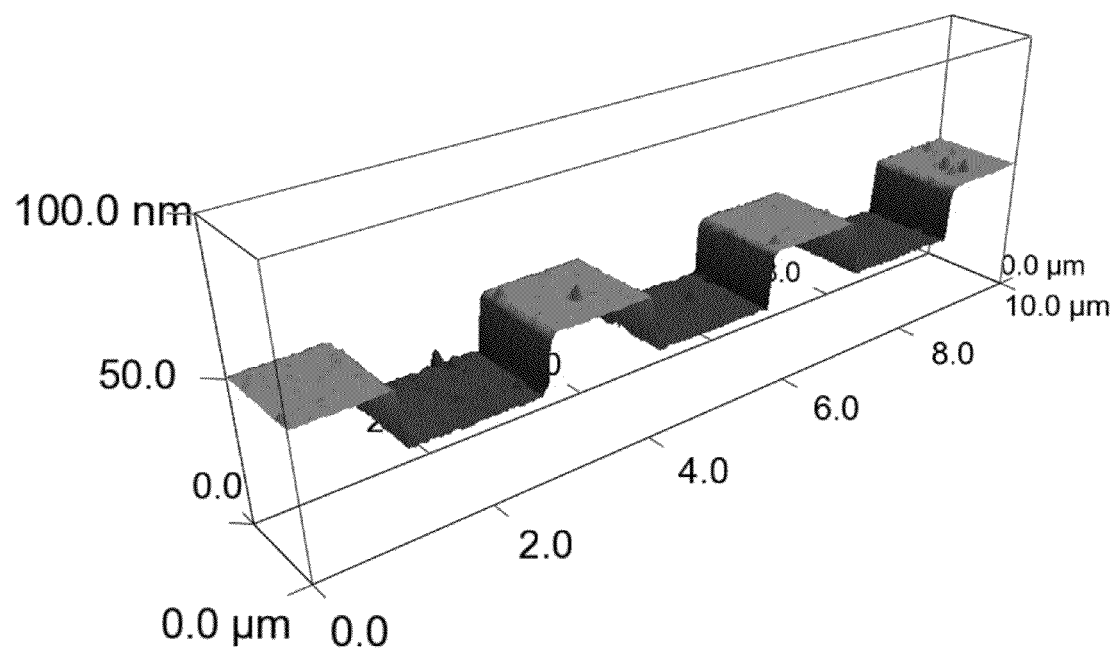
FIG. 4 is an intermittent contact ("tapping") mode image on a calibration grating by a Lorentz-force actuated cantilever.

The usefulness of the actuation scheme was demonstrated by imaging a calibration grating using Lorentz actuation. A silicon grating having 20 nm tall features was placed on the magnet, and the cantilever was powered with small AC current of 0.2 mA supplied from internal function generator of the AFM. In standard amplitude modulation ("tapping") mode, this function generator drives the piezoelectric oscillator on the cantilever holder. Thus an imaging feedback loop with the Lorentz actuation was able to be fully implemented. FIG. 4 shows the image acquired from this experiment. Even with such a small current, the Lorentz deflection is sufficient and the image shows no difference compared to the normal piezo-driven imaging. While the cantilever position is monitored using standard laser-based deflection, it is expected that the temperature signal of the heated cantilever could also be used to detect the substrate, as has been demonstrated previously for amplitude modulation imaging.

Influence of Field Direction on Lorentz Force

The direction of the magnetic field is critical for Lorentz actuation. Here, the effect of the magnet field direction on Lorentz force is investigated by changing the cantilever location relative to the magnet, and also by changing the magnet orientation. The cantilever placed 200 μm above the 3 mm cube magnet and powered by 0.2 mA sinusoidal current. The cantilever deflection was measured as a function of lateral position, resulting in a 2D map of cantilever periodic deflection with 100 μm spatial resolution.

Figure 5:
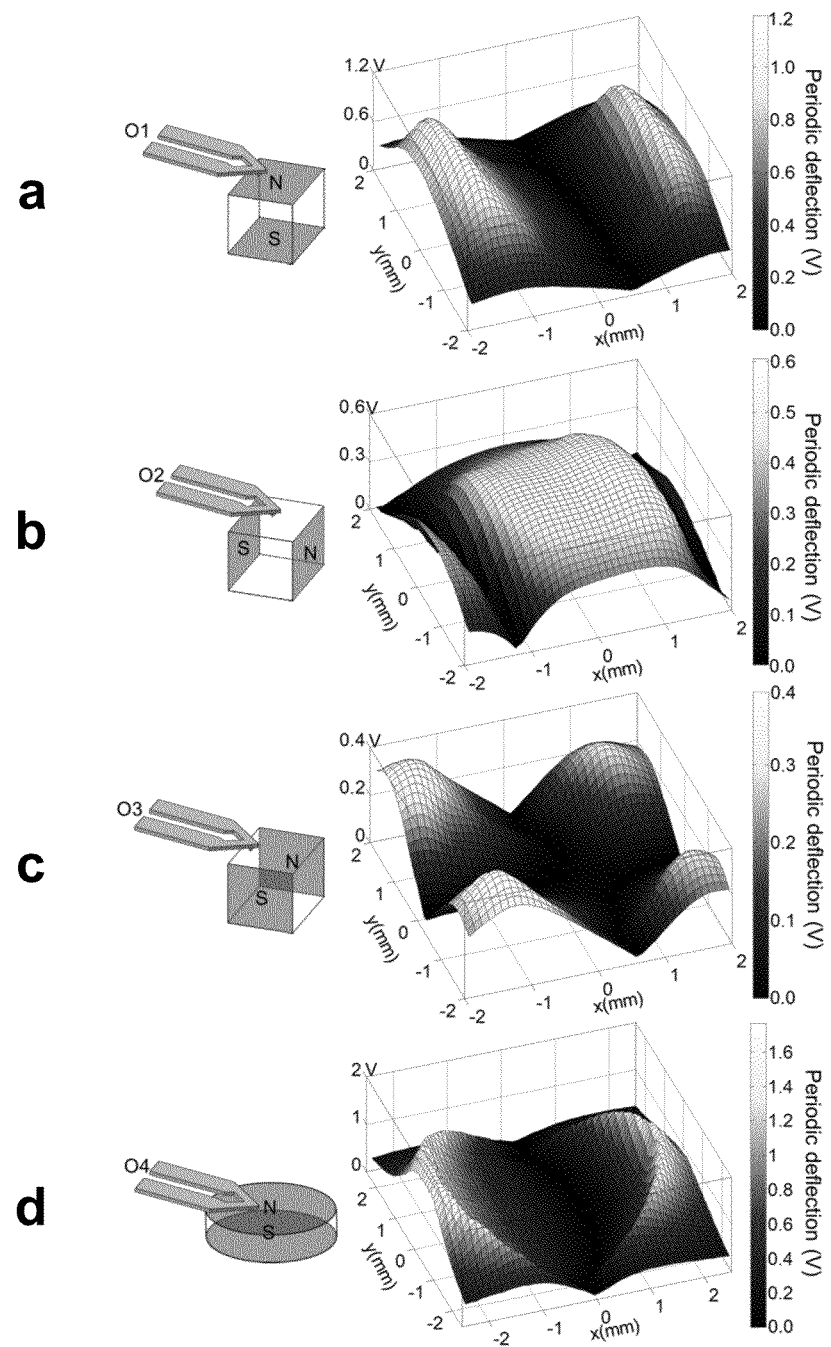
FIG. 5 shows maps of cantilever deflection at resonance for Lorentz force actuation in different magnetic orientations.

FIG. 5 shows the 2D deflection maps above a cube magnet for different magnet orientations (O1,O2,O3). The same experiment was also performed above a circular disk magnet (O4). For a magnetic orientation of a vertically aligned poll (O1 and O4), the maximum cantilever deflection is achieved when the cantilever is near the edge of the magnet where the $B_x$ is maximized. Also, there is zero-deflection region, where the forces by $B_x$ and $B_z$ are canceled out. FIG. 5(d) shows the maximum deflection along the magnet edge more clearly. For O2, which as the magnetic pole aligned parallel to the cantilever, the periodic deflection is uniform except at the edge of the magnet, since $B_z$ is the dominant magnetic field direction with this magnet orientation. This is the orientation used to measure the deflection spectra and imaging presented above, since the uniform periodic deflection reduces error with respect to the cantilever position. For the magnet oriented at O3, there was no cantilever deflection along the center line (y=0) because $B_y$ is the only dominant magnetic field and it does not induce the cantilever deflection as seen Eq. (3).

Figure 6:
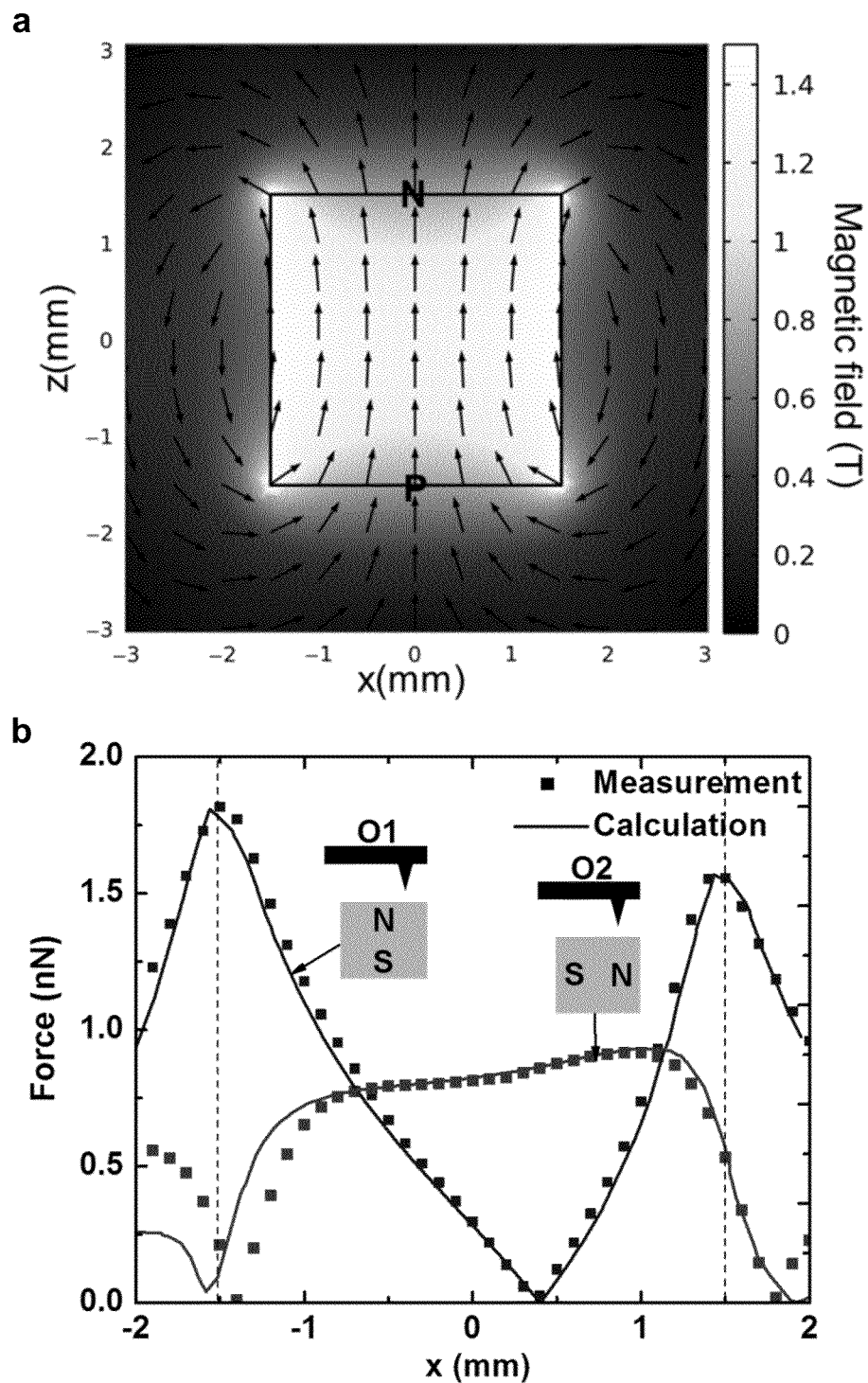
FIG. 6a shows theoretical magnetic field lines surrounding the center axis of a magnet.
FIG. 6b shows theoretical and measured forces exerted on a cantilever above the magnet shown in FIG. 6b.

FIG. 6(a) shows the calculated magnetic field around the cube magnet with vertical pole (O1), on the xz plane (y=0). FIG. 6(b) shows the calculation and measurement of the Lorentz force with vertical and horizontal magnetic field (O1, O2), which compare very well. The field strengths of the magnet used to fit the experiment and calculation are different for each magnet orientation, 0.41 T for O1 and 0.26 T for O2. The Lorentz force with the O3 magnet orientation is zero in both calculation and measurement.

Figure 7:
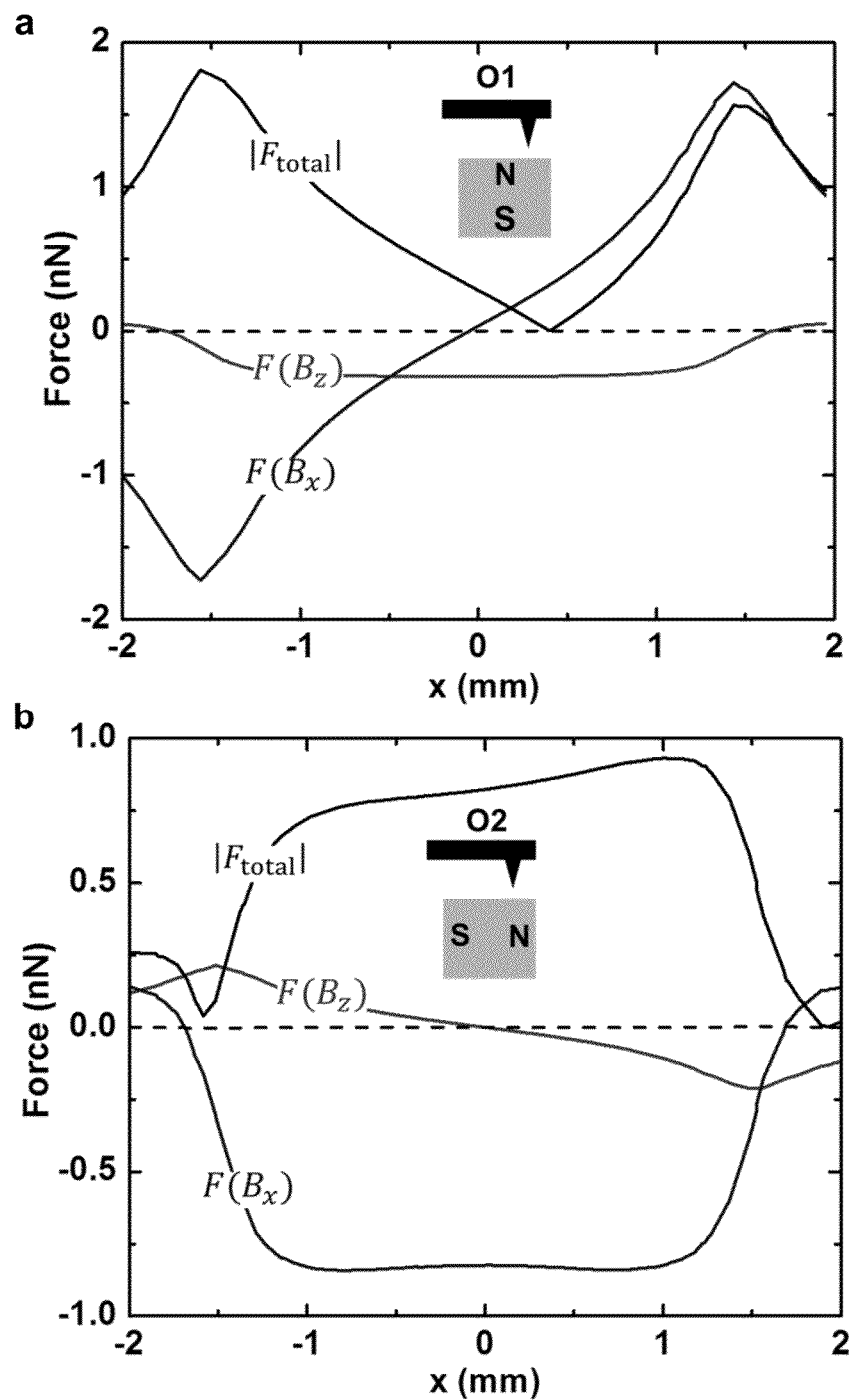
FIG. 7 shows the force induced by different directions of magnetic field.

FIG. 7 shows the force induced by each magnetic field direction, clearly indicating how the Lorentz force depends upon the magnetic field direction and magnet orientation. As predicted from Equations (3) and (5), $B_x$ dominates the Lorentz force acting on the cantilever. The force induced by the magnetic field gradient is very small and not plotted here.

Detecting Material Softening by Lorentz nanoTA

As an application of Lorentz force actuation, nanoscale thermal analysis (nanoTA) was performed to measure the glass transition temperature $T_g$ via the temperature-dependent shift of contact resonance frequency. NanoTA works by detecting a slight penetration of the tip into the sample at $T_g$, while increasing the tip temperature. A challenge with the method is that it can be hard to measure $T_g$ for highly filled or highly cross-linked materials, because the softening near $T_g$ can be small and the thermal expansion near $T_g$ can be large enough to counteract the softening. However, by sensing the resonance frequency shift instead of deformation, it is possible to detect material softening independent from substrate thermomechanical expansion.

The measurement was done on randomly selected 4 regions of a nonconducting underfill epoxy (CHIPCOAT U8437-2, NAMICS Corporation). This is a highly filled epoxy (~50% by weight with 2-10 um silica particles) that improve the mechanical and thermal performance of the material, but whose presence increase the difficulty of the conventional nanoTA method. A small printed circuit board with a sample of the epoxy was placed on a 12.7 mm×1 mm thick NdFeB disk magnet such that the region of interest on the sample was at the outer diameter of the magnet, where the Lorentz deflection is maximum.

Figure 8:
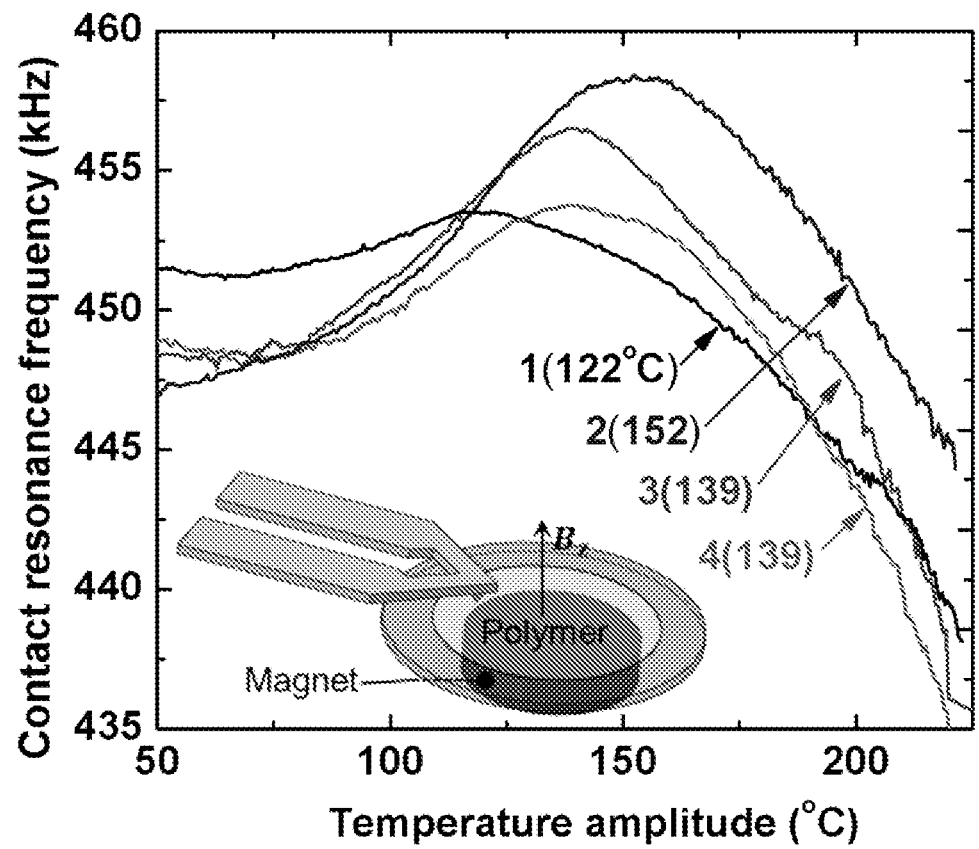
FIG. 8 shows nanothermal analysis by measuring cantilever contact resonant frequency as a function of tip-sample temperature on a highly filled epoxy.

For this experiment, a commercial self-heating AFM cantilever was used (AN200, Anasys Instruments), which is very similar to the cantilever of the previous experiments. The cantilever was periodically approached to the surface to determine the point of contact with the sample. After each tip approach, the cantilever was moved to a selected loading force and then a chirp waveform ($2V_{pp}$ AC) was applied across the legs of the cantilever. DC voltage was applied across the heater to ramp the probe temperature from just over ambient to above the glass transition temperature. Approach curves were repeated during this process to ensure a constant loading force as the temperature was ramped. FIG. 8 shows the contact resonance frequency versus the temperature at the tip, indicating the peak of the resonance frequency corresponding to the $T_g$. The $T_g$ specified by the manufacturer (137° C.) is close to the average $T_g$ observed in the measurements, however, the contact resonance nanoTA measurements show local variations not observable in bulk $T_g$ measurements.

The contact resonance frequency can be determined by a variety of means, including a lock-in amplifier or other demodulator. A demodulator can create a signal may be indicative of the amplitude, phase, in-phase component (X), quadrature component (Y), or similar measurements of the cantilever's AC motion. The demodulator may comprise an RMS-to-DC converter, a lock-in amplifier, and/or a Fast Fourier Transform or other demodulation means that extract oscillation amplitudes at one or more frequencies. The demodulator may be implemented in analog electronics, digital electronics, and/or implemented in software. In the case of a software implementation, the demodulator may be programmed on an embedded controller, a digital signal processor, a field programmable gate array, other programmable logic devices, and/or a personal computer. The demodulator may also have its functions distributed across multiple hardware and software platforms.

In one embodiment a resonant peak frequency can be identified by analyzing an amplitude versus frequency curve. A peak frequency can be found by determining a maximum amplitude response in an range of frequencies, or by fitting a model through a portion of the amplitude versus frequency curve. For example, one can fit a Lorentzian function, a Gaussian function or any number of peak shaped functions. With high signal to noise, small numbers of data points can be used for peak fitting. For example very efficient algorithms can be used to detect peak frequencies with resolution below the FFT bin size using a Gaussian or parabolic peak fit through the three highest points, as described for example in U.S. Pat. No.

6,965,068. These techniques have the advantage of being computationally very efficient with no requirement for iterative curve fitting. Another method of determining the contact resonance frequency with high noise rejection is to employ a peak centroid measurement. In one implementation one can determine a centroid frequency where the integral from a start frequency to the centroid frequency has half the area of the integral from a start frequency to an end frequency. This technique can provide useful measurements of the contact resonance frequency and its trends with temperature even when the individual frequency response measurements may be too noisy to determine a contact resonance frequency from the maximum cantilever response amplitude. The peak frequency $f_r$ can also be determined selecting a frequency with a desired phase (e.g. when the phase crosses 90°).

Polymer Films <100 nm Thick

Figure 9:
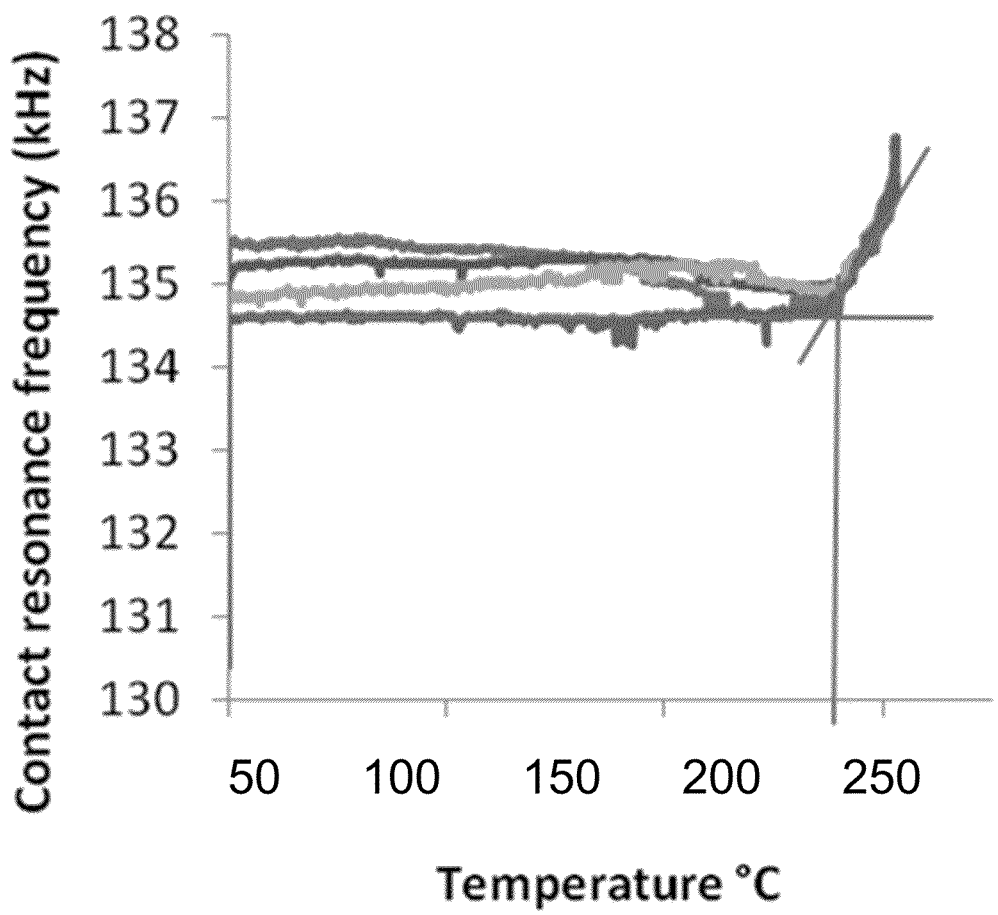
FIG. 9 show measurements of glass transitions on a thin film <100 nm thick.

FIG. 9 shows a measurement of the glass transition of a thin photoresist film as measured by measuring the contact resonance as a function of temperature using a self-heatable AFM cantilever probe. The photoresist sample is 50-100 nm thick, below the level of detection of conventional nanothermal analysis. In this case, as the material softens and allows the tip to penetrate into the sample, the contact resonance frequency increases. This is due to the fact that the tip becomes closer to the underlying silicon substrate which is much harder than the polymer. Seeing glass transitions on thin films with conventional nanothermal analysis can be difficult to impossible because the small amount of sample material provides insufficient thermal expansion to create a DC deflection of the cantilever sufficient to be readily measured and tracked as a function of temperature.

Figure 10:
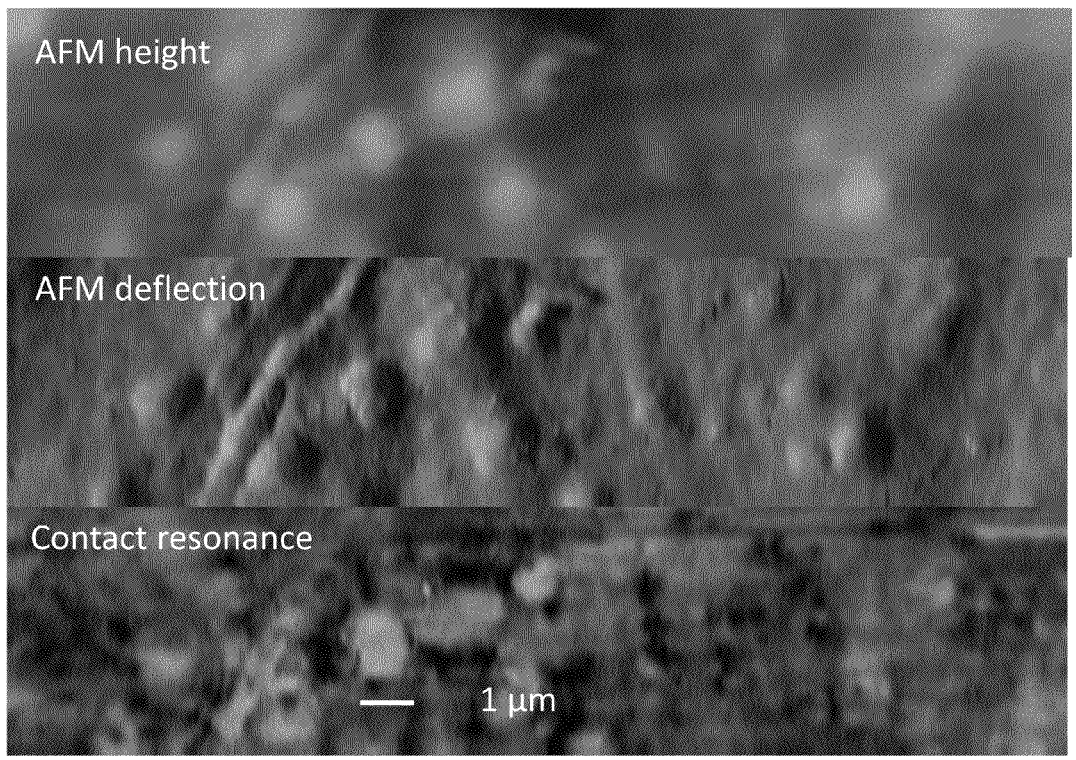
FIG. 10 shows a contact resonance image of a filled epoxy obtained using Lorentz force actuation with a self-heated probe

Lorentz force excitation can be used to map spatial variations in sample stiffness in heterogeneous samples. FIG. 10 shows a map of AFM surface topography and stiffness via contact resonance on a highly filled polymer epoxy. The epoxy has small silica particles that show up as brighter spots in the AFM image (top). The center image is a "deflection" or "error signal" image that highlights the fine features of the sample. The bottom image is a contact resonance image obtained with Lorentz force actuation with a self-heated cantilever. In this bottom image, brighter regions have higher resonant frequencies corresponding to stiffer regions in the sample. Note the correspondence between the brighter round regions in the top AFM image (the filler particles) and the bright regions in the contact resonance map.

Figure 11:
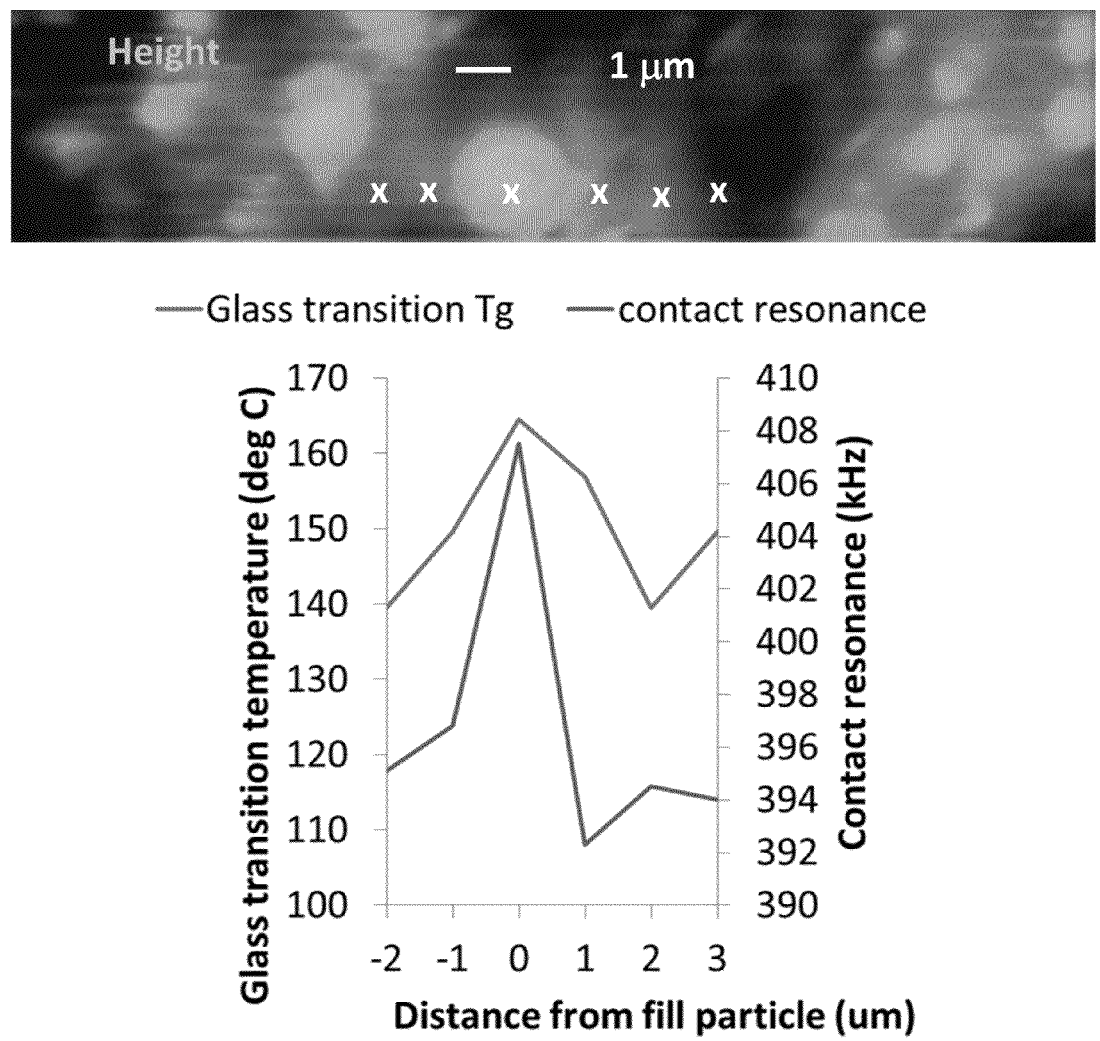
FIG. 11 shows an AFM image of a highly filled epoxy and measurements of contact resonance and glass transition temperatures in the vicinity of a filler particle.

FIG. 11 shows a profile of the contact resonance and the glass transition temperatures in the vicinity of a filler particle. The top image shows an AFM topography image of a highly filled epoxy indicating where contact resonance and glass transition temperature measurements were made. The plot below shows spatially resolved measurements of glass transition temperature and contact resonance on top of and adjacent to a filler particle. This measurement shows the spatial distribution of the changes in stiffness and thermal properties of the epoxy due to the inclusion of filler particles.

Figure 12:
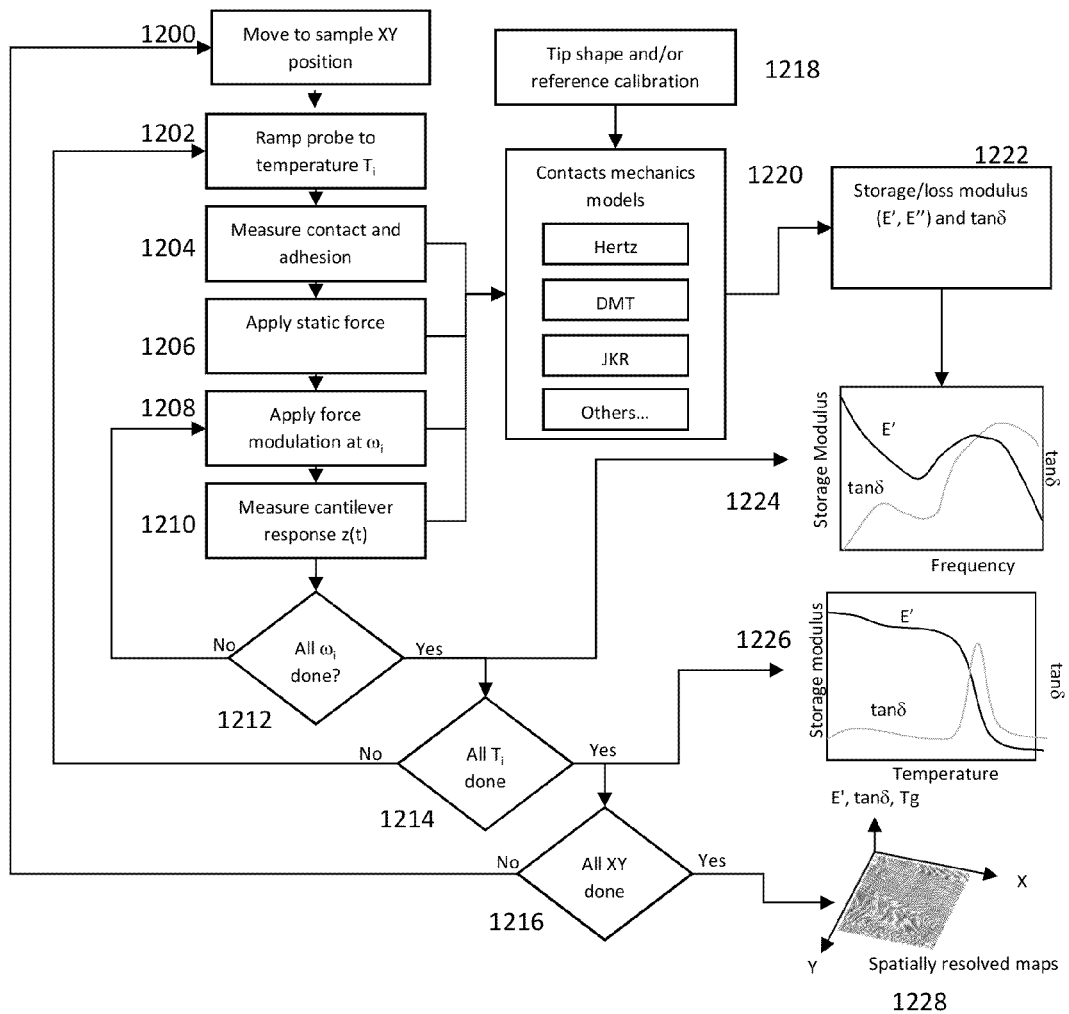
FIG. 12 shows a flow diagram of a method of measuring temperature and frequency dependent properties of a sample using a self-heating cantilever.

FIG. 12 shows a simplified flow diagram of a method for measuring viscoelastic properties of materials as a function of temperature and frequency using a self-heated cantilever probe. It also illustrates the ability to create spatially resolved maps (1228) of viscoelastic properties at multiple locations on a sample surface. In this embodiment, the process starts by moving the probe tip to a desired XY position on the sample (step 1200). This can be achieved by moving the probe, the sample or a combination of both. The motion can be generated any number of ways including the use one or more motorized translation stages, piezoelectric scanners or any other device that produces relative motion between the cantilever probe and the sample. In the next step (1202), the probe is ramped to a desired temperature $T_1$ to heat a microscopic region of the sample. The use of self-heatable cantilevers has a dramatic advantage over conventional DMA and/or variable temperature AFM. The small heater area (on the order of 10 μm×5 μm) and a very small contact area between the probe tip and sample (~10 nm contact radius) lead to a very small heated volume of at most a few $\mu m^3$. This means the heated region can equilibrate extremely quickly, allowing temperature ramp rates as high as 600,000° C./min. After the temperature adjustment, the system performs a measurement (1204) and correction (1206) of the static force applied between the tip and sample. This can be a critical step because as the probe temperature is rapidly ramped, the tip-sample force can change due to thermal expansion of the sample and thermal stress bending of the cantilever. As such, the normal force feedback loop employed in AFM can fail to maintain a constant interaction force as the temperature changes. This can be a critical issue for measurements of glass contact resonance frequencies and glass transitions because the contact resonant frequency depends critically on the surface contact stiffness which in turn depends on the tip-sample contact force. To maintain a constant interaction force this process next performs a rapid tip withdrawal and re-engagement to determine the adhesion and point of contact (1204). From this, the system can resets the static tip-sample force to a desired value (1206). This can be accomplished by moving the tip, the sample or a combination of both. It can also be accomplished by adjusting the DC level of the Lorentz force applied to the cantilever. This can have speed advantages since the static force can be ramped and controlled very quickly without exciting mechanical resonances in other portions of the AFM. Next the Lorentz force modulated over a range of frequencies $\omega_i$ (1208) while measuring the cantilever response (1210). Using the known loading force from steps 1204-1206 and the dynamic force (1208), and cantilever response (1210), it is possible to calculate viscoelastic properties of the sample, including storage modulus, loss modulus, and/or tan δ. These properties can be measured as a as a function of a plurality of applied frequencies $\omega_i$ (1212 and 1224), sample temperatures $T_i$ (1214 and 1226), and/or sample locations (1216 and 1228). Spatially resolved maps can be created of any desired property including cantilever amplitude, phase, storage modulus (E'), loss modulus (E"), loss tangent (tan δ), glass transition ($T_g$), melting temperature ($T_m$) and other related properties. For quantitative measurements, it can be desirable to use knowledge of the tip shape and/or measurements on a known reference sample (1218).

Note that it is not required that the temperature and frequency sweep loops operate synchronously. For example it is possible to ramp the probe tip temperature continuously and asynchronously measure the frequency dependent cantilever response as the temperature is changing. The only practical issue is that the temperature ramp rate is slow enough that that it is not changing dramatically during a single frequency sweep. But in the case of 10 msec frequency sweeps, a temperature ramp rate of 100° C./sec would result in only a 1° C. change during the sweep.

The entire sample or a portion of the sample may also be heated or cooled by a more macroscopic heater/cooler stage. (This can be especially desirable for studying samples with glass transition temperatures below room temperature.)

Figure 13:
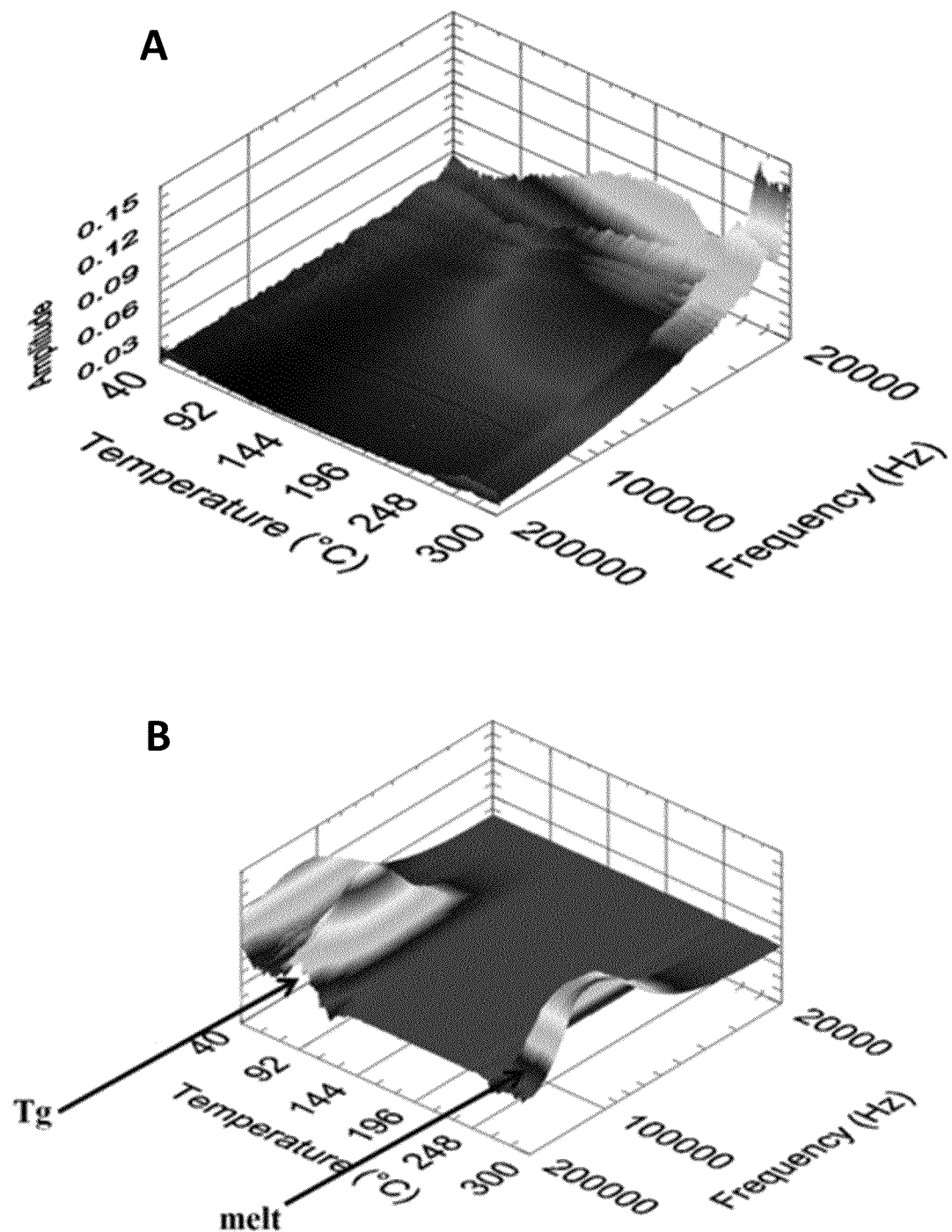
FIG. 13 shows a plot of cantilever response to Lorentz force as a function of frequency and temperature on a highly crystalline polymer.

FIG. 13 shows a measurement of the wideband viscoelastic response on a sample of highly crystalline polyethylene terephthalate (PET). Highly crystalline polymers are problematic for conventional nanothermal analysis because the crystalline domains (that don't undergo a glass transition) can support the tip and prevent penetration even when amorphous regions go through a glass transition. FIG. 13 shows variable temperature measurement of viscoelastic response on polyethylene terephthalate (PET) showing amplitude (A) and phase (B). For this measurement, the cantilever response was measured from 20 kHz to 200 kHz while ramping the temperature between 40 and 300° C. The phase plot (B) clearly shows peaks at both the glass transition and the melt.

Rapid Measurement Speeds

For the example shown in FIG. 13, the frequency sweeps were obtained in 10 msec. Each frequency sweep was interleaved with a measurement and adjustment of static tip-sample force, also accomplished in 10 msec. The temperature was asynchronously ramped at 10° C./sec. Thus the entire measurement was performed in roughly 26 seconds. While this temperature ramp rate was selected to correspond closer to temperature ramp rates used in bulk analysis, much faster measurements are possible. The probes can be ramped at up to 10,000° C./sec or more, so this entire temperature ramp could have been performed in 26 msec or less. Therefore the practical limit is set only by the temperature and frequency resolution desired. For example, if one wanted measurements at every 5° C. between 40 and 300° C. (53 total temperature steps), with interleaved force control and frequency sweep steps at 10 msec duration, the entire measurement can be accomplished in 53×(10 msec+10 msec)=1060 msec, or around 1 second. This is in distinct contrast to conventional DMA and variable temperature AFM that is typically performed at around 1-10° C./minute. For measurements at every 5° C. it would require 30-300 seconds for each ramp. So for a ramp between 40 and 300° C., with 5° C. temperature resolution (53 steps) would require 1590-15900 seconds (0.4-4 hours) for ramping plus the measurement time. In practice DMA users often wait 30-45 minutes for the system to stabilize at each temperature such that it can take hours, days or a week or more to characterize a polymer over a broad range of temperature and frequencies. In addition, conventional DMAs cannot measure samples at frequencies above around 100 Hz (or 1-2 kHz in a rare high end instrument), so most DMAs cannot access anything close to the frequency range enabled by current invention. In practice, embodiments of the current invention can provide this information at nanoscale spatial resolution and ~1000× faster and ~1000× higher frequencies than conventional instruments.

Time Temperature Superposition

Figure 14:
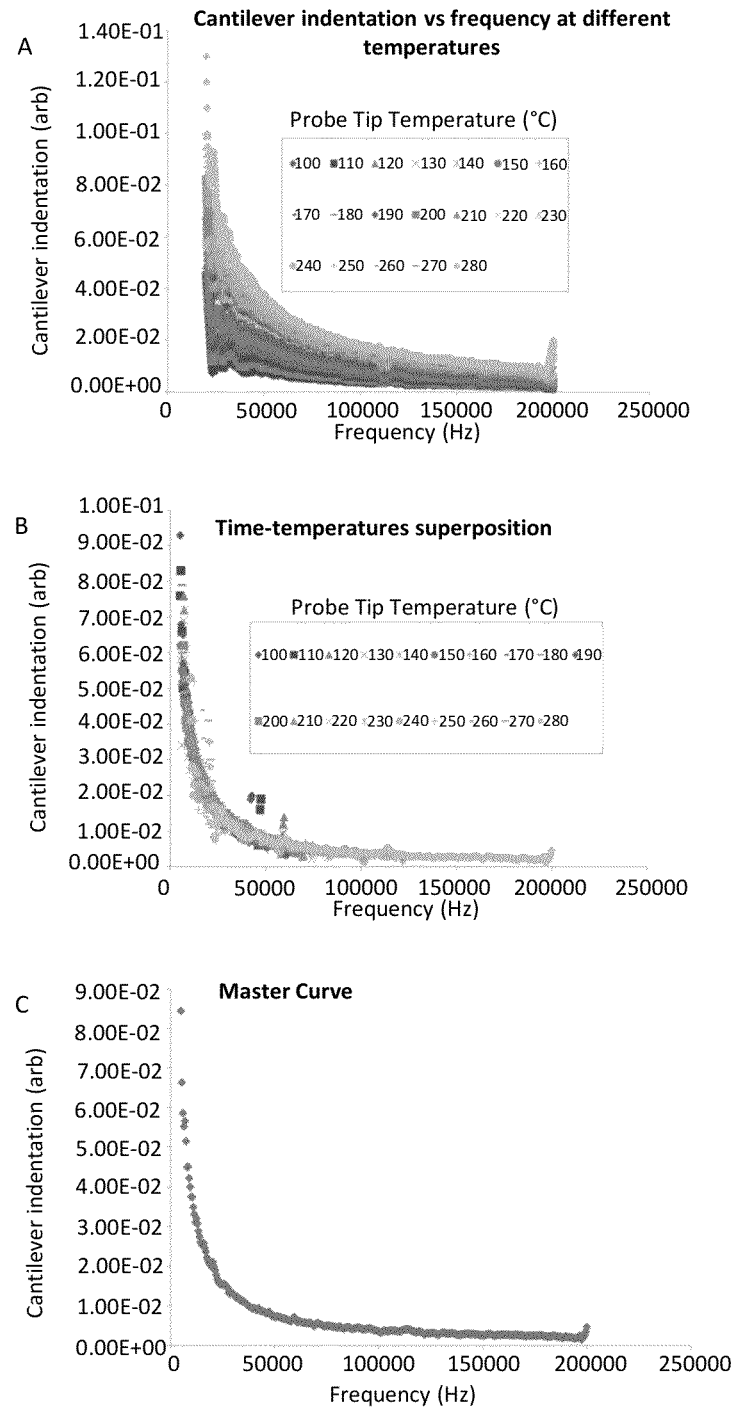
FIG. 14 shows the creation of a master curve using time-temperature superposition.

FIG. 14 shows the process of time-temperature superposition (TTS) to create a "master curve" that extrapolates the viscoelastic response of a material over a broad range of frequencies. Time-temperature superposition is a technique that is used to predict material behavior outside the frequency range available to the instrument and to make estimates of material activation energies. TTS makes use of the fact that the frequency dependent elastic response of some materials has a similar shape at adjacent temperatures. Specifically the frequency dependent response at one temperature is shifted to be most similar to the response at a reference temperature. In the simplest case, this is accomplished by scaling the frequency axis for measurements at different temperatures to get the best correlation to the reference temperature. There are two key results from this process (1) "the master curve" and (2) activation energies. The master curve integrates measurements over a range of temperatures to predict a viscoelastic response of a material, often over many decades of frequency. FIG. 14A shows a series of measurements of cantilever indentation versus frequency for a constant force at a series of different temperatures. FIG. 14B shows the application of time-temperature superposition where the frequency axis of each curve is scaled to be most similar to the curves at adjacent temperatures. FIG. 14C shows an example "master curve" indicating average indentation as a function of frequency taking contributions from each temperature and the time-temperature superposition scaling. This indentation curve can be transformed into a plot of elastic modulus using an appropriate contact mechanics model. By measuring indentation amplitude and phase (or equivalently the indentation components that are in phase and quadrature with the Lorentz force actuation), it is possible to measure the storage and loss modulus, E' and E". The ratio E"/E' is defined as the loss tangent, or tan δ.

Master curves that plot these properties as a function of temperature and/or frequency can provide crucial information about polymer systems. The low frequency/terminal behavior provides information about flow behavior of the material whereas the higher frequencies provide us with material properties such as Tg, glassy and rubbery plateau moduli. The master curve can be used to predict molecular weight distribution, start up of flow and strain hardening for a polymer using theoretical models. Such measurements are also invaluable to the fundamental research on polymer relaxation not only in terms of verifying the model predictions but also improving the models. A comprehensive master curve is regarded as a material imprint that can be used to estimate material's behavior for a range of application temperatures and durations. In embodiments, the current invention provides a method to extract this information at time scales much shorter than conventional instruments and over much higher frequency ranges.

Activation Energy

Figure 15:
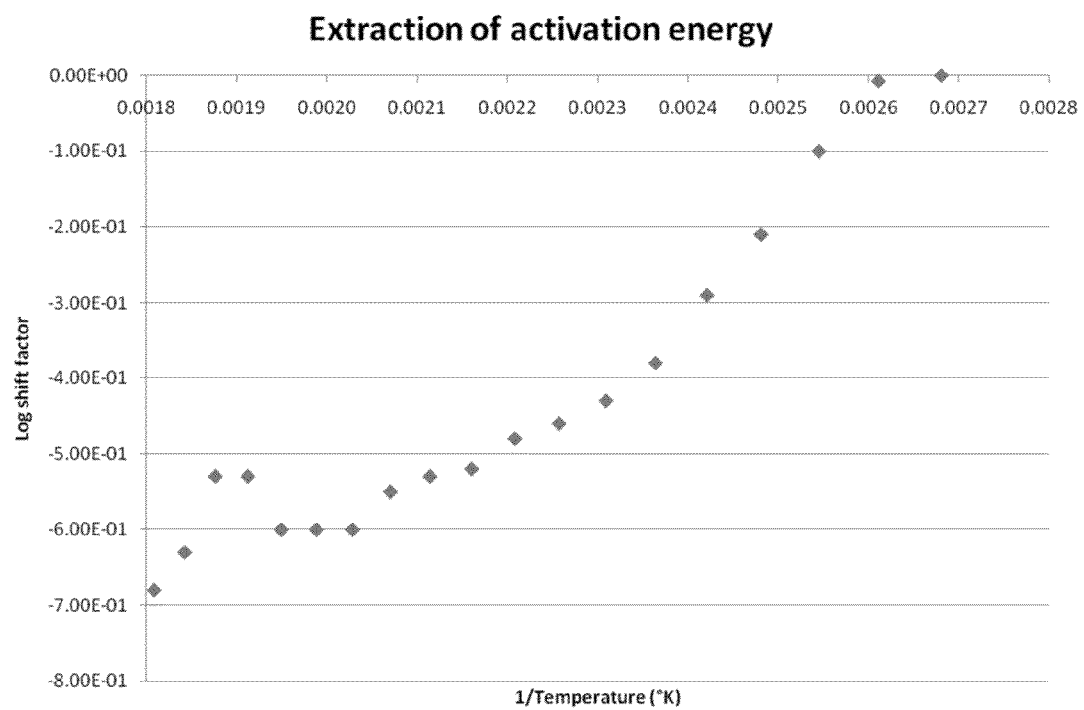
FIG. 15 shows the extraction of activation energies from time temperature superposition.

From the shift factors used in time temperature superposition, one can extract the activation energies of the sample. FIG. 15 shows a plot of the log of the shift factors versus reciprocal temperature (1/T). In the case of Arrhenius behavior, the slope of the log(shift factor) vs 1/T is related to the activation energy. As such it is possible to use the heatable AFM cantilever probes to measure the activation energy of microscopic regions of a sample in very short times.

Concentration of Lorentz Force Near Tip

Figure 16:
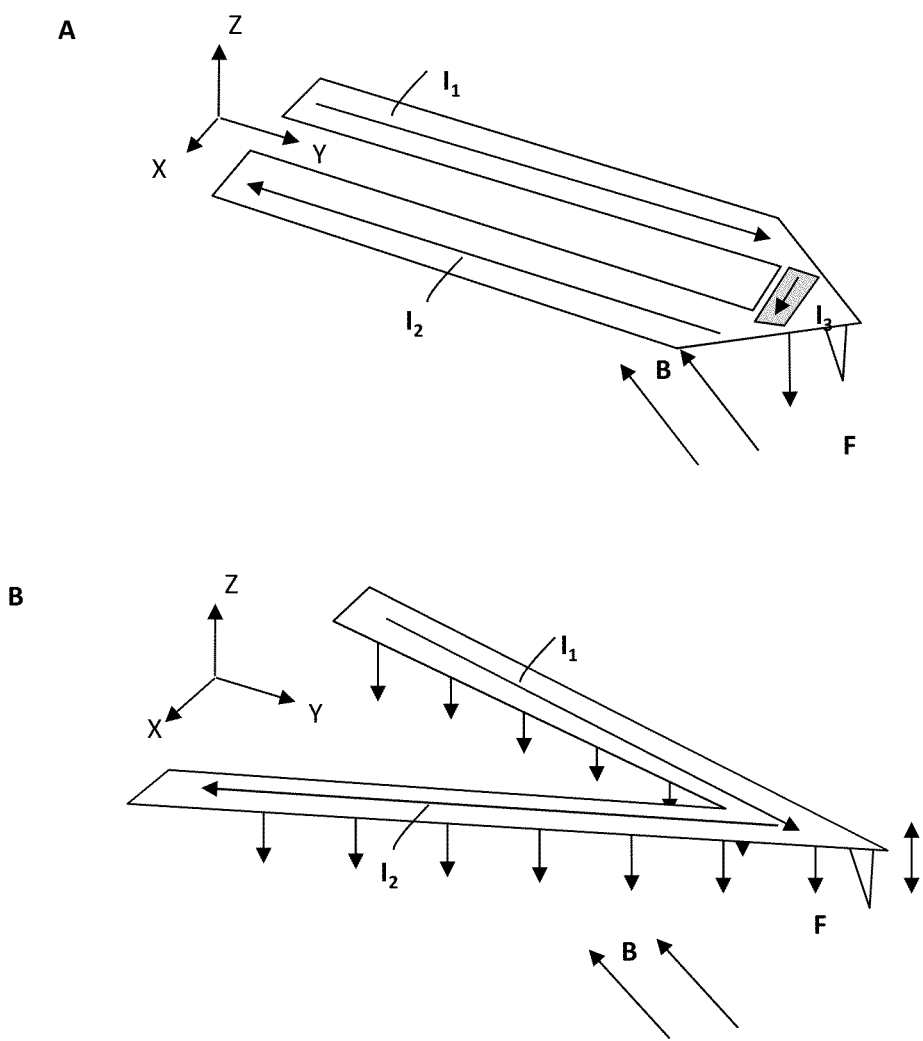
FIG. 16 shows a distribution of Lorentz forces on a self-heated cantilever resulting in the cancellation of net forces in the parallel arms and the center of net force near the tip end of the cantilever.

In embodiments, the current invention has significant advantages versus prior commercial implementation of Lorentz force actuation. A benefit of certain embodiments is that the force is applied very near the end of the cantilever, as discussed previously. This results from the fact that the self-heated cantilevers used in embodiments of the invention preferably have parallel cantilever arms, as shown in FIGS. 1 and 16A. For any arbitrary orientation of the magnetic field, the net Lorentz flexural force on the two arms is in opposite directions and substantially cancel each other. The dominant vertical force is then from Lorentz force on the current segment near the AFM tip. (Note that the magnetic field vectors shown in FIG. 16 are intended to indicate an arbitrary field direction, and not intended to imply a preferred direction of the magnetic field.)

A Lorentz force actuation scheme was previously developed using V-shaped cantilevers for oscillating them in liquid. The inventors are not aware that this technique has been used for measuring mechanical properties of materials, but even in this case the technique would still have significant disadvantages if one were to use it to attempt to measure an indentation into a sample in response to the Lorentz force. Two reasons include that (1) the Lorentz force would be applied over the entire length of the cantilever; and (2) the cantilevers used are very low spring constant and low resonance frequency, thus limiting the force and bandwidth that could be used; and (3) the cantilever deflection signals would be very similar for both hard and soft samples.

Figure 17:
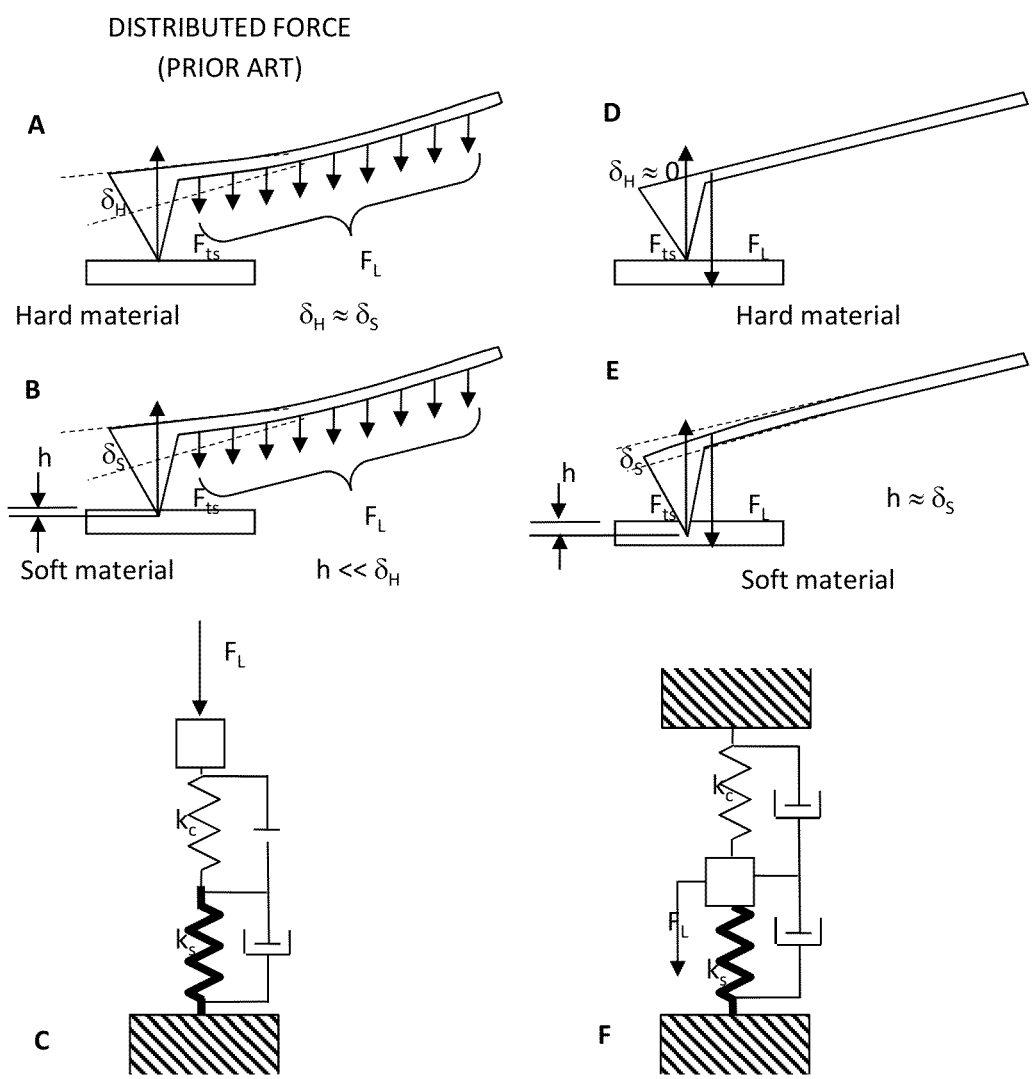
FIG. 17 is an illustration of the force distribution for Lorentz force actuation under an embodiment of the current invention versus the prior art.

The first issue is illustrated in FIG. 16B. In the case of a V-shaped cantilever (FIG. 16B), the two currents $I_1$ and $I_2$ take diagonal paths. While the Lorentz force components of the current in the Y-direction can cancel each other, there is a net force along the entire length of the cantilever from the current component in the X direction. This distributed force creates disadvantages for mapping mechanical properties of materials, as illustrated in FIG. 17 and discussed below. The issue with the prior art is outlined in FIG. 17. Illustrated on the left column (FIGS. 17A-C) is the case where Lorentz force is distributed along the length of the cantilever. Two cases are shown in this column, one where the force is applied on a hard material (FIG. 17A) and one on a softer sample (FIG. 17B). A simplified point-mass model is shown in FIG. 17C. In both cases the softer spring is the cantilever as indicated by stiffness $k_c$. So the vast majority of the applied Lorentz force would go into deflection of the cantilever rather than the indentation of the sample. So both in the case of the hard material and the soft material the cantilever deflections $\delta_H$ and $\delta_S$ are very similar. The indentation into the sample h would be the very small difference between $\delta_H$ and $\delta_S$. Thus any attempt to measure the indentation h would require pulling out a small differential indentation from a large cantilever deflection background.

The "i-drive" system commercialized by Asylum supports two different cantilever spring constants, 0.02 and 0.09 N/m. Within the range of cantilevers used by practitioners of AFM, these cantilever spring constants are known to be "soft." By contrast, the contact stiffness of even a common polymer with an reduced elastic modulus of around 3 GPa would give a surface contact stiffness of around 50 N/m if indented with a 20 nm tip radius using the Hertzian approximation. So the cantilever spring constant is around 500-2500 less than the spring constant of common polymer surface. So if one were attempt to use an "i-drive" type scheme to apply a Lorentz force to indent a polymer surface, the vast majority of the cantilever deflection would be the result of bending the soft spring of the i-drive cantilever, not indentation of the sample. Furthermore, the sample indentation would be of orders of magnitude smaller than the bend of the cantilever. The magnitude of the cantilever bend on a 3 GPa polymer would be very similar to the bend on an infinitely rigid sample.

Now, this situation is compared to embodiments of the current invention. In the embodiments of the current invention, the Lorentz force is applied very close to the tip end of the cantilever as shown in FIGS. 17D-E. In this case a very small deflection and indentation is detected on a hard surface (FIG. 17D), where $\delta_H \approx h \approx 0$. When the Lorentz force $F_L$ is applied on a soft sample (FIG. 2E), by comparison, the indentation h can be measured directly without differential measurement since $h \approx \delta_H$. That is the indentation h is directly proportional to a signal indicative of the cantilever deflection. So measuring the cantilever deflection gives a direct measurement of the indentation of the probe tip into the sample.

There are other advantages to apply the force at the tip end of the cantilever. As shown in FIGS. 17C and 17F the cantilever and sample can be considered (crudely) as a coupled spring/dashpot system. In the case of a distributed force, the cantilever acts essentially like a shock absorber that can attenuate the Lorentz force before it reaches the sample. Above the first resonance of the cantilever, the transmitted force will be substantially attenuated by the transfer function of the cantilever. By comparison, when the force is applied to the end of the cantilever near the tip the motion of the cantilever primarily results from indentation of the sample. Thus the motion of the end of the cantilever is a more direct measurement of the strain resulting from the applied force. This is also an advantage versus conventional AFM force curve measurements one must perform a differential measurement comparing the deflection on an unknown sample to a measurement on a sample assumed to be rigid. The indentation on the unknown sample is the difference between the cantilever deflections on the unknown sample vs. the rigid sample. This differential measurement, while very commonly used, still involves detection a potentially small indentation against a large cantilever deflection background.

High Speed Force Control and Imaging

This section discusses the ability to use Lorentz force actuation under embodiments of the current invention for high speed force control and AFM imaging. In recent years AFM instruments have been commercialized using pulsed force techniques, where the tip is oscillated sinusoidally by a z-actuator at a frequency much lower than the contact resonance to bring the tip in and out of contact with the sample. During the sinusoidal oscillations, the cantilever deflection is measured and versus the position of the z-actuator. For example, products have been commercialized by Witec (Pulsed Force Mode) and Bruker ("PeakForce Tapping"). In these techniques, typically the system converts the measured deflection and z motion into an AFM force curve. From the force curve, one can measure the contact point, stiffness, adhesion, and energy dissipation, for example, as described in U.S. Pat. Nos. 6,880,386 and 7,129,486, and U.S. Patent Application Publication No. 2011/0167524. By repeating this measurement at many locations on a sample one can create an image of the surface topography or other properties of the sample. This technique has been very successful, but is limited in its speed of operation. Typically the cantilever is moved in and out of contact with a large range a piezoelectric actuator, for example an actuator capable of moving the tip or sample by many microns. The stiffness of this actuator and its moving mass can limit the maximum speed at which the pulsed force oscillation can operate.

Embodiments of the current invention have distinct advantages over the prior art. First, since the Lorentz force is applied very near the tip, the system can very efficiently control the tip motion without undue delays or attenuation due to the problem of applying the force on the other side of a soft cantilever spring. Second, the sign of the Lorentz force can be controlled by the direction of the current. So the Lorentz force can apply an attractive or a repulsive force to the AFM tip. Next, the Lorentz force actuation scheme of the current invention has no moving parts except the cantilever itself and thus does not suffer from parasitic resonances that can be excited by moving larger piezoelectric z-actuators. Employing the wide bandwidth of the Lorentz force, the cantilever can be actuated into and away from the surface at frequencies much higher than by large range piezoelectric actuators, including frequencies >100 kHz and >1 MHz.

It is also worthwhile to compare this to conventional tapping mode AFM. In tapping mode AFM, the cantilever is oscillated at resonance. Stiff cantilevers (often >3 N/m and usually ~40 N/m) are normally used for tapping such that the restoring force of the cantilever is sufficient to pull the tip off the surface on each oscillation cycle. For pulsed force mode operation, by contrast, soft cantilevers are usually used, mostly <1 N/m. The z-actuator is responsible for having sufficient range to overcome the adhesion and pull the tip off the surface. The current invention, however, can achieve the best of both worlds. Soft spring constant cantilevers can be used if desired to apply minimal force, and it is not necessary to rely on the cantilever's restoring force or a large actuator to pull the tip off the surface. Instead, embodiments of the current invention can use the large available Lorentz force to overcome attractive forces and pull the tip off the surface. In this way pulsed force imaging can be realized with oscillation frequencies much higher than the prior art.

It is also possible to use Lorentz force and if desired in combination with thermomechanical bending to perform quasistatic indentation experiments like those employed in nanoindenters. In this case the DC current through the cantilever can be ramped up and down to increase and decrease the loading force on the sample. Since the force is applied near the tip, the indentation can be read out directly by measuring the deflection of the cantilever. The inventors have demonstrated generating indentation forces in excess of 1000 nN with Lorentz force actuation with currents.

High Speed Force Control Interleaved with Variable Frequency Measurements

Figure 18:
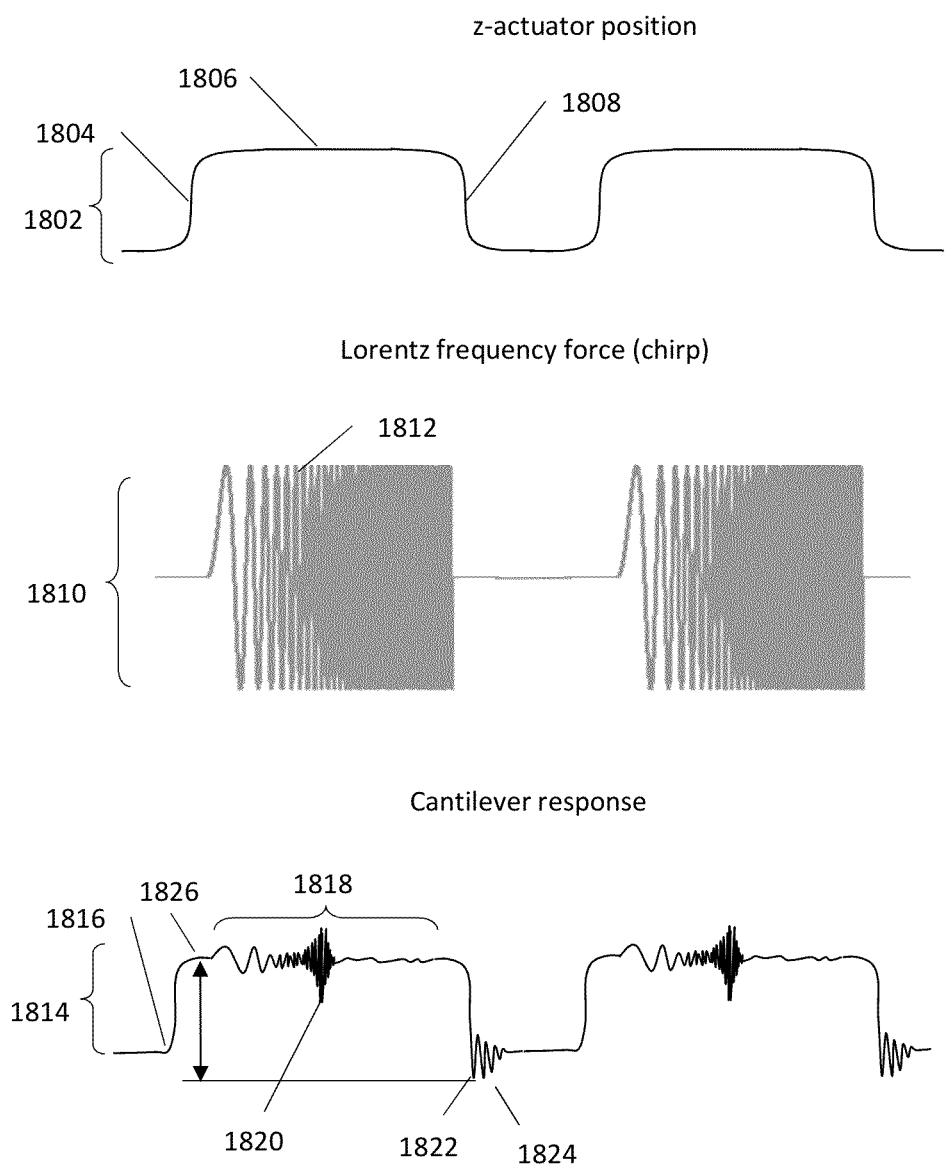
FIG. 18 is an illustration of one embodiment for repeated adjustment of DC force and measurement of dynamic response of a cantilever.

FIG. 18 shows an embodiment of the current invention employed to perform rapid measurements of the cantilever response as a function of frequency, and if desired, as a function of temperature. Three signals are shown in this figure. The top trace (1802) shows a signal used to adjust the average position of the cantilever relative to the sample. In one embodiment this signal drive can be a piezoelectric actuator that moves the cantilever or sample. It can alternately drive the DC current in the cantilever, employing the thermomechanical bending and/or Lorentz force to bring the tip in and out of contact with the sample. In the top trace, we identify three subsets of the waveform. The segment 1804 is the approach ramp, used to approach the tip towards the sample surface, while the segment 1808, the retract ramp, is used to pull the tip back off the surface. The shape of these segments may take many forms. They may be a linear ramp, a portion of a sine wave, trapezoidal profile, or any of a number of sigmoidal functions. The approach and retract ramp also need not be symmetric. Note, specifically, that in embodiments of the current invention there is no need for the approach and retract curves to be consistent sinusoidal oscillations as employed in the prior art. In a preferred embodiment the slopes at the beginning and end of the approach ramp are near zero. In the case of an actuator, this reduces the acceleration impulse that can excite unwanted resonances. The cantilever is then held at a constant average position during optional hold period 1806. During this period, an AC actuation 1810 may be applied to the cantilever via the Lorentz force. The AC actuation may comprise a single frequency oscillation, a series of successive single frequency oscillations over a plurality of frequencies, a chirp waveform (swept frequency sine wave), a pulse, a noise burst or other arbitrary waveform intended to excite the dynamic response of the cantilever and sample. During both the approach ramp, hold period and retract ramp, the cantilever deflection (1814) may be monitored. The cantilever deflection signal (1814) can be analyzed for several quantities. First, point 1816 indicates the point of contact between the tip and sample. Point 1826 indicates the point of maximum static deflection. Region 1818 can be used to determine the dynamic response of the cantilever, for example to determine the frequency of a contact resonance (1820) or more generally the frequency dependent indentation of the sample. As mentioned previously, measuring the indentation of the sample as a function of frequency can be used to determine viscoelastic properties like storage modulus, loss modulus, and tan δ. At the completion of the AC actuation 1812, the cantilever is retracted from the surface with retract ramp 1808. During the process the cantilever tip may experience some adhesion with the sample. Rupture of adhesion at point 1822 can cause free resonance oscillation (1824) of the cantilever. The maximum quasistatic force can be obtained by determining the difference between the cantilever deflection at the point of maximum deflection and from the point of contact (1816), or in the case of significant adhesion, the point of separation (1822). A feedback loop can then adjust the center or maximum point of the subsequent approach ramps 1804 to maintain a desired value of quasistatic tip-sample force.

Figure 19:
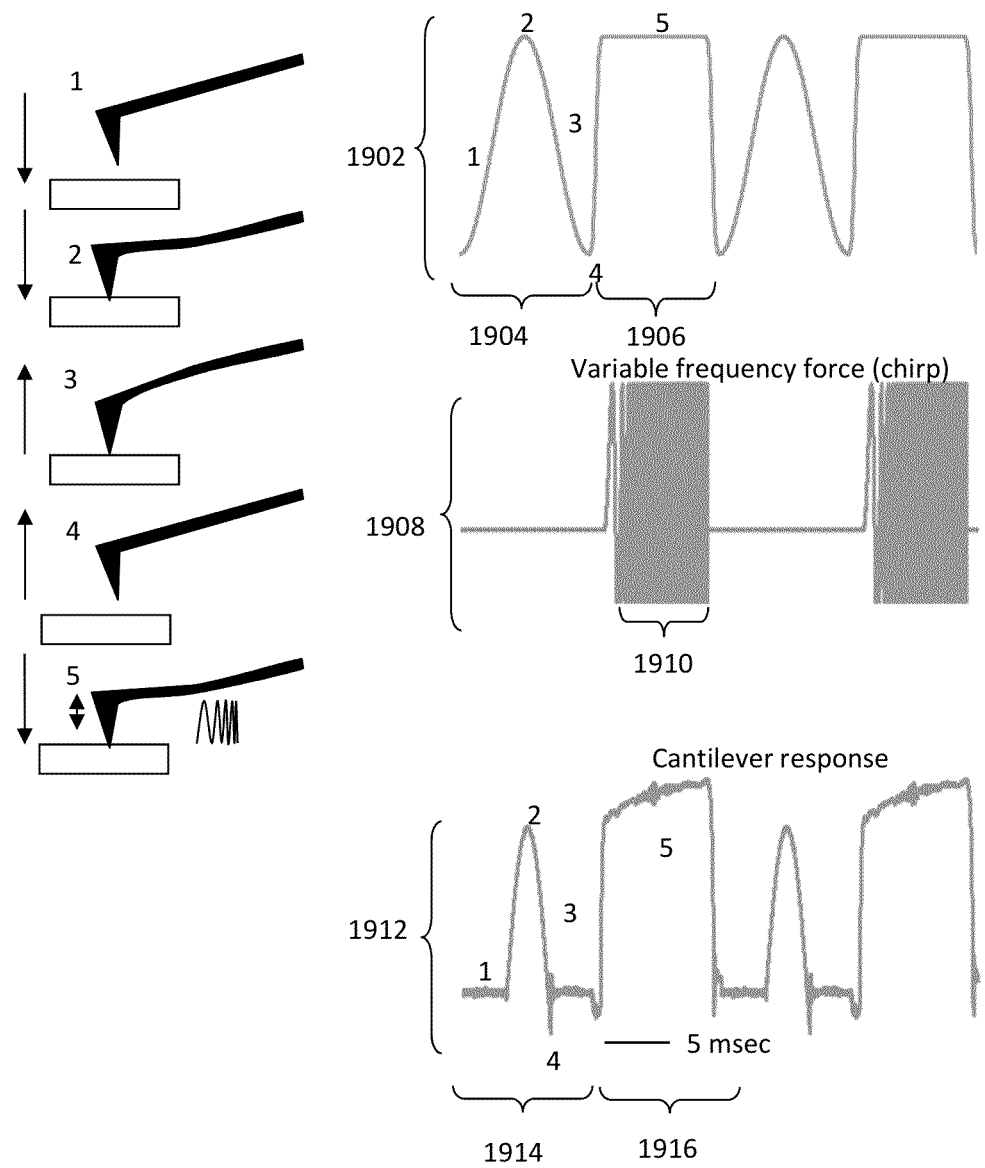
FIG. 19 is an illustration of an alternate embodiment for repeated adjustment of DC force and measurement of dynamic response of a cantilever.

An alternate embodiment is shown in FIG. 19. In this case a slower force curve is interleaved with a swept frequency AC actuation. This type of arrangement may be preferable when one wants to obtain more data point of the cantilever deflection during the approach and/or withdraw ramp, for example to extract quasistatic or low frequency viscoelastic behavior. At left in FIG. 19 there is a series of schematic frames of the measurement comprising a quasistatic force measurement followed by a swept frequency chirp. The frame numbers 1-5 correspond to points identified in the traces at right. The top trace (1902) corresponds again to the signal used to control the average position of the cantilever, for example a piezo electric actuator. The control signal has two main sequences, the approach-retract sequence (1904) and the ramp and hold sequence (1906). The middle trace (1908) shows the variable frequency AC excitation (1910) that is applied during the ramp and hold period (1906). The bottom trace shows the cantilever deflection during the application of the z-actuator control voltage and AC actuation. The first segment (1914) corresponds to the approach retract sequence (1904) and the second sequence (1916) shows the cantilever response to the AC excitation.

Figure 20:
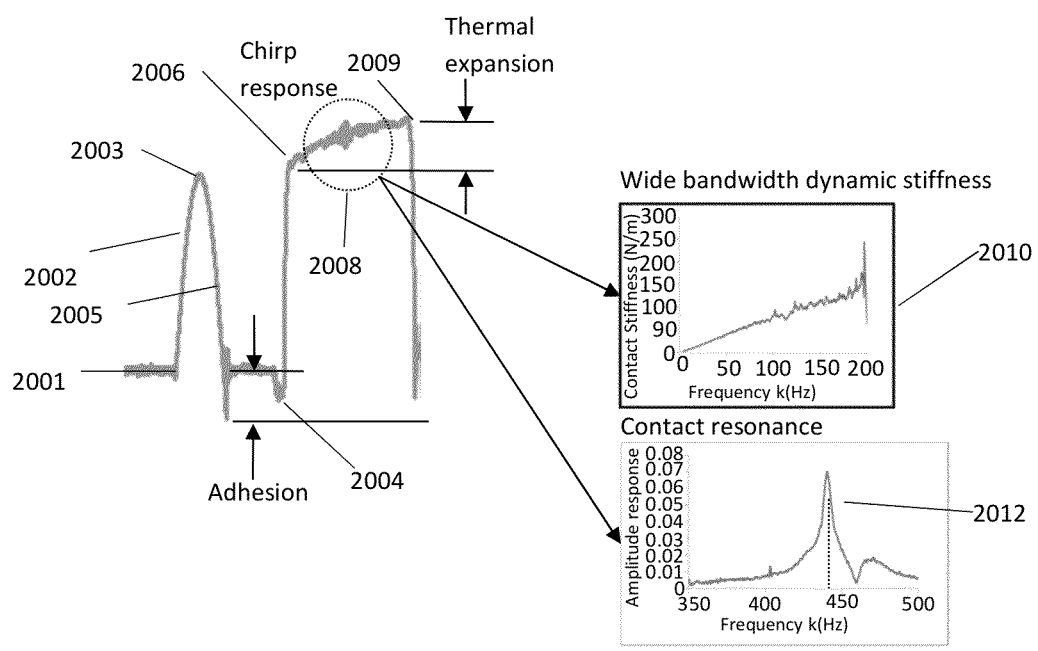
FIG. 20 is an illustration of the extraction of material properties and tip-sample forces from a measurement of the cantilever response.
Figure 21:
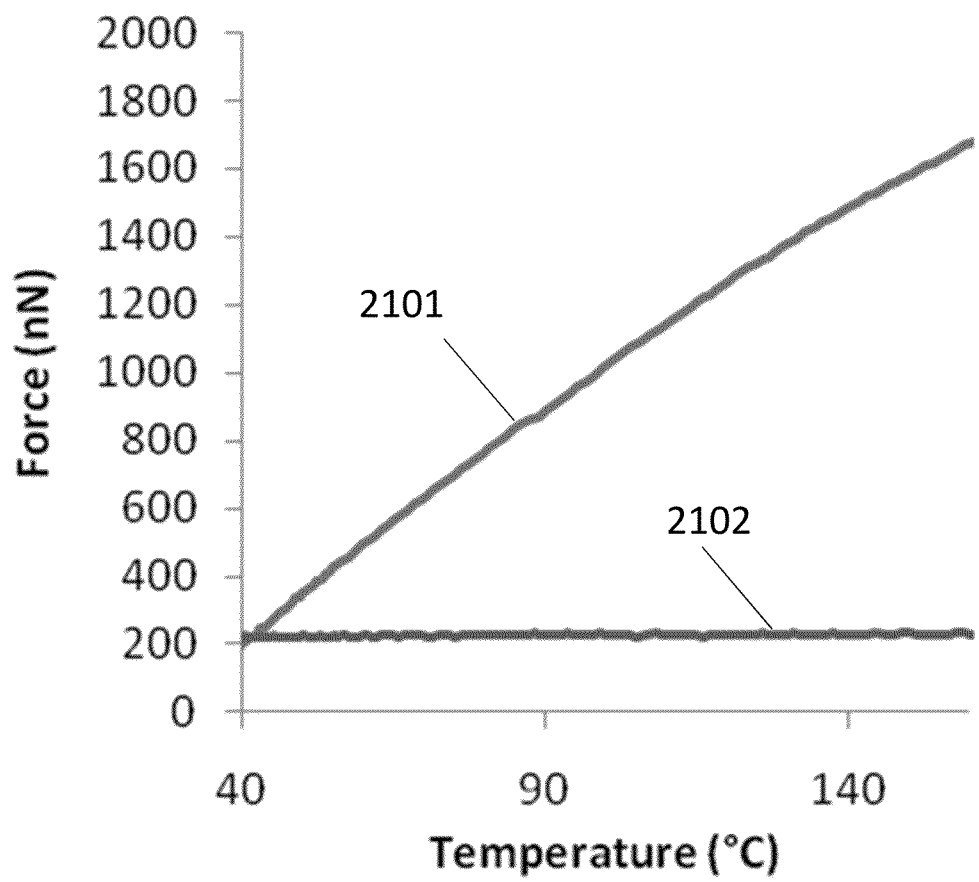
FIG. 21 shows the variation in DC force as a function of temperature under the prior art versus an embodiment of the current invention.

FIG. 20 shows the same cantilever response from FIG. 19, but with some features that can be observed from the measurement. As with the description of FIG. 19, it is possible to determine to static load from the maximum deflection at point 2003 or 2006 versus the baseline/contact point (2001). As before, a feedback loop may be used to adjust the s-actuator control signal to maintain a desired level of contact force. In addition, one can determine the adhesion from the difference between maximum negative deflection and the baseline, as is performed in traditional AFM force curve measurements. The quasistatic elasticity can be determined from the approach (2002) and/or retract (2005) curves using traditional AFM force curve analysis. In addition, with the use of self-heated probes, it is possible to perform a local measure of thermal expansion of the heated region of the sample. The thermal expansion can be obtained by the difference between the peak deflection at the end of the hold period (2009) versus the beginning (2006). Depending on the frequency range selected, the chirp response can be analyzed to determine wideband dynamic stiffness (2010) and/or the contact resonant frequencies (2012).

Force Control During Temperature Ramps

The process of measuring and maintaining a consistent tip-sample force through repeated approach-retract cycles can be especially important during the high speed temperature ramps used in one embodiment of the current invention. In conventional nanothermal analysis, this force is not well controlled. As the tip-sample temperature is ramped in conventional nanothermal analysis, both sample thermal expansion and bimetallic bending of the AFM cantilever conspire to alter the tip-sample force. While force control is a standard part of conventional AFM, the most commonly used AFM force feedback loop fails to maintain a constant force under dramatic temperature changes. The reason is that standard AFM feedback loops for contact mode maintain a constant deflection of the cantilever. In the case of rapid temperature ramps, the bimetallic bending of the cantilever creates a force error that is not corrected by the standard feedback loop. Further, once a material reaches a softening temperature, the feedback loop fails completely, driving the tip further into the surface in its attempt to maintain a constant deflection. In embodiments under the current invention, the tip repeatedly approaches and withdraws from the sample during the temperature ramp, each time correcting for any thermal expansion and or thermal stress bending. FIG. 19 compares the force during a conventional nanoTA temperature ramp with one obtained under the current invention. In this example, the temperature was ramped over 100° C. in a few seconds. During this ramp conventional nanoTA (trace 2101) can induce an 8× change in tip-sample force, while the current invention (trace 2102) maintains a consistent force. This consistent tip-sample force is extremely beneficial for accurate measurements of temperature dependent elasticity, especially using contact resonance measurements where the resonant frequency would otherwise shift with uncontrolled load.

ALTERNATE EMBODIMENTS

Embodiments of the current invention have been described to include self-heatable cantilevers, Lorentz force actuation to measure properties of a sample as a function of temperature, frequency, and/or position on a sample. Substantial benefit can be also obtained by using a subset of these capabilities. For example, it is possible to use non-heating cantilevers but still employ Lorentz force actuation to measure the contact resonance of a sample and/or the wideband dynamic response of a sample. In this case the temperature can be fixed, or the sample temperature can be adjusted using conventional heater/cooler modules used in DMA and AFM. In this case, there is still substantial benefit of the parallel cantilever arm arrangement to provide the majority of the force on the cantilever near the tip end of the cantilever.

Additionally, it is possible to use self-heating cantilever without the Lorentz force actuation. In this case, other actuation mechanisms can be used to excite the cantilever oscillation. These can include external piezoelectric and/or ultrasonic actuators that modulate the cantilever base and/or the sample. It can also include electrostatic, thermomechanical, and piezoelectric actuation of the cantilever arms. In this embodiment, the rapid temperature ramping benefits of the current invention may still be maintained.

In another embodiment is it possible to arrange separate conduction paths for the heater and the Lorentz drive. In this case it can be possible to drive large currents through the cantilever probe arms and ends without necessarily generating large dissipation in the heater. The inventors have recently developed three leg thermal probes incorporating a diode. An arrangement with a diode can be used to control whether or not current passes primarily through a high conduction path or the highly resistive path (the heater).

The heaters in the current commercially available probes are 12 μm×6 μm. This size can be adjusted to increase the Lorentz force. For the optimal orientation of the magnetic field, the Lorentz force is substantially proportional to the length of the conducting path perpendicular to the field. Thus fabrication of a probe with a longer heater element will increase the Lorentz force. For example 24×6 μm would double the Lorentz force. It is also possible to arrange the end region of the cantilever to be partially highly conductive and partially highly resistive. For example it is possible to maintain a heater of 12 μm×6 μm while extending end region of the cantilever with a highly conductive path. This would largely maintain the mechanical properties of the cantilever, while increasing the Lorentz force.

It will be apparent to the skilled artisan that there are numerous changes that may be made in embodiments described herein without departing from the spirit and scope of the invention. Other features not mentioned in the specification, but known to one skilled in the art may be integrated as well without departing from the spirit and scope of the present invention. There are, for example, a wide array of materials, apparatuses, and methods which may be interchangeably used, and there are many changes that may be made in dimensions and so forth to accommodate different needs which may be used, all within the scope of the invention.

The invention may be further understood by the following non-limiting examples.

Example 1

Lorentz Force Actuation of a Heated Atomic Force Microscope Cantilever

The atomic force microscope (AFM) enables nanomechanical measurements with high spatial resolution. Some AFM imaging modes require the cantilever tip to oscillate in contact with or near the surface. The cantilever oscillation can be actuated with piezoelectric, electrostatic, photothermal, thermo mechanical and magnetic schemes. The integration of cantilever actuation with other cantilever functions, such as integrated heating, has not been fully explored. This example presents magnetic actuation of a self-heating cantilever.

Magnetic actuation induced by Lorentz force is relatively less considered as an actuation mechanism, but it is also easy to implement to a cantilever by defining current path through the cantilever and place it in the external magnetic field. It does not have upper limit in actuation frequency, and enables individual control of temperature and deflection on cantilever at the same time. However, only a few published papers have dealt with Lorentz force actuation, and there is no consideration about magnetic field direction and thermomechanical crosstalk.

This example reports Lorentz force induced actuation on silicon microcantilevers considering the magnetic field direction and crosstalk with thermomechanical actuation. And using the actuation scheme, individual heating and actuation control is demonstrated by measuring material softening temperature of polymer.

Theory and Instrumentation.

FIG. (22a) shows a schematic of the cantilever actuated by Lorentz force. An oscillating current passes through cantilever, and the cantilever is held close to a permanent magnet. The Lorentz force exerted on the cantilever is governed by the current through the cantilever and the external magnetic field $$F(B) = l(I \times B) \quad (1)$$

where l is the length of current passage, I is the current vector, and B is the magnetic field vector. The current flowing through the cantilever changes directions as it follows the cantilever shape. The Lorentz force acting on each section is accounted for separately and then added together to obtain the net force exerted on the whole cantilever. The Lorentz force is equal and opposite on the two cantilever legs, and can be neglected. Therefore, the net force acting on the cantilever is governed by only $l_y$, yielding $$F(B) = 2Il \sin \phi (B_x \hat{x} + B_z \hat{z}), \quad (2)$$

where $\hat{x}$ and $\hat{z}$ are directional unit vectors, and $2l \sin \phi$ denotes the distance between the two legs (31 µm). The force acting perpendicular to the cantilever, which is responsible for the cantilever deflection, is $$F_{\perp}(B) = 2Il \sin \phi (B_Z \sin \theta + B_x \cos \theta). \quad (3)$$

Since the cantilever tilt angle $\theta$ is usually quite small, 11° for this experiment, the cantilever deflection is dominated by $B_x$ rather than $B_z$. That is, the Lorentz force from the parallel magnetic field to the cantilever is larger than the Lorentz force from the perpendicular field.

A magnetic dipole m generated by the closed current loop may also induce the force by interacting with magnetic field gradient as $$F(\nabla B) = \nabla(m \cdot B) = \nabla(IS \cdot B), \quad (4)$$

where S is the area vector pointing normal to the area surrounded by the current loop. Because the m is dominated by the triangular region of the cantilever where the magnetic field is highly concentrated, therefore, the S should be the area surrounded by the triangular region. Then the force perpendicular to the cantilever due to this magnetic field gradient is approximated as $$F_{\perp}(\nabla B) \approx Il^2 \sin\phi \cos\phi \left( \frac{dB_x}{dz} + \frac{dB_z}{dz} \right). \quad (5)$$

However, although the field gradient is quite larger than the field itself near the magnet surface, the force of Eq. (5) is at least two orders of magnitude smaller than that of Eq. (3) owing to the very small $l^2$ term. The force acting on the cantilever is dominated by the magnetic field, and not by the magnetic field gradient.

Figure 22:
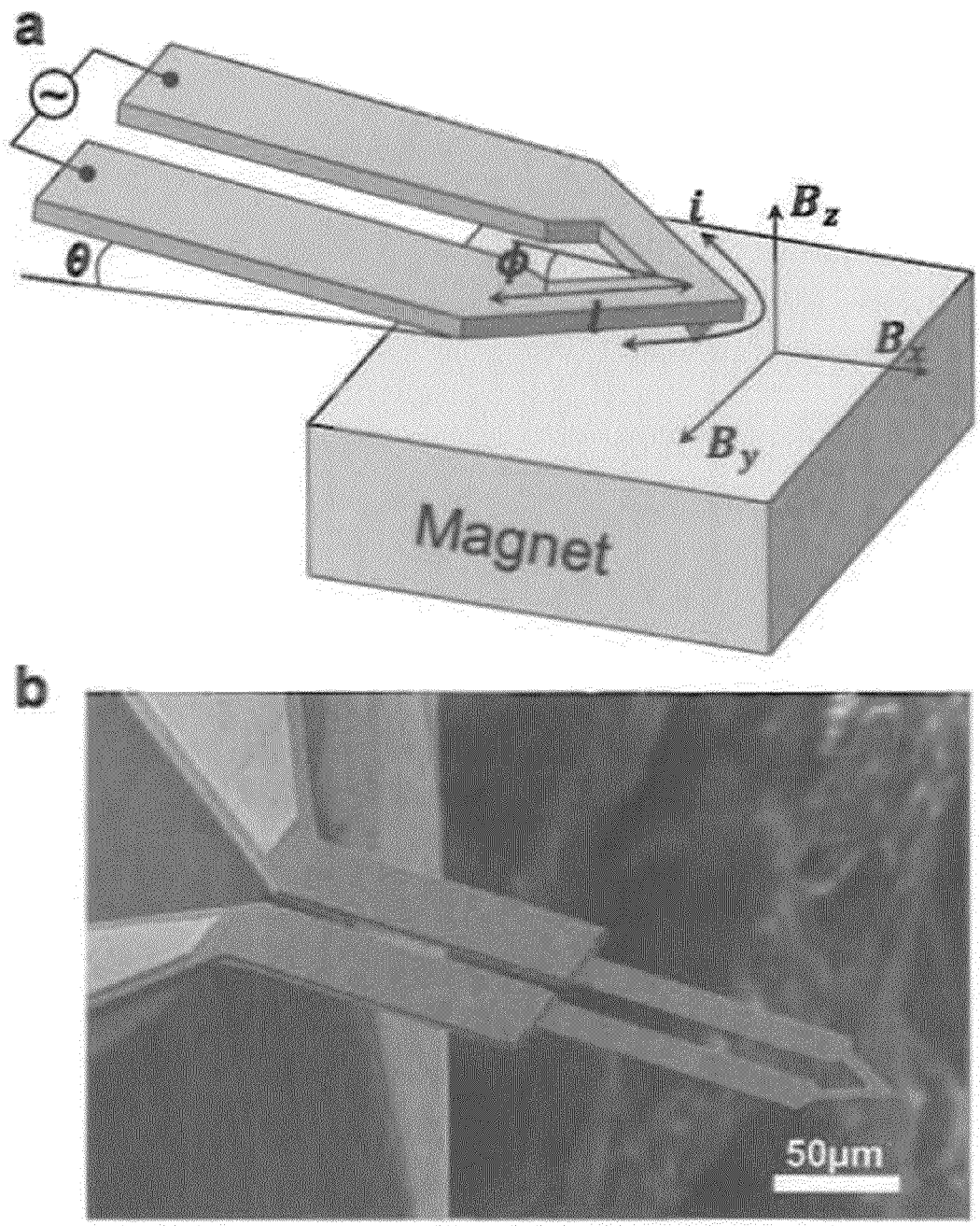
FIG. 22 shows (a) a schematic of magnetic fields and the cantilever with oscillating current on it; (b) scanning electron microscope (SEM) image of the cantilever used in an experiment.
Figure 23:
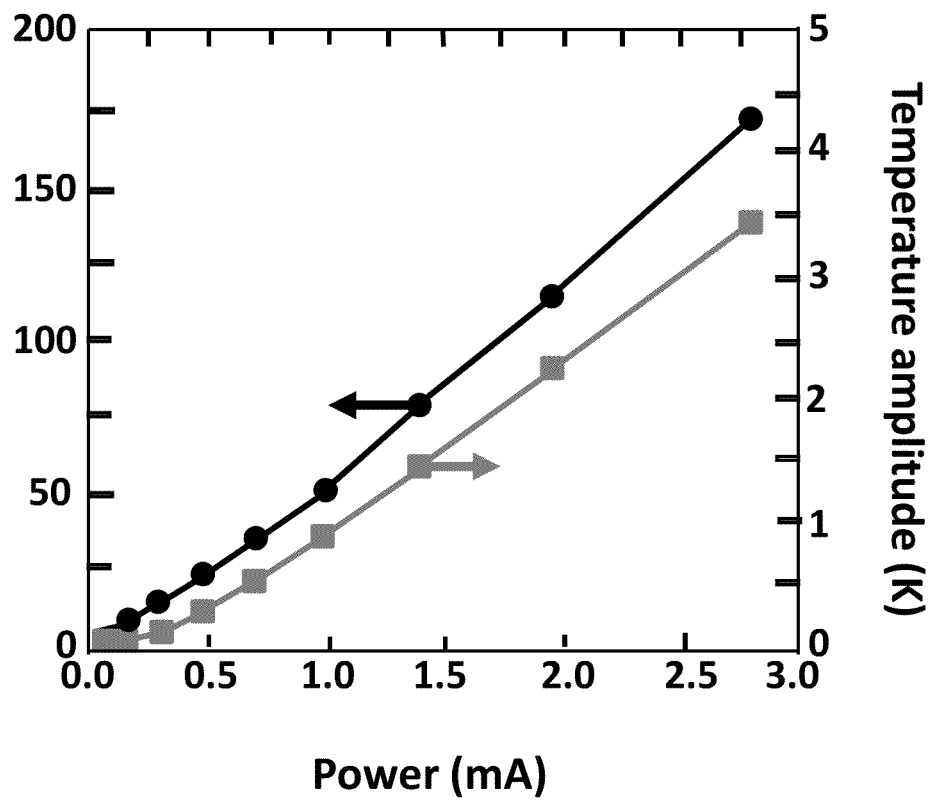
FIG. 23 shows data providing static and periodic temperature of a cantilever versus power.

FIG. 22(b) shows a scanning electron microscope (SEM) micrograph of the doped silicon micro-cantilever used in the experiment. This type of self-heated cantilever was originally designed for data storage, but has also been used for thermal-imaging, nanolithography and nano thermal analysis. The unique nature of the current loop enables the Lorentz force actuation described in this example. The cantilever used in the experiment was 170 µm long and 1 µm thick, and its resonance frequency and spring constant was 65.4 kHz and 0.55 N/m. The cantilever was mounted in an MFP-3D AFM (Asylum Research) and powered by a function generator while placed near a NdFeB cube magnet. Since the Lorentz force is governed not by voltage but by current, the cantilever was operated in series with an external resistor having much higher resistance (47 kΩ) than the cantilever (1.9 kΩ) to keep the total resistance of the circuit to be constant, making the pure harmonic voltage source close to the pure harmonic current source.

Current flow through the cantilever induces a Lorentz force as well as a resistive heating within the cantilever. The temperature rise associated with the resistive heating induces thermomechanical deflections. An AC current having angular frequency ω results in Lorentz deflection oscillating at ω, and also generates temperature oscillation in the cantilever at 2ω, leading to thermomechanical deflection also at 2ω. The cantilever deflection signal from the AFM was measured using an SR 850 lock-in amplifier (Stanford Research Systems) to investigate both Lorentz (1ω) and thermomechanical (2ω) deflections.

Since the thermomechanical deflection was linearly proportional to the temperature rise, the static and oscillating temperature were measured using Raman spectroscopy and 3ω method, respectively.

To compare the experimental result to theory, the Lorentz force under this circumstance was calculated from the magnetic field around the magnet. The 3D magnetic field and the gradient around the cube magnet were calculated by using COMSOL. Then the Lorentz force acting on the cantilever near the magnet was calculated from the magnetic field and the current applied to the cantilever, using Eqs. (3) and (5). Because the calculation evaluates force, whereas the measurement yields deflection, the cantilever deflection was converted into force with the spring constant of the cantilever (k=0.55 N/m). The magnet strength was the only unknown, and it was used as the fitting parameter.

Experiments and Results.

A. Deflection Spectra Versus Power and Frequency.

FIGS. 2(a) and 2(b) show the deflection amplitude of the cantilever with 1 mA sinusoidal current $I \sin [2\pi(f_0/n)t]$, where $f_0 = \omega_0/2\pi$ is the cantilever fundamental resonance frequency. At low frequency below the thermal time constant of the cantilever, both the thermomechanical and Lorentz deflection are nearly constant, and correspond to the static deflection. The static thermomechanical deflection is two times larger than the deflection amplitude at low frequency shown in FIG. 2(a), because the thermomechanical deflection always occurs in one direction regardless of the current direction, making the deflection amplitude to be half of the maximum deflection. In this static regime, the thermomechanical deflection is higher than the Lorentz deflection. As the frequency increases, the cantilever deflection by Lorentz force does not show a distinct dependency on the frequency, however, the thermo-mechanical deflection decreases significantly when the actuation frequency exceeds the cantilever thermal time constant which is on the order of 100 µs. The Q factor of the silicon cantilever was about 66, and so the discrepancy between the Lorentz and thermomechanical deflections becomes further severe at the resonance frequency, making the Lorentz deflection 1000 times higher than thermomechanical deflection. The thermomechanical deflection is relatively small because the cantilever is made of only single crystal silicon which induces little bimaterial deflection, and the heater located at the cantilever end does not uniformly heat the entire cantilever. Hence, the cantilever actuation near the resonance is purely induced by Lorentz force. The deflection amplitude by Lorentz force reaches to 336 nm at the resonance, sufficiently high not only for the applications detecting resonance shift such as mass sensing but also for general tapping-mode imaging.

The usefulness of the actuation scheme is validated by imaging a calibration grating with Lorentz actuation. The grating having 100 nm trenches were placed on the magnet, and the cantilever was powered with the internal function generator of the AFM. This AFM function generator. called DDS, originally supplies voltage to the piezoactuating oscillator on the cantilever holder, implementing the feedback loop of the AFM fully with the Lorentz actuation. FIG. 4 is the tapping-mode image acquired from this experiment, which shows no difference compared to the normal piezo-driven imaging.

As the Lorentz and thermomechanical deflection are governed by current and temperature, the two deflection mechanisms on the current and temperature are related to examine the crosstalk between them. The static and oscillating temperature, as stated previously, were measured by Raman spectroscopy and 3ω method, respectively. It should be noted that all the temperature here are the heater temperature at the cantilever end, implying the much small temperature than the measurement is actually responsible for the thermomechanical deflection. However, the thermally linear system ensures the cantilever temperature linearly corresponding to the heater temperature, enabling valid physical interpretation.

FIG. 3(c) shows the amplitude of the temperature oscillation and the thermomechanical deflection as a function of the cantilever current frequency. FIG. 3(b) shows the static temperature rise and the temperature amplitude of oscillation at resonance, which are responsible for the static deflection and deflection amplitude at resonance. The temperature amplitude at resonance is only 3.5 K, resulting in a relatively small deflection. However, the huge static temperature rise (172 K) induces a large static thermomechanical deflection.

Figure 24:
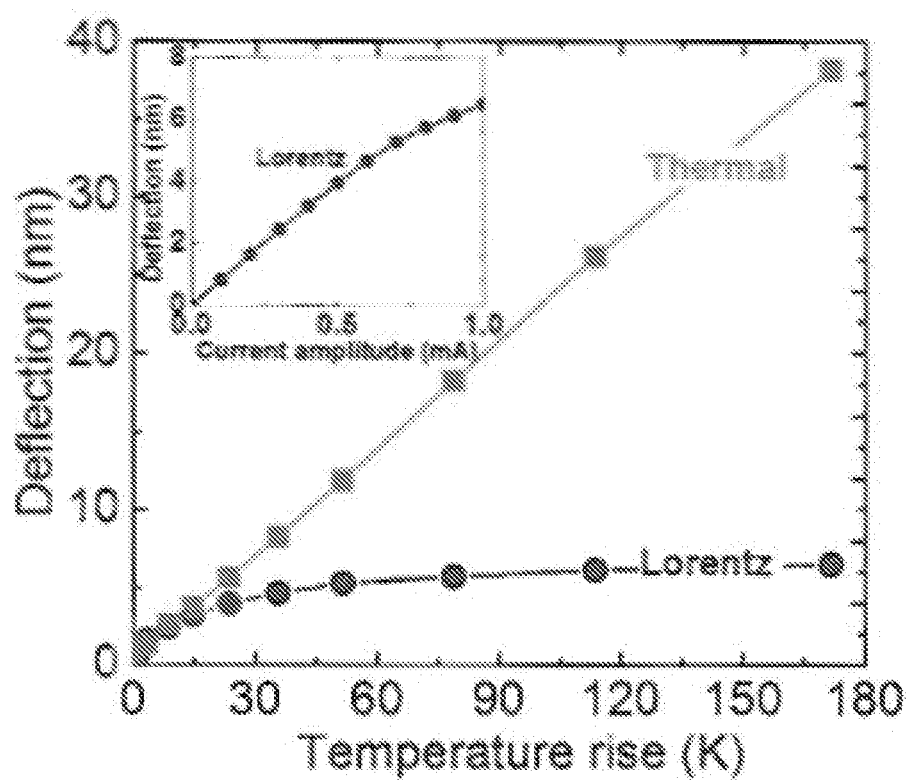
FIG. 24 shows static cantilever behaviors due to the Lorentz force and thermomechanical bending including the static deflections versus the temperature rise. Inset shows that the Lorentz deflection is linearly proportional to the applied current.

FIGS. 24 and 3(a) show the static and oscillating cantilever behavior as a function of the temperature and applied current. The static thermomechanical deflection is linear with the temperature rise, and the Lorentz deflection also shows good linearity to the current both in steady-state and at resonance, as expected by principle. Since the thermomechanical deflection decreases as fast as the frequency increases, it (0.32 nm) is far smaller than the Lorentz deflection (10.5 nm) even at thermomechanical resonance ($f_0/2=32.7$ kHz). Therefore the thermomechanical deflection shown in FIG. 3(a) is not purely thermomechanical, but contains harmonic artifacts of Lorentz deflection. However, it still shows quadratic relations to the current, meaning that the Lorentz deflection is quite close to pure harmonic oscillation.

B. Influence of Field Direction on Lorentz Force.

The direction of the magnetic field is critical for Lorentz actuation. Here, the effect of the magnet field direction on Lorentz force is investigated by changing the cantilever location relative to the magnet, and also by changing the magnet orientation. The cantilever placed 200 μm above the 3 mm-big cube magnet and powered by 0.2 mA sinusoidal current. The cantilever deflection was measured as a function of lateral position, resulting in a 2D map of cantilever deflection amplitude with 100 μm spatial resolution. FIG. 5 shows the 2D deflection maps above a cube magnet for different magnet orientations (O1, O2, O3). The experiment also performed above a circular disk magnet (O4). For the magnetic orientation of O1 and O4, the vertically aligned pole, the maximum deflection can be achieved along the edge of the magnet where the $B_x$ is maximized, and there's a zero deflection region, implying the forces by $B_x$ and $B_z$ are canceled out. FIG. 5(d) shows the maximum deflection line along the magnet edge. For O2, the magnetic pole aligned parallel to the cantilever, the deflection amplitude is quite uniform except the edge of the magnet since $B_z$ is the dominant magnetic field direction with this magnet orientation. The experiment in previous chapter was performed with this orientation because almost constant deflection amplitude regardless of the cantilever position facilitates easy experiment, especially in imaging. Eq. (3) means that $B_y$ does not induce the cantilever deflection, therefore, there's no deflection along the center line (y=0) on the magnet with magnetic orientation of O3, where the only existing magnetic field is $B_y$.

FIG. 6(a) shows the calculated magnetic field around the cube magnet with vertical pole (O1), on the xz plane (y=0). FIG. 6(b) shows the calculation and measurement of the Lorentz force with vertical and horizontal magnetic field (O1, O2), which compare very well. The Lorentz force with the O3 magnet orientation is zero in both calculation and measurement. The field strengths of the magnet used to fit the experiment and calculation are different for each magnet orientation, 0.41 T for O1 and 0.26 T for O2.

FIG. 7 shows the portion of the force induced by each magnetic field direction, giving a clear insight about the dependence of Lorentz force on the magnetic field direction and magnet orientation. As predicted from Equations (3) and (5), $B_x$ dominates the Lorentz force acting on the cantilever and the force induced by the magnetic field gradient is indistinguishably small so is not plotted on the figure.

C. Detecting Material Softening by Lorentz nanoTA.

As one application of Lorentz force actuation, nanoTA (nanoscale thermal analysis) was performed to sense the glass transition temperature $T_g$ of a polymer by looking at the shift of contact resonance frequency. The conventional nanoTA works by detecting a slight penetration of the tip into the sample at $T_g$, while increasing the tip temperature. The problem of the method is that, the $T_g$ for highly filled and highly cross-linked materials are not easy to detect because the softening at $T_g$ is insufficient and the thermal expansion is quite large near the $T_g$, counteracting the softening. However, by sensing the resonance frequency shift, the measurement becomes free from this problem.

The measurement was done on randomly selected 4 regions of a nonconducting underfill epoxy (CHIPCOAT U8437-2, NAMICS Corporation). This is a highly filled epoxy (2-10 μm silica particles) that improves the mechanical and thermal performance of the material, making it hard to use conventional nanoTA method. A small printed circuit board with a sample of the epoxy was placed on a 12.7 mm×1 mm thick NdFeB disk magnet such that the region of interest on the sample was at the outer diameter of the magnet, where the Lorentz deflection maximum. A self-heating AFM cantilever (AN200, Anasys Instruments) was periodically approached to the surface to determine the point of contact with the sample. After each tip approach, the cantilever was moved to a selected loading force and then a chirp waveform ($2V_{pp}$ AC) was applied across the legs of the cantilever. A DC voltage was applied across the heater to ramp the probe temperature from just over ambient to above the glass transition temperature. Approach curves were repeated during this process to ensure a constant loading force even as the temperature was ramped.

FIG. 8 shows the contact resonance frequency versus the temperature at the tip, indicating the peak of the resonance frequency corresponding to the $T_g$. The $T_g$ specified by the manufacturer (137° C.) is in good agreement with the average $T_g$ observed in the measurements, however, the contact resonance nanoTA measurements show local variations not observable in bulk $T_g$ measurements. This shows that the method can resolve the local $T_g$ change, allowing for extraction of the information of local composition difference.

REFERENCES

K. Yamanaka and S. Nakano, Applied Physics A: Materials Science & Processing 66 (0), S313-S317 (1998).

U. Rabe, in Applied Scanning Probe Methods II, edited by B. Bhushan and H. Fuchs (Springer Berlin Heidelberg, 2006), pp. 37-90.

P. A. Yuya, D. C. Hurley and J. A. Turner, Journal of Applied Physics 104 (7), 074916 (2008).

G. Stan and W. Price, Review of Scientific Instruments 77 (10), 103707 (2006).

G. Binnig. C F Quate and C Gerber. Phys Rev Lett 56 (9). 930-933 (1986).

T. Sulchek, R. Hsieh, J. D. Adams, S. C. Minne, C. F. Quate and D. M. Adderton, Rev Sci Instrum 71 (5), 2097-2099 (2000).

J. Lee and W. P. King, Rev Sci Instrum 78 (12),-(2007).

A. Buguin. O. Du Roure and P. Silberzan, Appl Phys Lett 78 (19), 2982-2984 (2001).

O. Enders, F. Korte and H. A. Kolb, Surf Interface Anal 36 (2), 119-123 (2004).

P. Vettiger, G. Cross, M. Despont, U. Drechsler, U. Durig, B. Gotsmann, W. Haberle, M. A. Lantz, H. E. Rothuizen, R. Stutz and G. K. Binnig, IEEE Transactions on Nanotechnology 1(1), 39-55 (2002).

K. J. Kim, K. Park, J. Lee, Z. M. Zhang and W. P. King, Sensors and Actuators A-Physical 136(1). 95-103 (2007).

K. Park, J. Lee, Z. M. Zhang and W. P. King Rev Sci Instrum 78(4),-(2007).

R. Szoszkiewicz, T. Okada, S. C. Jones, T. D. Li, W. P. King, S. R. Marder and E. Riedo, Nano Letters 7(5), 1064-1069 (2007).

B. A. Nelson, W. P. King, A. R. Laracuente, P. E. Sheehan and L. J. Whitman, Appl Phys Lett 88(3), 033104 (2006).

W. P. King, S. Saxena, B. A. Nelson, B. L. Weeks and R. Pitchimani, Nano Letters 6(9), 2145-2149 (2006).

B. A. Nelson and W. P. King, Rev Sci Instrum 78 (2),-(2007).

C. Dames and G. Chen, Rev Sci Instrum 76(12),-(2005)

J. Lee, T. B. Beechem, T. L. Wright, B. A. Nelson, S. Graham and W. P. King, Journal of Microelectromechanical Systems 15(6), 1644-1655 (2006).

K. Park, J. Lee, Z. M. M. Zhang and W. P. King, Journal of Microelectromechanical Systems 16(2), 213-222 (2007).

D. G. Cahill, Review of Scientific Instruments 61(2), 802-808 (1990),

U.S. Pat. Nos. 7,055,378, 7,658,097, 6,862,923, 7,497,613, 6,983,644, RE36,488, 6,880,386, 7,129,486.

U.S. Patent Application Publications 2011/0167524.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of operating a probe microscope to characterize a region of a sample with sub-micron spatial resolution, the method comprising the steps of:
   a. interacting a probe tip of a self-heating cantilever probe with a surface of the sample;
   b. providing a magnetic source that generates a magnetic field in proximity to the cantilever probe; and
   c. passing a current through the self-heating cantilever probe so as to generate a force on the cantilever probe due to an interaction between the current and the magnetic field.

2. The method of claim 1, further comprising the step of measuring a signal indicative of a motion of the cantilever probe.

3. The method of claim 1 wherein the magnetic field is substantially aligned along a length of the cantilever probe.

4. The method of claim 1 wherein the current is an alternating current at one or more frequencies, thereby generating an oscillatory force on the cantilever.

5. The method of claim 4 further comprising repeating the current passing step at a plurality of frequencies and measuring a frequency dependent response of the cantilever probe interacting with the sample surface.

6. The method of claim 5 further comprising the step of determining a contact resonant frequency of the cantilever probe.

7. The method of claim 5 further comprising the step of measuring a viscoelastic response of the sample.

8. The method of claim 1 further comprising the step of using the cantilever probe to heat a region of a sample and repeating the current passing step at a plurality of controlled cantilever temperatures.

9. The method of claim 8 further comprising the step of determining a thermal transition temperature of the region of the sample by detecting a change in oscillatory motion of the cantilever probe as a function of measured temperature in response to an AC current passed through the cantilever probe.

10. The method of claim 9 wherein the thermal transition is a glass transition.

11. The method of claim 8 wherein the sample comprises a thin film having a thickness of less than 100 nm.

12. The method of claim 8 wherein the sample comprises a filled polymer having a fill percentage of greater than 10% by volume.

13. The method of claim 8 wherein the sample comprises a polymer having a crystallinity percentage greater than 10% by volume.

14. The method of claim 8 wherein the sample comprises a polymer having a crosslink percentage greater than 10% by volume.

15. The method of claim 6 further comprising the step of repeating the step of determining a contact resonant frequency at a plurality of cantilever probe temperatures.

16. The method of claim 15 further comprising the step of determining a thermal transition temperature of a region of the sample surface by detecting a change in the contact resonance frequency of the cantilever probe as a function of temperature.

17. The method of claim 4 wherein a frequency of the oscillatory force is greater than 10 kHz.

18. The method of claim 4 wherein a frequency of the oscillatory force is greater than 100 kHz.

19. The method of claim 4 further comprising the step of calculating a signal indicative of a viscoelastic property of a region of the sample at a plurality of temperatures.

20. The method of claim 19 wherein the viscoelastic property comprises a property selected from the group consisting of: E', E", tan(delta) and any combination of these.

21. The method of claim 19 further comprising the step of applying time temperature superposition to generate a master curve of the viscoelastic property of the region of the sample.

22. The method of claim 21 further comprising the step of using time-temperature superposition factors to calculate an activation energy of the region of the sample.

23. The method of claim 1 further comprising the step of repeating the passing step at a plurality of regions of the sample to create a spatially resolved map of a property of the sample.

24. The method of claim 23 wherein the property of the sample is selected from the group consisting of: topography, elasticity, damping, storage modulus, loss modulus, tan (delta), glass transition temperature, melting temperature and any combination of these.

25. The method of claim 1 further comprising the step of adjusting a frequency of AC current passed through the cantilever probe such that the frequency substantially corresponds to a resonance frequency of the cantilever probe.

26. The method of claim 25 wherein the resonance frequency corresponds to a contact resonant frequency of the cantilever probe in contact with the sample.

27. The method of claim 1 wherein the cantilever probe comprises two substantially parallel arms such that a Lorentz force on each of the two arms substantially cancels and a primary net force is generated at a tip end of the cantilever probe.

28. The method of claim 8 wherein the temperature of the cantilever probe is ramped at more than 100° C./minute.

29. The method of claim 1, further comprising a step of controlling a temperature of the cantilever probe.

30. The method of claim 29, wherein the step of controlling a temperature of the cantilever probe comprises heating the cantilever probe by a temperature of more than 3° C., more than 5° C. or more than 10° C.

31. The method of claim 29, wherein the step of controlling a temperature of the cantilever probe comprises measuring and maintaining the temperature of the cantilever probe within 1° C. of a selected temperature over a period of 1 μs or more, over a period of 10 μs or more, over a period of 100 μs or more or over a period of 1 ms or more.

32. The method of claim 29, wherein the step of controlling a temperature of the cantilever probe comprises heating the cantilever probe to a selected temperature and continuously or periodically measuring the temperature of the cantilever probe.

33. The method of claim 1, further comprising a step of controlling the force on the cantilever probe.

34. The method of claim 33, wherein the step of controlling the force on the cantilever probe comprises providing a change in frequency, a change in magnitude or both changes in frequency and magnitude of said current passing through the self-heating cantilever probe.

35. The method of claim 33, wherein the step of controlling the force on the cantilever probe comprises changing a strength of said magnetic field.

36. The method of claim 1, wherein said self-heating cantilever probe comprises a heater region having an electrical resistivity selected over the range of $1 \times 10^{-5}$ Ω-cm to 15 Ω-cm.

37. The method of claim 36, wherein said heater region comprises a thermistor.

38. A method of operating a probe microscope to characterize a region of a sample with sub-micron spatial resolution, the method comprising the steps of:
  a. interacting a probe tip of a cantilever probe with a surface of the sample;
  b. providing a magnetic source that creates a magnetic field in proximity to the cantilever probe;
  c. passing a current through the cantilever probe so as to generate a force on the cantilever probe due to an interaction between the current and the magnetic field, wherein the cantilever probe comprises two substantially parallel conductive arms and a conductive end region; and
  d. measuring a signal indicative of the motion of the cantilever.

39. The method of claim 38 wherein the current comprises an alternating current at one or more frequencies, thereby generating an oscillatory force on the cantilever probe.

40. The method of claim 39 further comprising the step of repeating the passing and measuring steps at a plurality of frequencies and measuring a frequency dependent response of the cantilever probe interacting with the sample surface.

41. The method of claim 40 further comprising the step of determining a contact resonant frequency of the cantilever probe in contact with the sample.

42. An apparatus for characterizing a region of a sample with sub-micron spatial resolution, the apparatus comprising:
   a. a cantilever probe comprising an integrated heater and a probe tip;
   b. a magnetic source positioned proximate to the cantilever probe;
   c. an AC current source positioned in electrical communication with the cantilever probe, the AC current source for driving a current through the integrated heater of the cantilever probe to generate a Lorentz force on the cantilever probe; and
   d. a deflection measurement system positioned to measure a signal indicative of an oscillatory motion of the cantilever probe.

43. The apparatus of claim 42 further comprising a DC current source positioned in electrical communication with the cantilever probe, the DC current source for driving current through the integrated heater of the cantilever probe to adjust the static temperature of the cantilever probe.

44. The apparatus of claim 42 further comprising a demodulator positioned in electrical communication with the deflection measurement system, the demodulator for determining a property of the oscillatory motion of the cantilever probe, wherein the property is selected from the group consisting of: amplitude, phase, frequency and any combination of these.

45. The apparatus of claim 42 further comprising a self-resonance tracker positioned in electrical communication with the deflection measurement system and the AC current source, the self-resonance tracker for adjusting a frequency of AC current through the integrated heater of the cantilever probe to maintain the oscillatory motion substantially at a resonant frequency of the cantilever probe.

46. The apparatus of claim 45 wherein the self-resonance tracker adjusts a frequency of AC current to a contact resonant frequency of the cantilever.

47. The apparatus of claim 42 wherein the cantilever probe further comprises two substantially parallel arms.

48. The apparatus of claim 47 wherein the magnetic source is arranged substantially parallel to the length of the two substantially parallel arms.

49. The apparatus of claim 48 wherein Lorentz forces in the two substantially parallel arms substantially cancel such that that a primary net force on the cantilever probe occurs at a tip end of the cantilever probe.

50. The apparatus of claim 42, further comprising a temperature measurement system that produces a signal indicative of a tip-sample temperature, the temperature measurement system provided in electrical communication with the cantilever probe.

* * * * *